US012502785B2

(12) United States Patent
Yang et al.

(10) Patent No.: US 12,502,785 B2
(45) Date of Patent: Dec. 23, 2025

(54) SYSTEM AND METHOD OF ACTIVATING MANUAL MANIPULATION USING LINKAGE INTERACTION SENSING

(71) Applicant: Auris Health, Inc., Redwood City, CA (US)

(72) Inventors: Bo Yang, Mountain View, CA (US); Yanan Huang, Sunnyvale, CA (US); Alexander Tarek Hassan, San Francisco, CA (US); Mason Myles Markee, Pacifica, CA (US); Ying Mao, San Mateo, CA (US)

(73) Assignee: Auris Health, Inc., Redwood City, CA (US)

( * ) Notice: Subject to any disclaimer, the term of this patent is extended or adjusted under 35 U.S.C. 154(b) by 200 days.

(21) Appl. No.: 18/117,093

(22) Filed: Mar. 3, 2023

(65) Prior Publication Data

US 2023/0202053 A1 Jun. 29, 2023

Related U.S. Application Data

(63) Continuation of application No. PCT/IB2021/059081, filed on Oct. 4, 2021.
(Continued)

(51) Int. Cl.
*B25J 9/16* (2006.01)
*A61B 34/30* (2016.01)
(Continued)

(52) U.S. Cl.
CPC ............ *B25J 9/1694* (2013.01); *A61B 34/30* (2016.02); *B25J 9/1674* (2013.01); *B25J 13/081* (2013.01);
(Continued)

(58) Field of Classification Search
CPC ...... B25J 9/1633; B25J 9/1646; B25J 9/1669; B25J 9/1679; B25J 9/1694; B25J 13/08;
(Continued)

(56) References Cited

U.S. PATENT DOCUMENTS

2012/0283747 A1 11/2012 Popovic
2013/0184871 A1 7/2013 Fudaba et al.
(Continued)

FOREIGN PATENT DOCUMENTS

CN 111035454 A 4/2020
EP 3473202 A1 4/2019
(Continued)

OTHER PUBLICATIONS

PCT International Search Report; PCT/IB2021/059081; Dec. 31, 2021; 4 pages.
(Continued)

*Primary Examiner* — Spencer D Patton
(74) *Attorney, Agent, or Firm* — Frost Brown Todd LLP

(57) ABSTRACT

Robotic medical systems capable of manual manipulation are described. A robotic medical system can include a robotic arm and a sensor architecture. The sensor architecture can include one or more non-joint based sensors that are positioned to detect a first force exerted on the robotic arm. The robotic medical system can be configured to determine whether sensor data received from the sensor architecture meets first criteria. For example, the first criteria can be met in accordance with a determination that the first force exceeds a first threshold force. The robotic medical system
(Continued)

can be configured to, in accordance with a determination that the first criteria are met, transition the robotic arm from a position control mode to a manual manipulation mode.

19 Claims, 33 Drawing Sheets

Related U.S. Application Data

(60) Provisional application No. 63/088,864, filed on Oct. 7, 2020.

(51) Int. Cl.
  *B25J 13/08* (2006.01)
  *G05B 19/4155* (2006.01)

(52) U.S. Cl.
  CPC ........ *B25J 13/085* (2013.01); *G05B 19/4155* (2013.01); *G05B 2219/40586* (2013.01)

(58) Field of Classification Search
  CPC ...... B25J 13/081; B25J 13/084; B25J 13/085; B25J 9/1628; B25J 9/1674; G05B 2219/40586; A61B 34/30; A61B 2034/305
  See application file for complete search history.

(56) References Cited

U.S. PATENT DOCUMENTS

| | | | |
|---|---|---|---|
| 2014/0163735 A1* | 6/2014 | Yasuda | B25J 9/1633 700/258 |
| 2015/0081098 A1 | 3/2015 | Kogan | |
| 2016/0374768 A1 | 12/2016 | Griffiths et al. | |
| 2017/0014995 A1 | 1/2017 | Kato | |
| 2017/0340396 A1* | 11/2017 | Romo | A61B 34/30 |
| 2019/0202066 A1* | 7/2019 | Maret | B25J 17/025 |
| 2021/0016445 A1* | 1/2021 | Zhou | A61B 34/37 |
| 2021/0196397 A1* | 7/2021 | Peng | A61B 34/37 |
| 2021/0236207 A1* | 8/2021 | Stanton | A61B 34/10 |

FOREIGN PATENT DOCUMENTS

| | | | |
|---|---|---|---|
| JP | 2005059161 A | * | 3/2005 |
| WO | 2019/204699 A1 | | 10/2019 |

OTHER PUBLICATIONS

PCT Written Opinion of the International Searching Authority; PCT/IB2021/059081; Dec. 31, 2021; 6 pages.
European Search Report, Extended, and Written Opinion dated Oct. 21, 2024 for Application No. EP 21877098.0, 11 pgs.

* cited by examiner

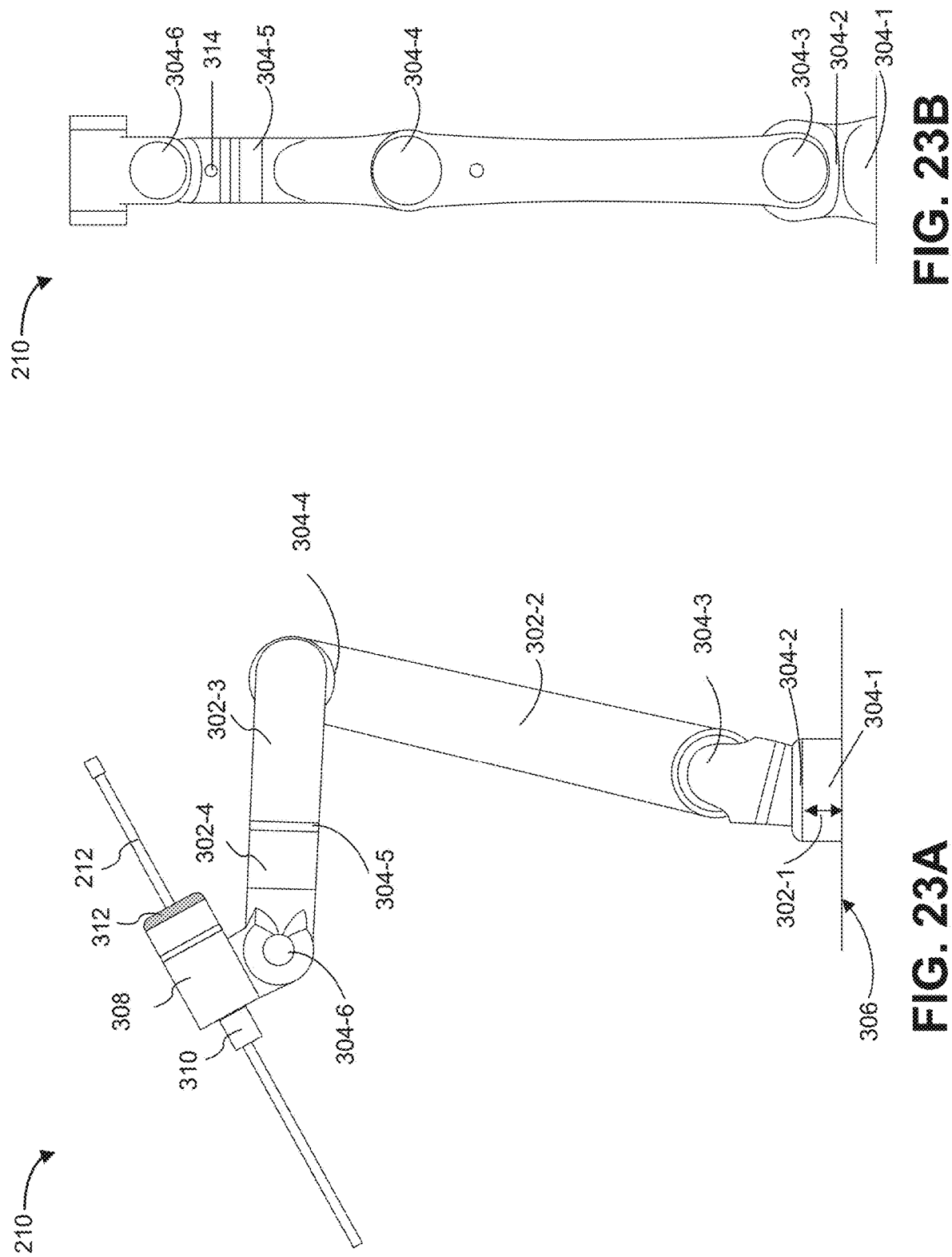

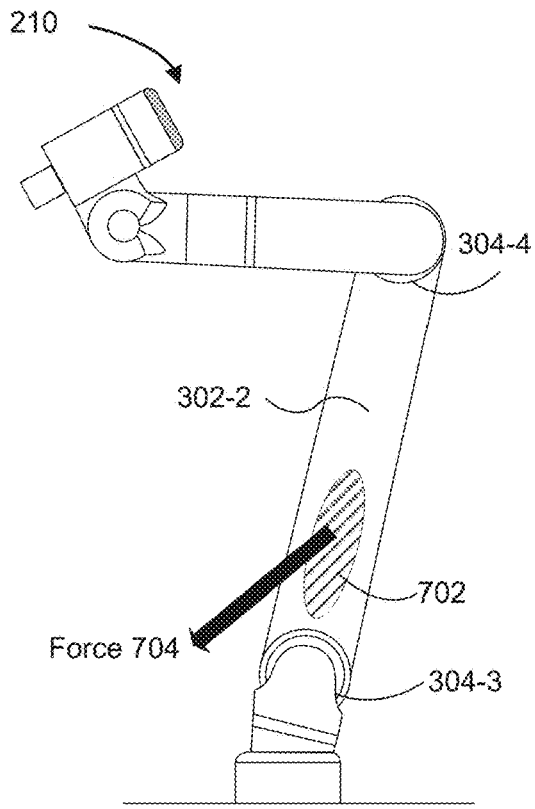
| Sensor 408 Number | Fx (N) | Fy (N) | Fz (N) |
|---|---|---|---|
| 408-1 | Fx_1 | Fy_1 | Fz_1 |
| 408-2 | Fx_2 | Fy_2 | Fz_2 |
| 408-3 | Fx_3 | Fy_3 | Fz_3 |
| 408-4 | Fx_4 | Fy_4 | Fz_4 |
| 408-5 | Fx_5 | Fy_5 | Fz_5 |
| 408-6 | Fx_6 | Fy_6 | Fz_6 |
| 408-7 | Fx_7 | Fy_7 | Fz_7 |
| 408-8 | Fx_8 | Fy_8 | Fz_8 |
| 408-9 | Fx_9 | Fy_9 | Fz_9 |
| 408-10 | Fx_10 | Fy_10 | Fz_10 |
| 408-11 | Fx_11 | Fy_11 | Fz_11 |
| 408-12 | Fx_12 | Fy_12 | Fz_12 |
| 408-13 | Fx_13 | Fy_13 | Fz_13 |
| 408-14 | Fx_14 | Fy_14 | Fz_14 |
(A)  (B)
| Sensor 408 Number | Mx (N) | My (N) | Mz (N) |
|---|---|---|---|
| 408-1 | Mx_1 | My_1 | Mz_1 |
| 408-2 | Mx_2 | My_2 | Mz_2 |
| 408-3 | Mx_3 | My_3 | Mz_3 |
| 408-4 | Mx_4 | My_4 | Mz_4 |
| 408-5 | Mx_5 | My_5 | Mz_5 |
| 408-6 | Mx_6 | My_6 | Mz_6 |
| 408-7 | Mx_7 | My_7 | Mz_7 |
| 408-8 | Mx_8 | My_8 | Mz_8 |
| 408-9 | Mx_9 | My_9 | Mz_9 |
| 408-10 | Mx_10 | My_10 | Mz_10 |
| 408-11 | Mx_11 | My_11 | Mz_11 |
| 408-12 | Mx_12 | My_12 | Mz_12 |
| 408-13 | Mx_13 | My_13 | Mz_13 |
| 408-14 | Mx_14 | My_14 | Mz_14 |
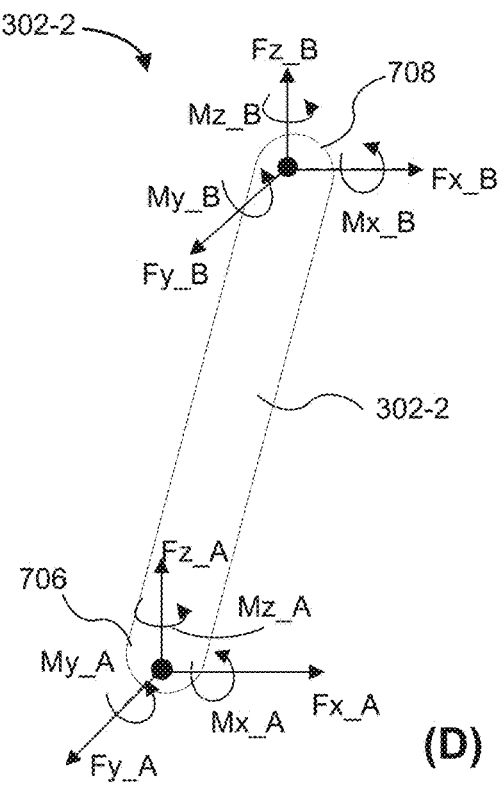
(C)  (D)
FIG. 27

SYSTEM AND METHOD OF ACTIVATING MANUAL MANIPULATION USING LINKAGE INTERACTION SENSING

RELATED APPLICATIONS

This application is a continuation of PCT Patent Application No. PCT/IB2021/059081, filed Oct. 4, 2021, entitled "System and Method of Activating Manual Manipulation Using Linkage Interaction Sensing," which claims priority to U.S. Provisional Patent Application No. 63/088,864, filed Oct. 7, 2020, entitled "System and Method of Activating Manual Manipulation Using Linkage Interaction Sensing," all of which are incorporated by reference herein in their entireties.

TECHNICAL FIELD

The systems and methods disclosed herein are directed to robotic medical systems, and more particularly to robotically controlled arms of robotic medical systems.

BACKGROUND

A robotically-enabled medical system is capable of performing a variety of medical procedures, including both minimally invasive, such as laparoscopy, and non-invasive, such as endoscopy, procedures. Among endoscopic procedures, the system may be capable of performing bronchoscopy, ureteroscopy, gastroscopy, etc.

Such robotic medical systems may include robotic arms configured to control the movement of medical tool(s) during a given medical procedure. In order to achieve a desired pose of a medical tool, a robotic arm may be placed into a pose during a set-up process. Some robotically-enabled medical systems may include an arm support (e.g., a bar) that is connected to respective bases of the robotic arms and supports the robotic arms.

SUMMARY

Before a procedure starts, an operator (e.g., a physician assistant, medical personnel, etc.) may be required to set up the robotic arms and an adjustable arm support of the robotic medical system to a desired overall configuration. In some circumstances, the operator can manually manipulate one or more robotic arms to their respective configurations (e.g., using admittance mode control, impedance mode control, or a combination thereof, etc.) during setup, but the operator has to activate an input control (e.g., press a button, activating a user interface control on a touch screen, etc.) in order to place the robotic arm(s) in a manual manipulation mode (e.g., admittance mode control, impedance mode control, etc.). In some circumstances, depending on the position of the robotic arm relative to the operator and/or depending on the position of the input control, it may be inconvenient or difficult for the operator to reach the input control without having to over-extend him/herself or move around the operating room. This limitation on when and how the robotic arm may be transitioned from a position control mode into a manual manipulation mode makes the setup process very cumbersome and time-consuming. It also increases the risks of tripping and collision with other person or objects in the operating room, when the operator moves around the operating room and/or trying to reaching for the input control from a uncomfortable or inconvenient position. With the significant operational burden imposed on the operator during the setup process, risks of operator error also increase.

Furthermore, during surgery, a patient or medical personnel may accidentally come into contact with an undocked robotic arm, resulting in excessive contact force on the patient or the medical personnel. The excessive contact force may cause injury to the patient or the medical personnel during surgery. Also, requiring the operator to move the patient or to reach for the input control before moving the robotic arm out of the way may pose additional risks of undesirable collisions and contact with the patient or other object in the operating room.

For at least these reasons, an improved robotic medical system is desirable. In particular, there is a need for a robotic medical system that senses interactions on a robotic arm (e.g., on linkages, joints, etc. of the robotic arm) and, based on the sensor data, conditionally enable a manual manipulation mode of the robotic arm(s).

As disclosed herein, rather than requiring the operator to reach for a dedicated control at a fixed position relative to the robotic medical system, a sensor architecture including sensors distributed throughout multiple regions of the robotic arm(s) is utilized to capture sensor data regarding how the operator is touching and/or interacting with the robotic arm(s). Based on the sensor data, the operator's intent to activate the manual manipulation mode of the robotic arm(s) is computationally determined by the robotic medical system based on an evaluation of the sensor data against various pre-established criteria, such that, the robotic medical system may intelligently activate the manual manipulation mode in accordance with many different ways of touching and/or interacting with the robotic arm(s) that are easily, conveniently, and intuitively executable by the operator from many different positions near the robotic medical system. Accordingly, the operational burden placed on the operator when setting up the robotic medical system is reduced, and efficiency and safety of using the robotic medical system is improved.

Furthermore, when a patient or medical personnel accidentally comes into contact with an undocked robotic arm during surgery, rather than requiring the operator to move the patient or reach for the input control before moving the robotic arm out of the way, the robotic medical system automatically activates an admittance mode or an impedance mode control of the robotic arm(s) to move the arm away from the point of contact or collision (e.g., automatically and/or under manual manipulation), such that excessive contact force on a patient or the medical personnel can be resolved. The robotic medical system may activate the admittance mode or impedance mode control of the robotic arm(s) in response to the collision or contact forces and/or moment exceeding preset threshold(s), and/or in response to the operator directly pushing or pulling on the linkages and/or joints of the robotic arm. This advantageously improves patient and/or operator safety during surgery.

The systems, methods and devices of this disclosure each have several innovative aspects, no single one of which is solely responsible for the desirable attributes disclosed herein.

In accordance with some embodiments of the present disclosure, a robotic system includes a robotic arm. The robotic system also includes a sensor architecture. The sensor architecture includes one or more non-joint based sensors that are positioned to detect a first force exerted on the robotic arm. The robotic system further includes one or more processors and memory. The memory stores instructions that, when executed by the one or more processors, cause the processors to determine whether sensor data received from the sensor architecture meets first criteria. The first criteria are met in accordance with a determination that the first force exceeds a first threshold force. In accordance with a determination that the first criteria are met, including a determination that the first force exceeds the first threshold force, the processors transition the robotic arm from a position control mode to a manual manipulation mode.

In some embodiments, the manual manipulation mode includes an impedance mode.

In some embodiments, the one or more non-joint based sensors include a combined force and moment sensor.

In some embodiments, the one or more non-joint sensors include at least a first sensor that is located between a pair of joints of the robotic arm.

In some embodiments, the one or more non-joint sensors include at least a first sensor that is located in a distal portion of the robotic arm.

In some instances, the robotic system further includes a tool driver that is mounted on the first sensor such that the first sensor detects force exerted by the tool driver.

In some instances, the first sensor is a six-axis load cell.

In some embodiments, the one or more non-joint based sensors include one or more contact sensors located on one or more links of the robotic arm.

In some instances, the contact sensors are capable of detecting force and moment exerted on the robotic arm.

In some embodiments, the sensor architecture further includes one or more joint based sensors that are positioned to detect a second force exerted on the robotic arm.

In some instances, the first criteria are met in accordance with a determination that the first force detected by the non-joint based sensors and the second force detected by the joint-based sensors meet a preset combination of requirements on the first force and the second force. The memory further includes instructions that, when executed by the one or more processors, cause the processors to: in accordance with a determination that the first criteria are met, including a determination that the first force and the second force meet a preset combination of requirements on the first force and the second force, transition the robotic arm from the position control mode to the manual manipulation mode.

In some embodiments, the memory further stores instructions that, when executed by the one or more processors, cause the processors to: during the manual manipulation mode, generate output to assist with movement of the robotic arm in accordance with physical manipulation of the robotic arm by an operator.

In some embodiments, the memory further stores instructions that, when executed by the one or more processors, cause the processors to monitor movement of the robotic arm during the manual manipulation mode. In accordance with a determination that the movement meets second criteria, wherein the second criteria are met in accordance with a determination that the movement of the robotic arm during the manual manipulation mode is below a threshold level of movement, the one or more processors transition the robotic arm from the manual manipulation mode to the position control mode.

In some embodiments, the first criteria include a requirement that the robotic arm is in an undocked configuration in order for the first criteria to be met.

In some embodiments, the robotic system further includes an input interface that, when activated by a preset input, cause the one or more processors to transition the robotic arm from the position control mode to the manual manipulation mode.

In some embodiments, the robotic system further includes one or more additional robotic arms. The robotic system further includes an input interface that remotely activates impedance control of the first robotic arm and/or the additional robotic arms.

In another aspect of the present disclosure, a robotic system includes a robotic arm. The robotic system also includes a sensor architecture. The sensor architecture includes one or more sensors that are positioned to detect force and/or moment exerted on the robotic arm. The robotic system further includes one or more processors and memory. The memory stores instructions that, when executed by the one or more processors, cause the processors to determine whether sensor data received from the sensor architecture meets first criteria. The first criteria are met in accordance with a determination that a force detected by the one or more sensors exceeds a first threshold force or in accordance with a determination that a moment detected by the one or more sensors exceeds a first threshold moment. In accordance with a determination that the first criteria are met, the processors transition the robotic arm from a position control mode to a manual manipulation mode.

In some embodiments, the one or more sensors include a six-axis load cell.

In some embodiments, the one or more sensors include a plurality of contact sensors.

In some instances, the robotic arm includes an outer surface. The plurality of contact sensors engage with a shell covering the outer surface of the robotic arm.

In some instances, the detected force and moment is a combination of a respective force and/or a respective moment detected by a respective one of the plurality of contact sensors.

In some embodiments, the one or more sensors include at least a non-joint based sensor that is positioned away from a joint of the robotic arm.

In some embodiments, the one or more sensors include at least a joint-based sensor that is positioned on a joint of the robotic arm.

In some embodiments, the manual manipulation mode includes an impedance mode.

In some embodiments, the memory further stores instructions that, when executed by the one or more processors, cause the processors to: during the manual manipulation mode, generate output to assist with movement of the robotic arm in accordance with physical manipulation of the robotic arm by an operator.

In some embodiments, the memory further stores instructions that, when executed by the one or more processors, cause the processors to: monitor movement of the robotic arm during the manual manipulation mode. In accordance with a determination that the movement meets second criteria, wherein the second criteria are met in accordance with a determination that the movement of the robotic arm during the manual manipulation mode is below a threshold level of movement, the processors transition the robotic arm from the manual manipulation mode to the position control mode.

In some embodiments, the first criteria include a requirement that the robotic arm is in an undocked configuration in order for the first criteria to be met.

In some embodiments, the robotic system further comprising an input interface that, when activated by a preset input, cause the one or more processors to transition the robotic arm from the position control mode to the manual manipulation mode.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIGS. 23A and 23B illustrate different views of an exemplary robotic arm according to some embodiments.

FIG. 27 illustrates an exemplary interaction with a link of the robotic arm according to some embodiments.

DETAILED DESCRIPTION

1. Overview

Aspects of the present disclosure may be integrated into a robotically-enabled medical system capable of performing a variety of medical procedures, including both minimally invasive, such as laparoscopy, and non-invasive, such as endoscopy, procedures. Among endoscopy procedures, the system may be capable of performing bronchoscopy, ureteroscopy, gastroscopy, etc.

In addition to performing the breadth of procedures, the system may provide additional benefits, such as enhanced imaging and guidance to assist the physician. Additionally, the system may provide the physician with the ability to perform the procedure from an ergonomic position without the need for awkward arm motions and positions. Still further, the system may provide the physician with the ability to perform the procedure with improved ease of use such that one or more of the instruments of the system can be controlled by a single user.

Various embodiments will be described below in conjunction with the drawings for purposes of illustration. It should be appreciated that many other embodiments of the disclosed concepts are possible, and various advantages can be achieved with the disclosed embodiments. Headings are included herein for reference and to aid in locating various sections. These headings are not intended to limit the scope of the concepts described with respect thereto. Such concepts may have applicability throughout the entire specification.

A. Robotic System—Cart.

Figure 1:
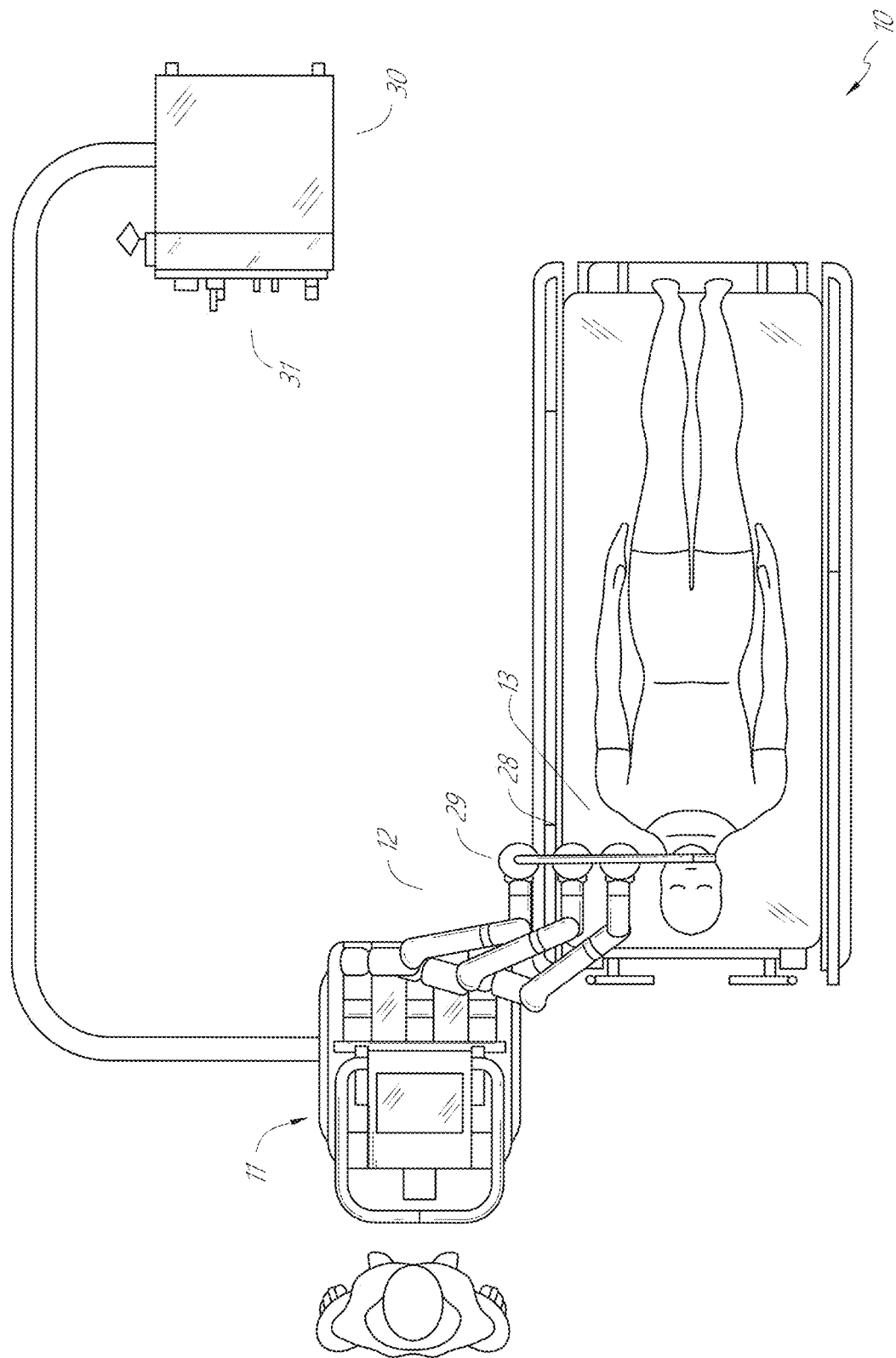
FIG. 1 illustrates an embodiment of a cart-based robotic system arranged for diagnostic and/or therapeutic bronchoscopy procedure(s).
Figure 2:
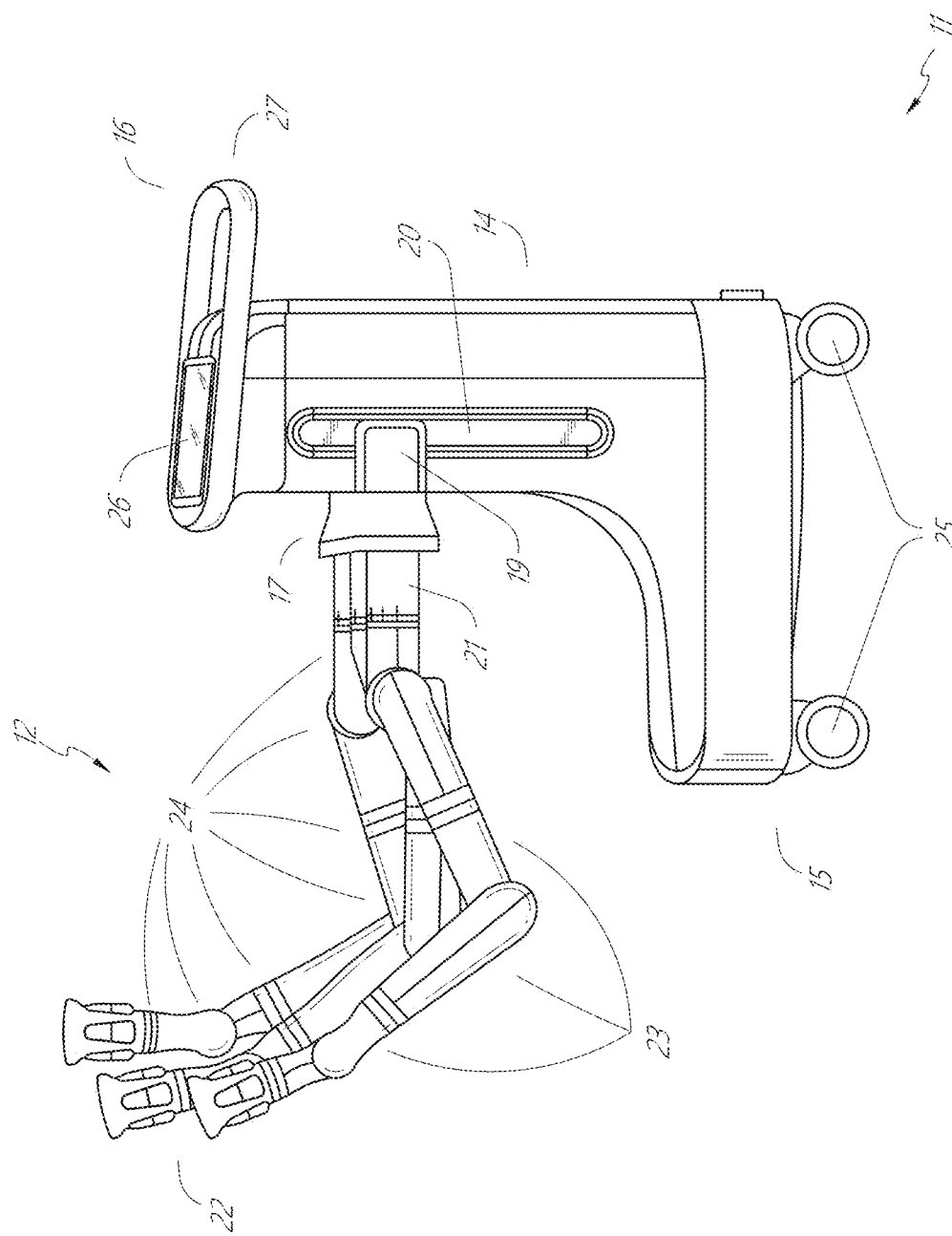
FIG. 2 depicts further aspects of the robotic system of FIG. 1.

The robotically-enabled medical system may be configured in a variety of ways depending on the particular procedure. FIG. 1 illustrates an embodiment of a cart-based robotically-enabled system 10 arranged for a diagnostic and/or therapeutic bronchoscopy procedure. During a bronchoscopy, the system 10 may comprise a cart 11 having one or more robotic arms 12 to deliver a medical instrument, such as a steerable endoscope 13, which may be a procedure-specific bronchoscope for bronchoscopy, to a natural orifice access point (i.e., the mouth of the patient positioned on a table in the present example) to deliver diagnostic and/or therapeutic tools. As shown, the cart 11 may be positioned proximate to the patient's upper torso in order to provide access to the access point. Similarly, the robotic arms 12 may be actuated to position the bronchoscope relative to the access point. The arrangement in FIG. 1 may also be utilized when performing a gastro-intestinal (GI) procedure with a gastroscope, a specialized endoscope for GI procedures. FIG. 2 depicts an example embodiment of the cart in greater detail.

With continued reference to FIG. 1, once the cart 11 is properly positioned, the robotic arms 12 may insert the steerable endoscope 13 into the patient robotically, manually, or a combination thereof. As shown, the steerable endoscope 13 may comprise at least two telescoping parts, such as an inner leader portion and an outer sheath portion, each portion coupled to a separate instrument driver from the set of instrument drivers 28, each instrument driver coupled to the distal end of an individual robotic arm. This linear arrangement of the instrument drivers 28, which facilitates coaxially aligning the leader portion with the sheath portion, creates a "virtual rail" 29 that may be repositioned in space by manipulating the one or more robotic arms 12 into different angles and/or positions. The virtual rails described herein are depicted in the Figures using dashed lines, and accordingly the dashed lines do not depict any physical structure of the system. Translation of the instrument drivers 28 along the virtual rail 29 telescopes the inner leader portion relative to the outer sheath portion or advances or retracts the endoscope 13 from the patient. The angle of the virtual rail 29 may be adjusted, translated, and pivoted based on clinical application or physician preference. For example, in bronchoscopy, the angle and position of the virtual rail 29 as shown represents a compromise between providing physician access to the endoscope 13 while minimizing friction that results from bending the endoscope 13 into the patient's mouth.

The endoscope 13 may be directed down the patient's trachea and lungs after insertion using precise commands from the robotic system until reaching the target destination or operative site. In order to enhance navigation through the patient's lung network and/or reach the desired target, the endoscope 13 may be manipulated to telescopically extend the inner leader portion from the outer sheath portion to obtain enhanced articulation and greater bend radius. The use of separate instrument drivers 28 also allows the leader portion and sheath portion to be driven independent of each other.

For example, the endoscope 13 may be directed to deliver a biopsy needle to a target, such as, for example, a lesion or nodule within the lungs of a patient. The needle may be deployed down a working channel that runs the length of the endoscope to obtain a tissue sample to be analyzed by a pathologist. Depending on the pathology results, additional tools may be deployed down the working channel of the endoscope for additional biopsies. After identifying a nodule to be malignant, the endoscope 13 may endoscopically deliver tools to resect the potentially cancerous tissue. In some instances, diagnostic and therapeutic treatments can be delivered in separate procedures. In those circumstances, the endoscope 13 may also be used to deliver a fiducial to "mark" the location of the target nodule as well. In other instances, diagnostic and therapeutic treatments may be delivered during the same procedure.

The system 10 may also include a movable tower 30, which may be connected via support cables to the cart 11 to provide support for controls, electronics, fluidics, optics, sensors, and/or power to the cart 11. Placing such functionality in the tower 30 allows for a smaller form factor cart 11 that may be more easily adjusted and/or re-positioned by an operating physician and his/her staff. Additionally, the division of functionality between the cart/table and the support tower 30 reduces operating room clutter and facilitates improving clinical workflow. While the cart 11 may be positioned close to the patient, the tower 30 may be stowed in a remote location to stay out of the way during a procedure.

In support of the robotic systems described above, the tower 30 may include component(s) of a computer-based control system that stores computer program instructions, for example, within a non-transitory computer-readable storage medium such as a persistent magnetic storage drive, solid state drive, etc. The execution of those instructions, whether the execution occurs in the tower 30 or the cart 11, may control the entire system or sub-system(s) thereof. For example, when executed by a processor of the computer system, the instructions may cause the components of the robotics system to actuate the relevant carriages and arm mounts, actuate the robotics arms, and control the medical instruments. For example, in response to receiving the control signal, the motors in the joints of the robotics arms may position the arms into a certain posture.

The tower 30 may also include a pump, flow meter, valve control, and/or fluid access in order to provide controlled irrigation and aspiration capabilities to the system that may be deployed through the endoscope 13. These components may also be controlled using the computer system of tower 30. In some embodiments, irrigation and aspiration capabilities may be delivered directly to the endoscope 13 through separate cable(s).

The tower 30 may include a voltage and surge protector designed to provide filtered and protected electrical power to the cart 11, thereby avoiding placement of a power transformer and other auxiliary power components in the cart 11, resulting in a smaller, more moveable cart 11.

The tower 30 may also include support equipment for the sensors deployed throughout the robotic system 10. For example, the tower 30 may include opto-electronics equipment for detecting, receiving, and processing data received from the optical sensors or cameras throughout the robotic system 10. In combination with the control system, such opto-electronics equipment may be used to generate real-time images for display in any number of consoles deployed throughout the system, including in the tower 30. Similarly, the tower 30 may also include an electronic subsystem for receiving and processing signals received from deployed electromagnetic (EM) sensors. The tower 30 may also be used to house and position an EM field generator for detection by EM sensors in or on the medical instrument.

The tower 30 may also include a console 31 in addition to other consoles available in the rest of the system, e.g., console mounted on top of the cart. The console 31 may include a user interface and a display screen, such as a touchscreen, for the physician operator. Consoles in system 10 are generally designed to provide both robotic controls as well as pre-operative and real-time information of the procedure, such as navigational and localization information of the endoscope 13. When the console 31 is not the only console available to the physician, it may be used by a second operator, such as a nurse, to monitor the health or vitals of the patient and the operation of system, as well as provide procedure-specific data, such as navigational and localization information. In other embodiments, the console 30 is housed in a body that is separate from the tower 30.

The tower 30 may be coupled to the cart 11 and endoscope 13 through one or more cables or connections (not shown). In some embodiments, the support functionality from the tower 30 may be provided through a single cable to the cart 11, simplifying and de-cluttering the operating room. In other embodiments, specific functionality may be coupled in separate cabling and connections. For example, while power may be provided through a single power cable to the cart, the support for controls, optics, fluidics, and/or navigation may be provided through a separate cable.

FIG. 2 provides a detailed illustration of an embodiment of the cart from the cart-based robotically-enabled system shown in FIG. 1. The cart 11 generally includes an elongated support structure 14 (often referred to as a "column"), a cart base 15, and a console 16 at the top of the column 14. The column 14 may include one or more carriages, such as a carriage 17 (alternatively "arm support") for supporting the deployment of one or more robotic arms 12 (three shown in FIG. 2). The carriage 17 may include individually configurable arm mounts that rotate along a perpendicular axis to adjust the base of the robotic arms 12 for better positioning relative to the patient. The carriage 17 also includes a carriage interface 19 that allows the carriage 17 to vertically translate along the column 14.

The carriage interface 19 is connected to the column 14 through slots, such as slot 20, that are positioned on opposite sides of the column 14 to guide the vertical translation of the carriage 17. The slot 20 contains a vertical translation interface to position and hold the carriage at various vertical heights relative to the cart base 15. Vertical translation of the carriage 17 allows the cart 11 to adjust the reach of the robotic arms 12 to meet a variety of table heights, patient sizes, and physician preferences. Similarly, the individually configurable arm mounts on the carriage 17 allow the robotic arm base 21 of robotic arms 12 to be angled in a variety of configurations.

In some embodiments, the slot 20 may be supplemented with slot covers that are flush and parallel to the slot surface to prevent dirt and fluid ingress into the internal chambers of the column 14 and the vertical translation interface as the carriage 17 vertically translates. The slot covers may be deployed through pairs of spring spools positioned near the vertical top and bottom of the slot 20. The covers are coiled within the spools until deployed to extend and retract from their coiled state as the carriage 17 vertically translates up and down. The spring-loading of the spools provides force to retract the cover into a spool when carriage 17 translates towards the spool, while also maintaining a tight seal when the carriage 17 translates away from the spool. The covers may be connected to the carriage 17 using, for example, brackets in the carriage interface 19 to ensure proper extension and retraction of the cover as the carriage 17 translates.

The column 14 may internally comprise mechanisms, such as gears and motors, that are designed to use a vertically aligned lead screw to translate the carriage 17 in a mechanized fashion in response to control signals generated in response to user inputs, e.g., inputs from the console 16.

The robotic arms 12 may generally comprise robotic arm bases 21 and end effectors 22, separated by a series of linkages 23 that are connected by a series of joints 24, each joint comprising an independent actuator, each actuator comprising an independently controllable motor. Each independently controllable joint represents an independent degree of freedom available to the robotic arm. Each of the arms 12 have seven joints, and thus provide seven degrees of freedom. A multitude of joints result in a multitude of degrees of freedom, allowing for "redundant" degrees of freedom. Redundant degrees of freedom allow the robotic arms 12 to position their respective end effectors 22 at a specific position, orientation, and trajectory in space using different linkage positions and joint angles. This allows for the system to position and direct a medical instrument from a desired point in space while allowing the physician to move the arm joints into a clinically advantageous position away from the patient to create greater access, while avoiding arm collisions.

The cart base 15 balances the weight of the column 14, carriage 17, and arms 12 over the floor. Accordingly, the cart base 15 houses heavier components, such as electronics, motors, power supply, as well as components that either enable movement and/or immobilize the cart. For example, the cart base 15 includes rollable wheel-shaped casters 25 that allow for the cart to easily move around the room prior to a procedure. After reaching the appropriate position, the casters 25 may be immobilized using wheel locks to hold the cart 11 in place during the procedure.

Positioned at the vertical end of column 14, the console 16 allows for both a user interface for receiving user input and a display screen (or a dual-purpose device such as, for example, a touchscreen 26) to provide the physician user with both pre-operative and intra-operative data. Potential pre-operative data on the touchscreen 26 may include pre-operative plans, navigation and mapping data derived from pre-operative computerized tomography (CT) scans, and/or notes from pre-operative patient interviews. Intra-operative data on display may include optical information provided from the tool, sensor and coordinate information from sensors, as well as vital patient statistics, such as respiration, heart rate, and/or pulse. The console 16 may be positioned and tilted to allow a physician to access the console from the side of the column 14 opposite carriage 17. From this position, the physician may view the console 16, robotic arms 12, and patient while operating the console 16 from behind the cart 11. As shown, the console 16 also includes a handle 27 to assist with maneuvering and stabilizing cart 11.

Figure 3:
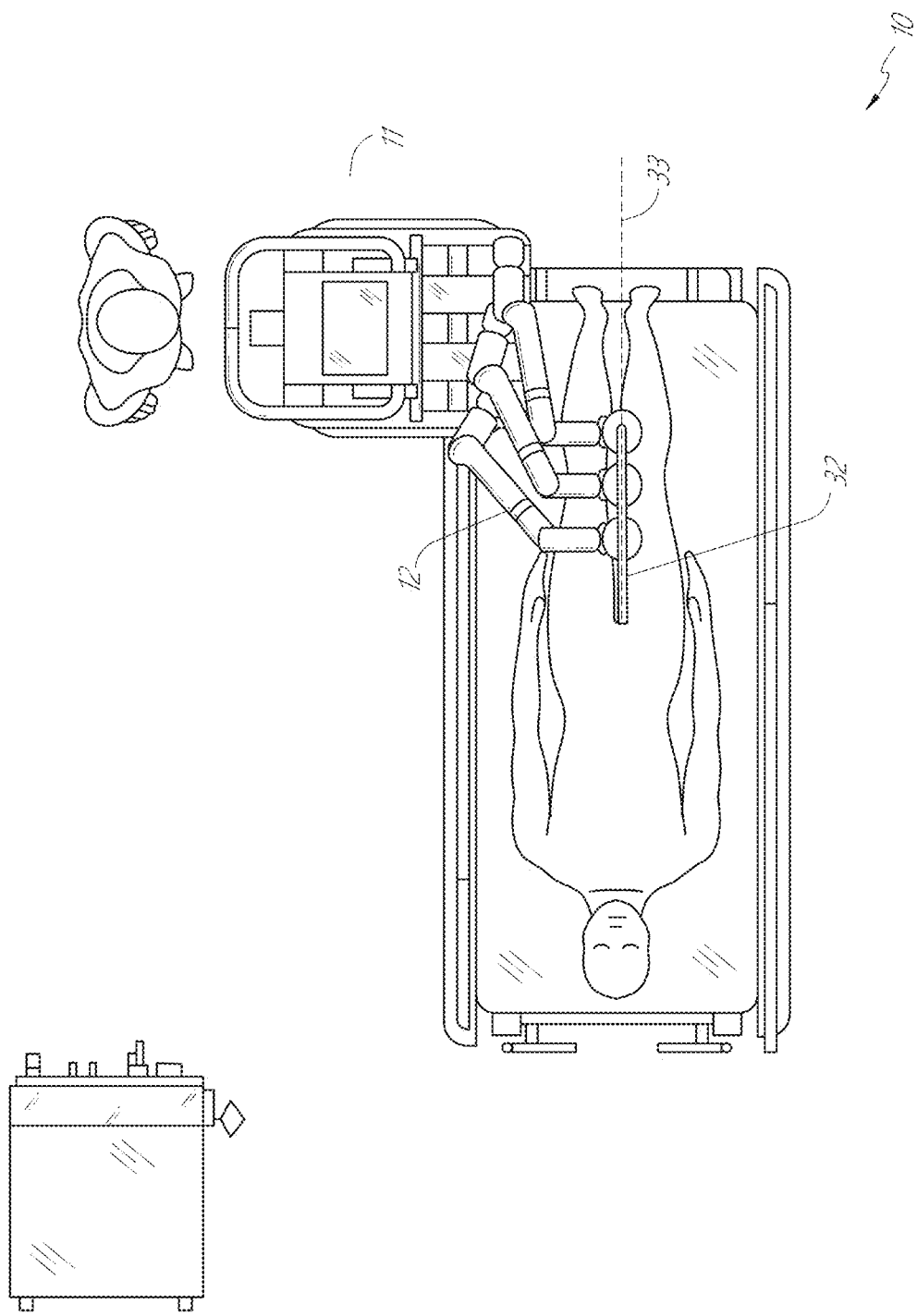
FIG. 3 illustrates an embodiment of the robotic system of FIG. 1 arranged for ureteroscopy.

FIG. 3 illustrates an embodiment of a robotically-enabled system 10 arranged for ureteroscopy. In a ureteroscopic procedure, the cart 11 may be positioned to deliver a ureteroscope 32, a procedure-specific endoscope designed to traverse a patient's urethra and ureter, to the lower abdominal area of the patient. In a ureteroscopy, it may be desirable for the ureteroscope 32 to be directly aligned with the patient's urethra to reduce friction and forces on the sensitive anatomy in the area. As shown, the cart 11 may be aligned at the foot of the table to allow the robotic arms 12 to position the ureteroscope 32 for direct linear access to the patient's urethra. From the foot of the table, the robotic arms 12 may insert the ureteroscope 32 along the virtual rail 33 directly into the patient's lower abdomen through the urethra.

After insertion into the urethra, using similar control techniques as in bronchoscopy, the ureteroscope 32 may be navigated into the bladder, ureters, and/or kidneys for diagnostic and/or therapeutic applications. For example, the ureteroscope 32 may be directed into the ureter and kidneys to break up kidney stone build up using a laser or ultrasonic lithotripsy device deployed down the working channel of the ureteroscope 32. After lithotripsy is complete, the resulting stone fragments may be removed using baskets deployed down the ureteroscope 32.

Figure 4:
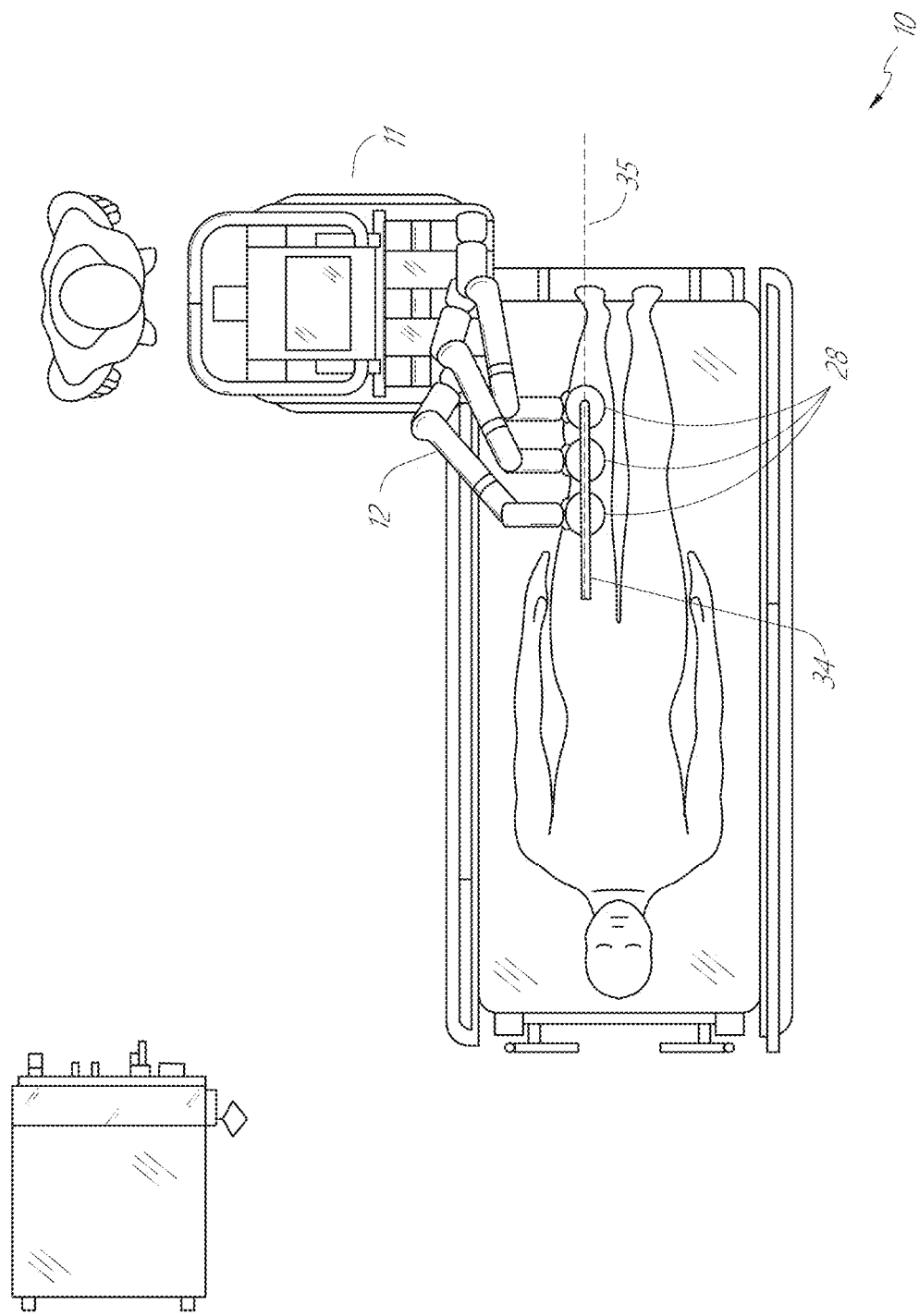
FIG. 4 illustrates an embodiment of the robotic system of FIG. 1 arranged for a vascular procedure.

FIG. 4 illustrates an embodiment of a robotically-enabled system similarly arranged for a vascular procedure. In a vascular procedure, the system 10 may be configured such that the cart 11 may deliver a medical instrument 34, such as a steerable catheter, to an access point in the femoral artery in the patient's leg. The femoral artery presents both a larger diameter for navigation as well as a relatively less circuitous and tortuous path to the patient's heart, which simplifies navigation. As in a ureteroscopic procedure, the cart 11 may be positioned towards the patient's legs and lower abdomen to allow the robotic arms 12 to provide a virtual rail 35 with direct linear access to the femoral artery access point in the patient's thigh/hip region. After insertion into the artery, the medical instrument 34 may be directed and inserted by translating the instrument drivers 28. Alternatively, the cart may be positioned around the patient's upper abdomen in order to reach alternative vascular access points, such as, for example, the carotid and brachial arteries near the shoulder and wrist.

B. Robotic System—Table.

Figure 5:
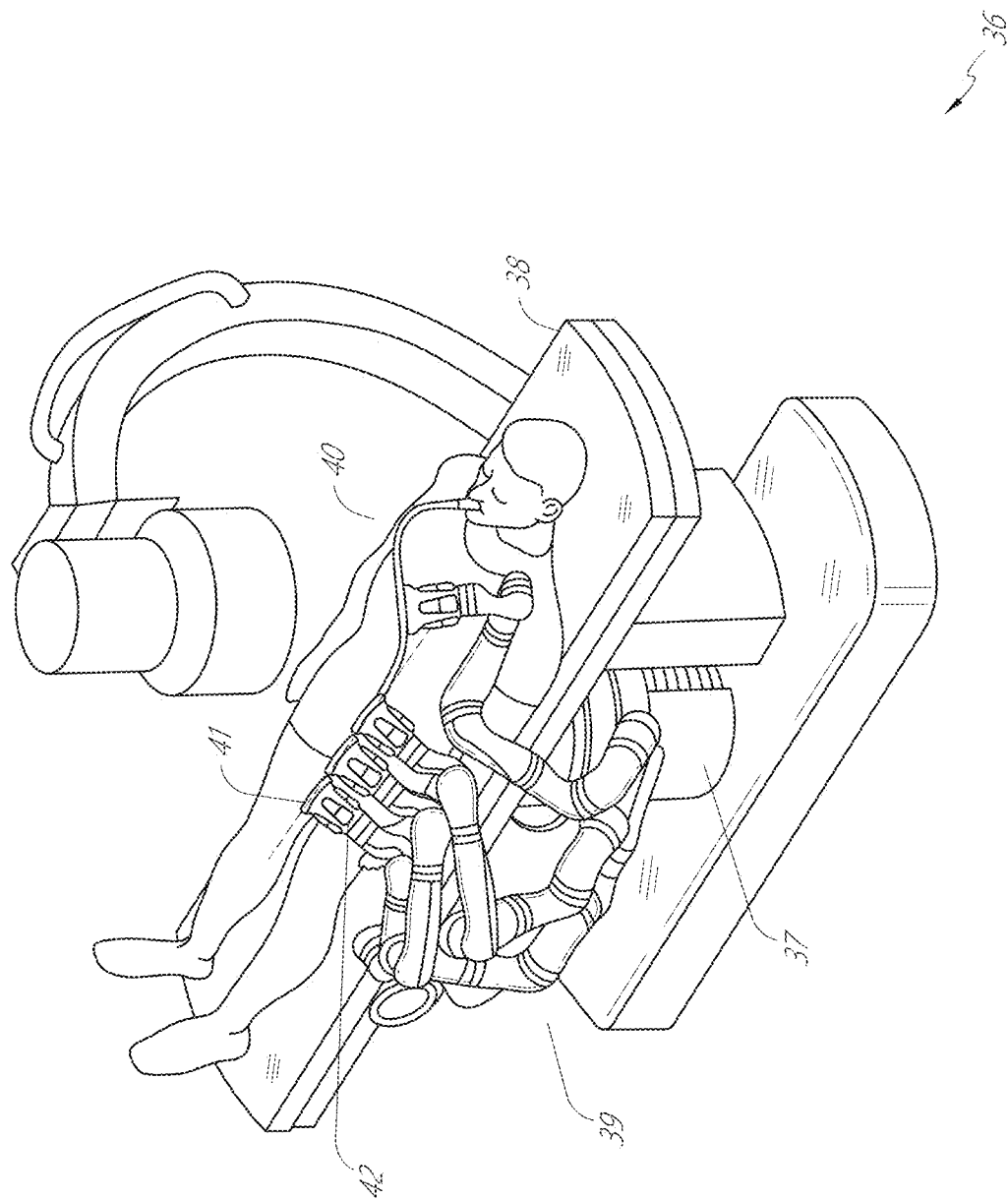
FIG. 5 illustrates an embodiment of a table-based robotic system arranged for a bronchoscopy procedure.

Embodiments of the robotically-enabled medical system may also incorporate the patient's table. Incorporation of the table reduces the amount of capital equipment within the operating room by removing the cart, which allows greater access to the patient. FIG. 5 illustrates an embodiment of such a robotically-enabled system arranged for a bronchoscopy procedure. System 36 includes a support structure or column 37 for supporting platform 38 (shown as a "table" or "bed") over the floor. Much like in the cart-based systems, the end effectors of the robotic arms 39 of the system 36 comprise instrument drivers 42 that are designed to manipulate an elongated medical instrument, such as a bronchoscope 40 in FIG. 5, through or along a virtual rail 41 formed from the linear alignment of the instrument drivers 42. In practice, a C-arm for providing fluoroscopic imaging may be positioned over the patient's upper abdominal area by placing the emitter and detector around table 38.

Figure 6:
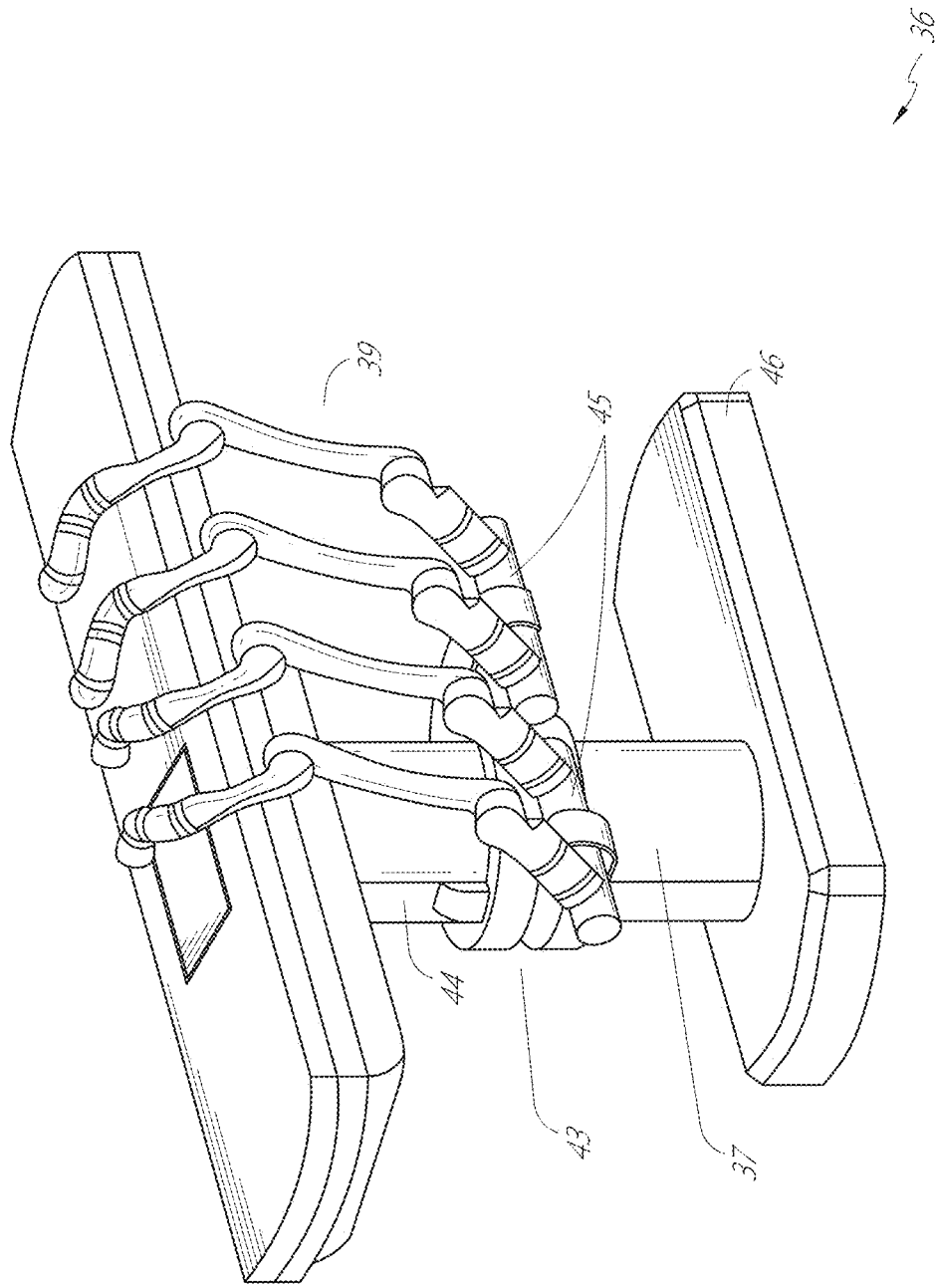
FIG. 6 provides an alternative view of the robotic system of FIG. 5.

FIG. 6 provides an alternative view of the system 36 without the patient and medical instrument for discussion purposes. As shown, the column 37 may include one or more carriages 43 shown as ring-shaped in the system 36, from which the one or more robotic arms 39 may be based. The carriages 43 may translate along a vertical column interface 44 that runs the length of the column 37 to provide different vantage points from which the robotic arms 39 may be positioned to reach the patient. The carriage(s) 43 may rotate around the column 37 using a mechanical motor positioned within the column 37 to allow the robotic arms 39 to have access to multiples sides of the table 38, such as, for example, both sides of the patient. In embodiments with multiple carriages, the carriages may be individually positioned on the column and may translate and/or rotate independent of the other carriages. While carriages 43 need not surround the column 37 or even be circular, the ring-shape as shown facilitates rotation of the carriages 43 around the column 37 while maintaining structural balance. Rotation and translation of the carriages 43 allows the system to align the medical instruments, such as endoscopes and laparoscopes, into different access points on the patient. In other embodiments (not shown), the system 36 can include a patient table or bed with adjustable arm supports in the form of bars or rails extending alongside it. One or more robotic arms 39 (e.g., via a shoulder with an elbow joint) can be attached to the adjustable arm supports, which can be vertically adjusted. By providing vertical adjustment, the robotic arms 39 are advantageously capable of being stowed compactly beneath the patient table or bed, and subsequently raised during a procedure.

Figure 9:
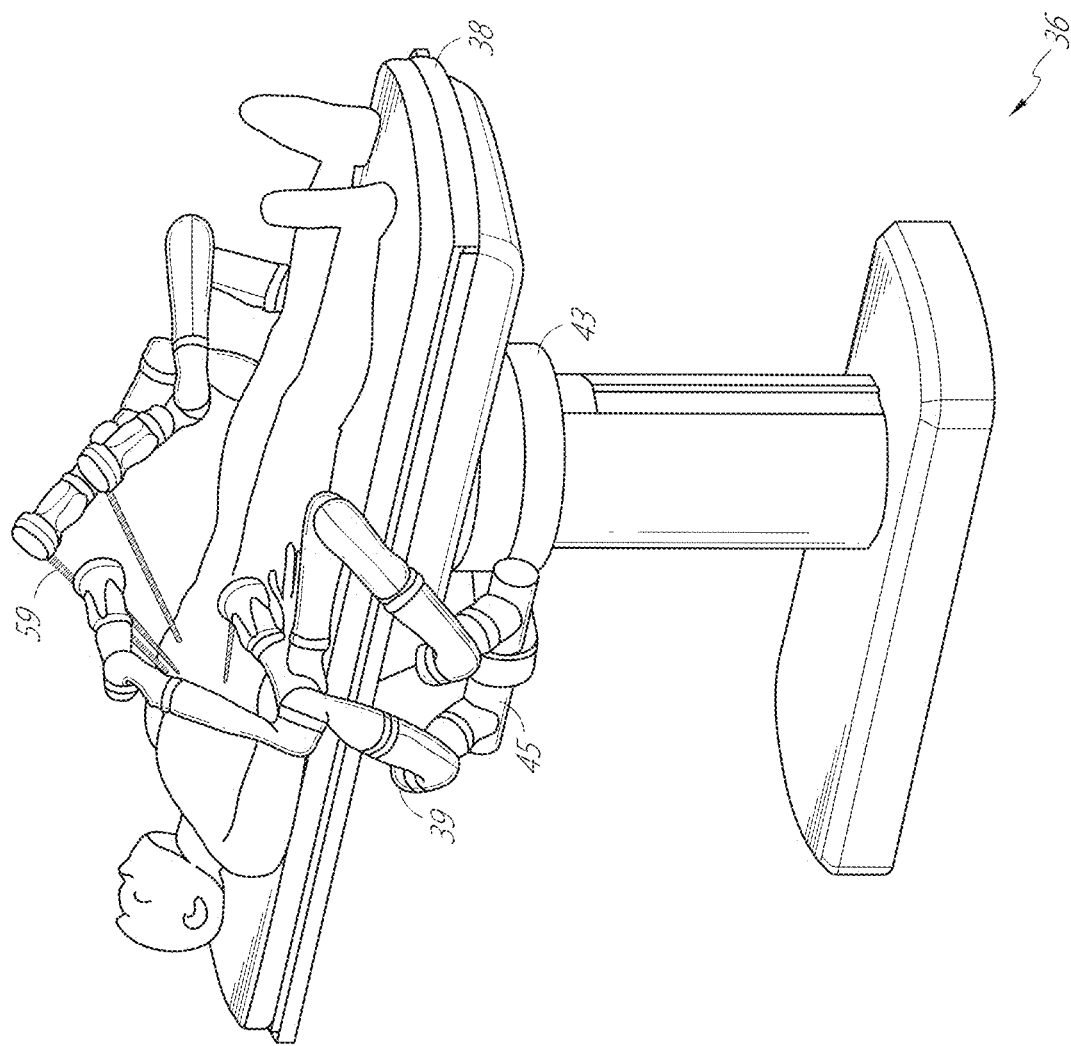
FIG. 9 illustrates an embodiment of a table-based robotic system configured for a laparoscopic procedure.

The arms 39 may be mounted on the carriages through a set of arm mounts 45 comprising a series of joints that may individually rotate and/or telescopically extend to provide additional configurability to the robotic arms 39. Additionally, the arm mounts 45 may be positioned on the carriages 43 such that, when the carriages 43 are appropriately rotated, the arm mounts 45 may be positioned on either the same side of table 38 (as shown in FIG. 6), on opposite sides of table 38 (as shown in FIG. 9), or on adjacent sides of the table 38 (not shown).

The column 37 structurally provides support for the table 38, and a path for vertical translation of the carriages. Internally, the column 37 may be equipped with lead screws for guiding vertical translation of the carriages, and motors to mechanize the translation of said carriages based the lead screws. The column 37 may also convey power and control signals to the carriage 43 and robotic arms 39 mounted thereon.

The table base 46 serves a similar function as the cart base 15 in cart 11 shown in FIG. 2, housing heavier components to balance the table/bed 38, the column 37, the carriages 43, and the robotic arms 39. The table base 46 may also incorporate rigid casters to provide stability during procedures. Deployed from the bottom of the table base 46, the casters may extend in opposite directions on both sides of the base 46 and retract when the system 36 needs to be moved.

Continuing with FIG. 6, the system 36 may also include a tower (not shown) that divides the functionality of system 36 between table and tower to reduce the form factor and bulk of the table. As in earlier disclosed embodiments, the tower may provide a variety of support functionalities to table, such as processing, computing, and control capabilities, power, fluidics, and/or optical and sensor processing. The tower may also be movable to be positioned away from the patient to improve physician access and de-clutter the operating room. Additionally, placing components in the tower allows for more storage space in the table base for potential stowage of the robotic arms. The tower may also include a master controller or console that provides both a user interface for user input, such as keyboard and/or pendant, as well as a display screen (or touchscreen) for pre-operative and intra-operative information, such as real-time imaging, navigation, and tracking information. In some embodiments, the tower may also contain holders for gas tanks to be used for insufflation.

Figure 7:
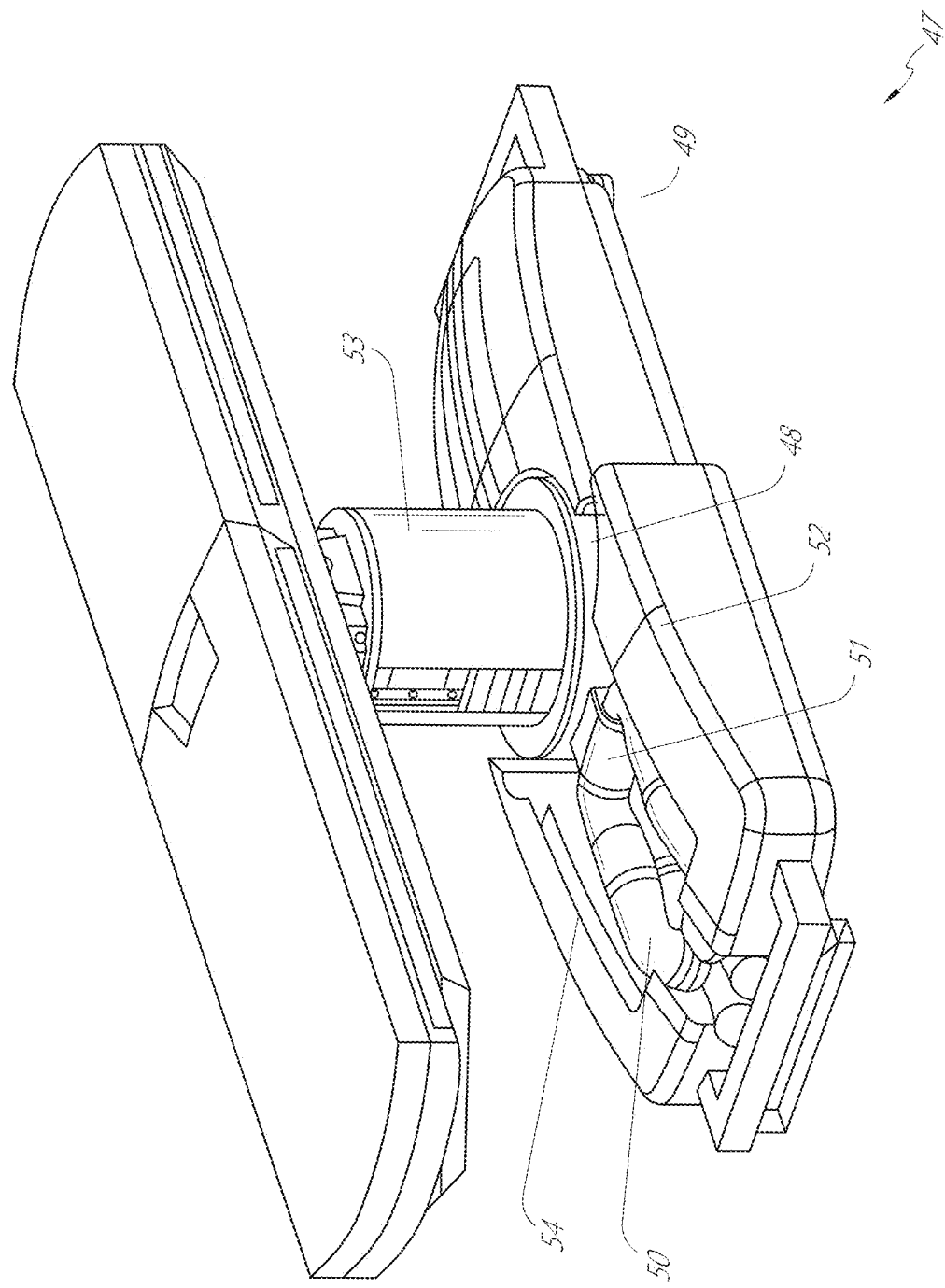
FIG. 7 illustrates an example system configured to stow robotic arm(s).

In some embodiments, a table base may stow and store the robotic arms when not in use. FIG. 7 illustrates a system 47 that stows robotic arms in an embodiment of the table-based system. In system 47, carriages 48 may be vertically translated into base 49 to stow robotic arms 50, arm mounts 51, and the carriages 48 within the base 49. Base covers 52 may be translated and retracted open to deploy the carriages 48, arm mounts 51, and arms 50 around column 53, and closed to stow to protect them when not in use. The base covers 52 may be sealed with a membrane 54 along the edges of its opening to prevent dirt and fluid ingress when closed.

Figure 8:
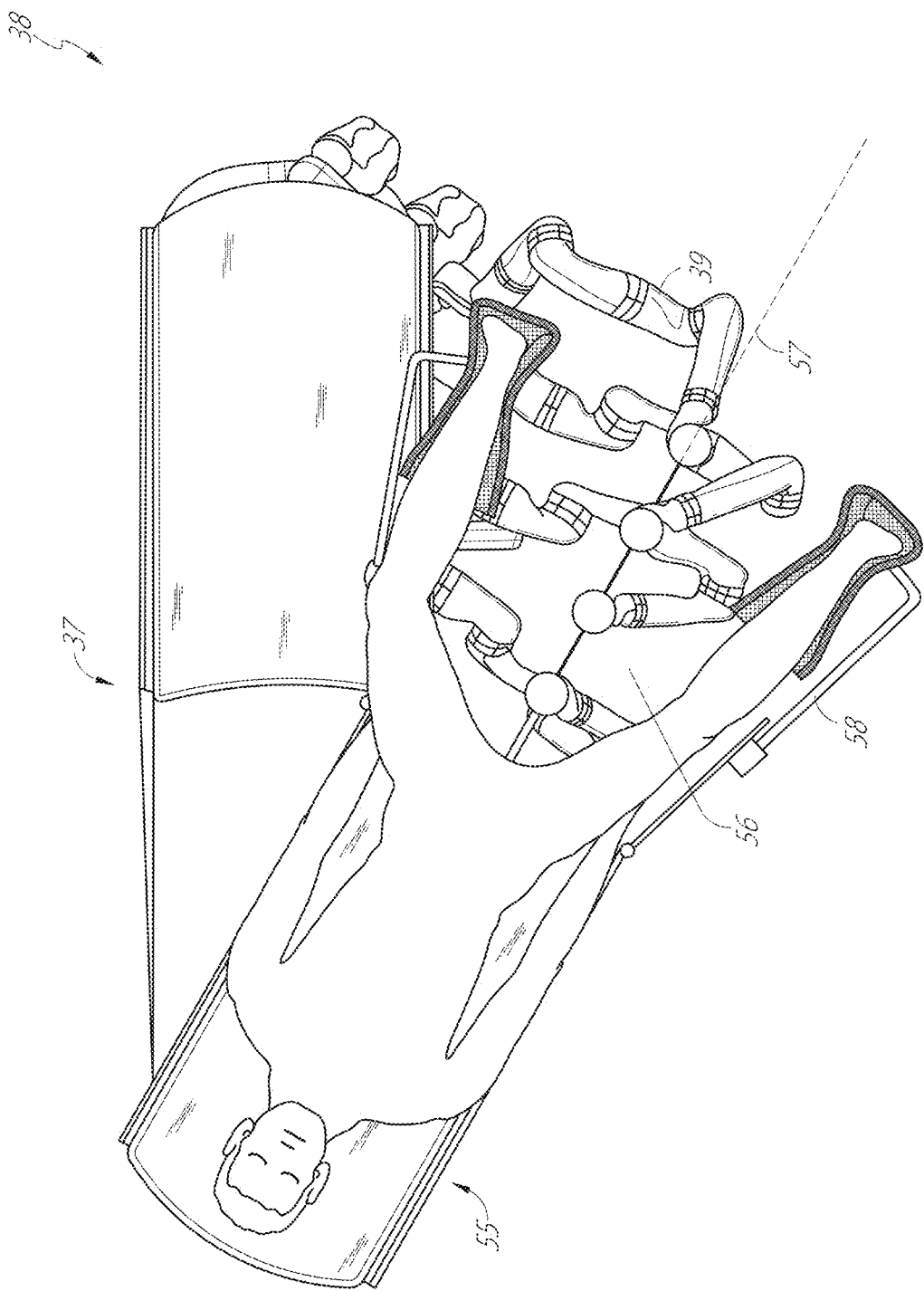
FIG. 8 illustrates an embodiment of a table-based robotic system configured for a ureteroscopy procedure.

FIG. 8 illustrates an embodiment of a robotically-enabled table-based system configured for a ureteroscopy procedure. In a ureteroscopy, the table 38 may include a swivel portion 55 for positioning a patient off-angle from the column 37 and table base 46. The swivel portion 55 may rotate or pivot around a pivot point (e.g., located below the patient's head) in order to position the bottom portion of the swivel portion 55 away from the column 37. For example, the pivoting of the swivel portion 55 allows a C-arm (not shown) to be positioned over the patient's lower abdomen without competing for space with the column (not shown) below table 38. By rotating the carriage 35 (not shown) around the column 37, the robotic arms 39 may directly insert a ureteroscope 56 along a virtual rail 57 into the patient's groin area to reach the urethra. In a ureteroscopy, stirrups 58 may also be fixed to the swivel portion 55 of the table 38 to support the position of the patient's legs during the procedure and allow clear access to the patient's groin area.

In a laparoscopic procedure, through small incision(s) in the patient's abdominal wall, minimally invasive instruments may be inserted into the patient's anatomy. In some embodiments, the minimally invasive instruments comprise an elongated rigid member, such as a shaft, which is used to access anatomy within the patient. After inflation of the patient's abdominal cavity, the instruments may be directed to perform surgical or medical tasks, such as grasping, cutting, ablating, suturing, etc. In some embodiments, the instruments can comprise a scope, such as a laparoscope. FIG. 9 illustrates an embodiment of a robotically-enabled table-based system configured for a laparoscopic procedure. As shown in FIG. 9, the carriages 43 of the system 36 may be rotated and vertically adjusted to position pairs of the robotic arms 39 on opposite sides of the table 38, such that instrument 59 may be positioned using the arm mounts 45 to be passed through minimal incisions on both sides of the patient to reach his/her abdominal cavity.

Figure 10:
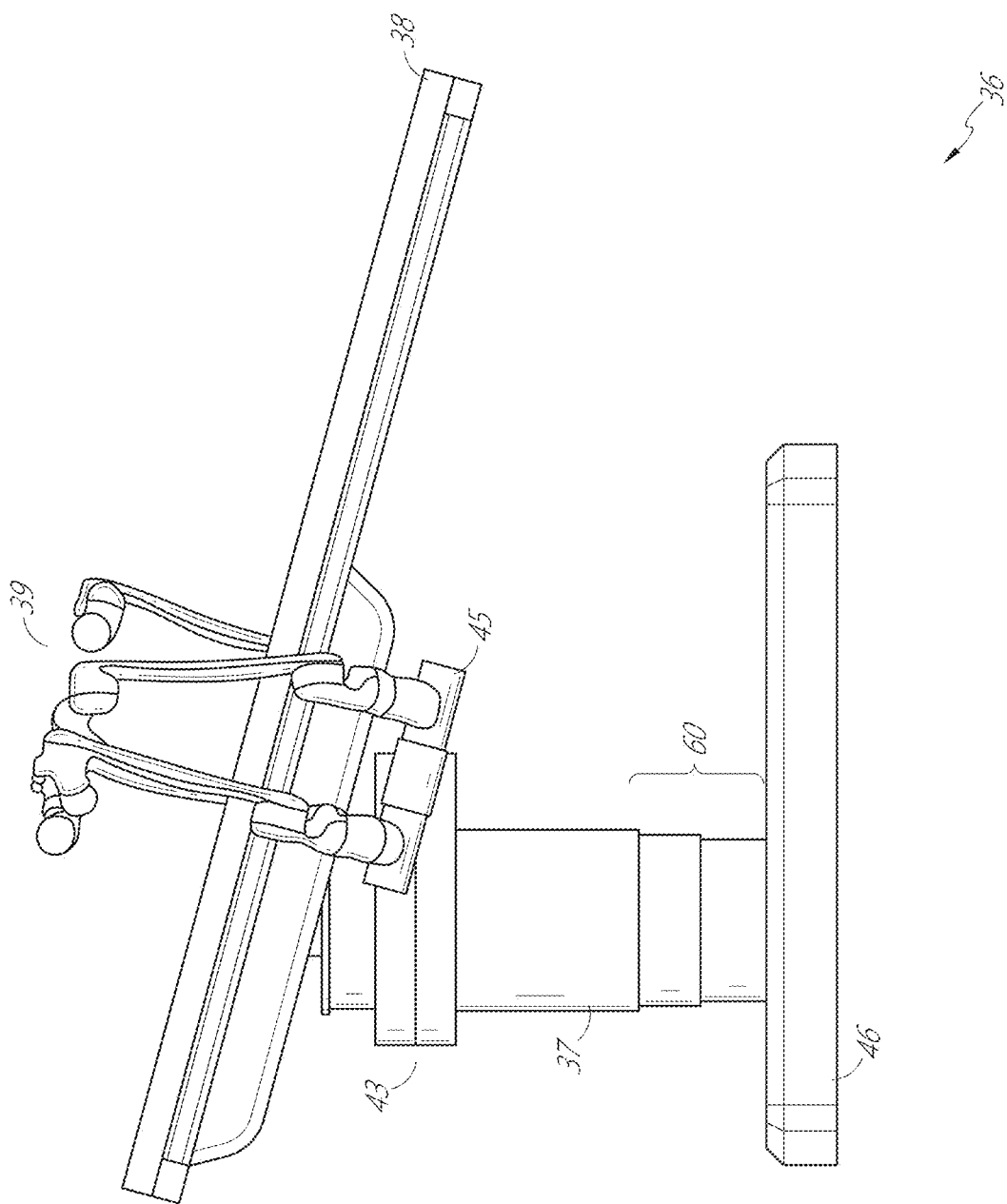
FIG. 10 illustrates an embodiment of the table-based robotic system of FIGS. 5-9 with pitch or tilt adjustment.

To accommodate laparoscopic procedures, the robotically-enabled table system may also tilt the platform to a desired angle. FIG. 10 illustrates an embodiment of the robotically-enabled medical system with pitch or tilt adjustment. As shown in FIG. 10, the system 36 may accommodate tilt of the table 38 to position one portion of the table at a greater distance from the floor than the other. Additionally, the arm mounts 45 may rotate to match the tilt such that the arms 39 maintain the same planar relationship with table 38. To accommodate steeper angles, the column 37 may also include telescoping portions 60 that allow vertical extension of column 37 to keep the table 38 from touching the floor or colliding with base 46.

Figure 11:
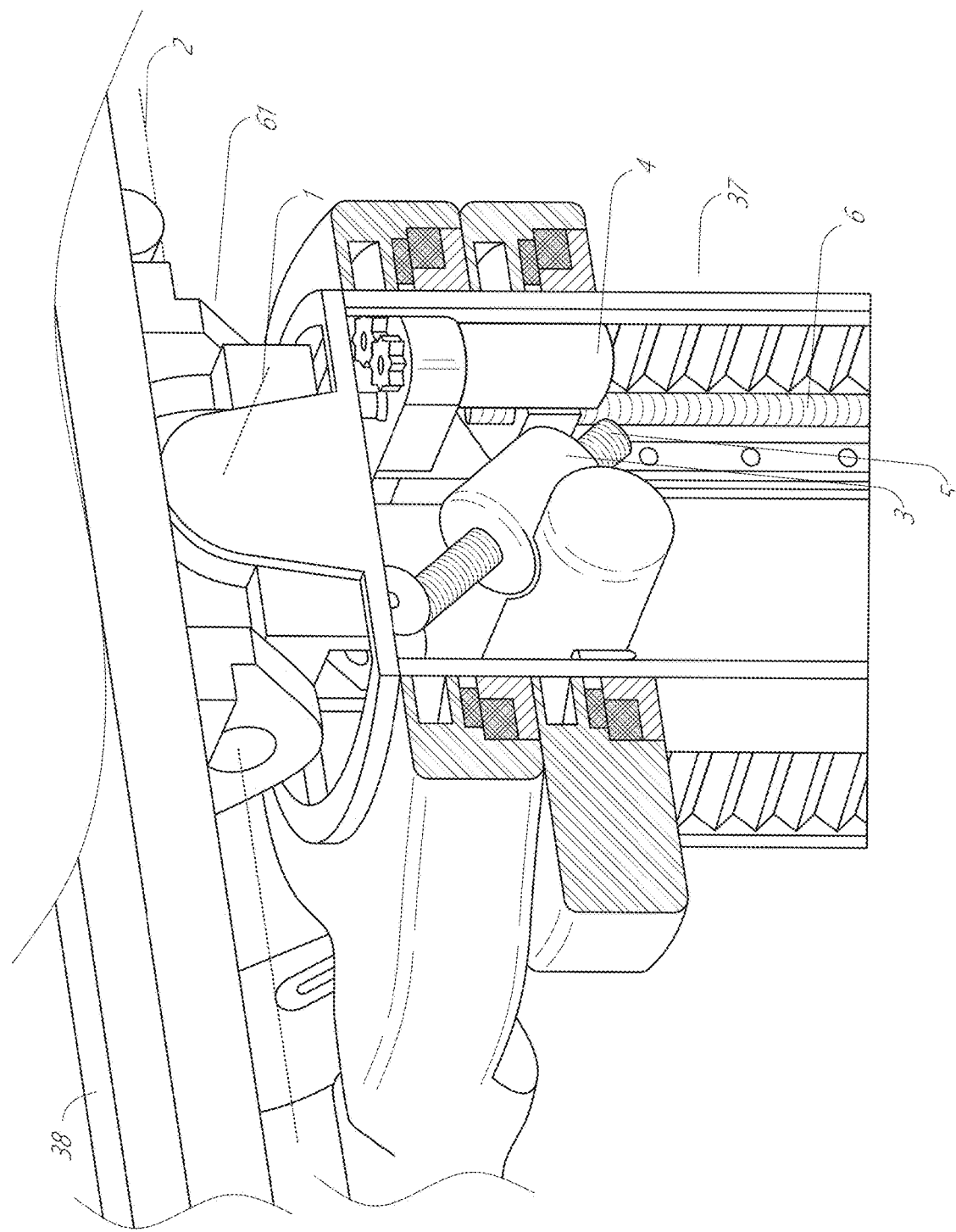
FIG. 11 provides a detailed illustration of the interface between the table and the column of the table-based robotic system of FIGS. 5-10.

FIG. 11 provides a detailed illustration of the interface between the table 38 and the column 37. Pitch rotation mechanism 61 may be configured to alter the pitch angle of the table 38 relative to the column 37 in multiple degrees of freedom. The pitch rotation mechanism 61 may be enabled by the positioning of orthogonal axes 1, 2 at the column-table interface, each axis actuated by a separate motor 3, 4 responsive to an electrical pitch angle command. Rotation along one screw 5 would enable tilt adjustments in one axis 1, while rotation along the other screw 6 would enable tilt adjustments along the other axis 2. In some embodiments, a ball joint can be used to alter the pitch angle of the table 38 relative to the column 37 in multiple degrees of freedom.

For example, pitch adjustments are particularly useful when trying to position the table in a Trendelenburg position, i.e., position the patient's lower abdomen at a higher position from the floor than the patient's lower abdomen, for lower abdominal surgery. The Trendelenburg position causes the patient's internal organs to slide towards his/her upper abdomen through the force of gravity, clearing out the abdominal cavity for minimally invasive tools to enter and perform lower abdominal surgical or medical procedures, such as laparoscopic prostatectomy.

Figure 12:
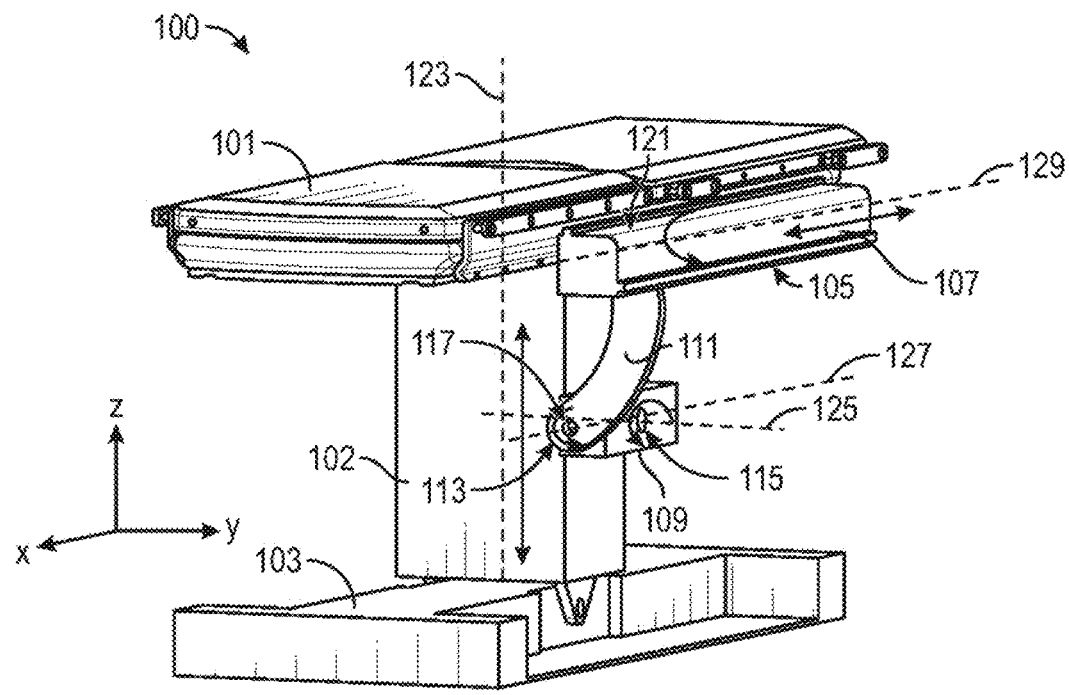
FIG. 12 illustrates an alternative embodiment of a table-based robotic system.
Figure 13:
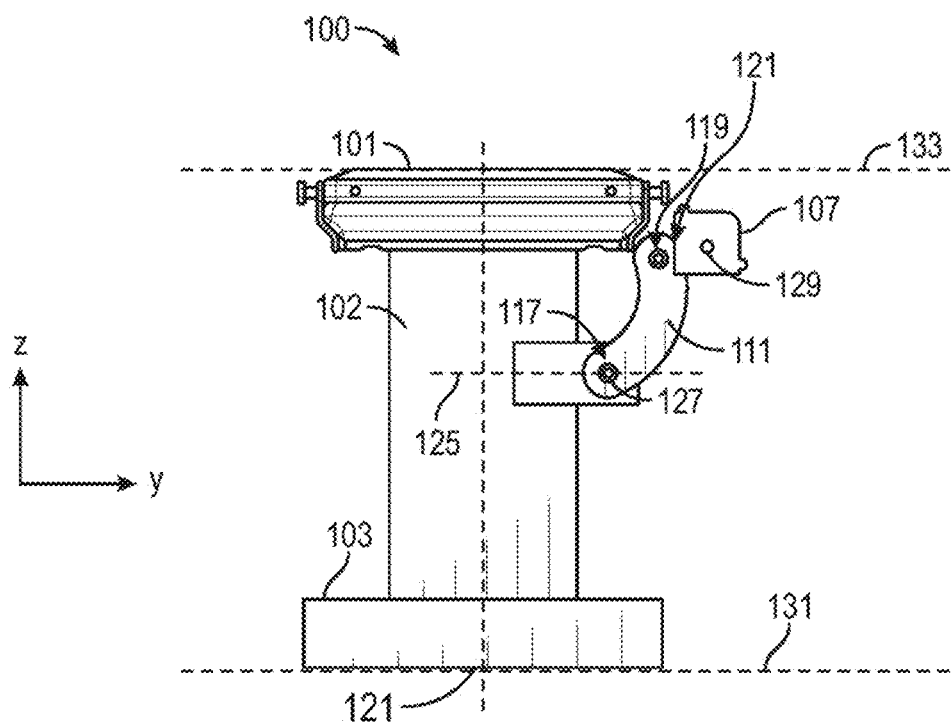
FIG. 13 illustrates an end view of the table-based robotic system of FIG. 12.

FIGS. 12 and 13 illustrate isometric and end views of an alternative embodiment of a table-based surgical robotics system 100. The surgical robotics system 100 includes one or more adjustable arm supports 105 that can be configured to support one or more robotic arms (see, for example, FIG. 14) relative to a table 101. In the illustrated embodiment, a single adjustable arm support 105 is shown, though an additional arm support can be provided on an opposite side of the table 101. The adjustable arm support 105 can be configured so that it can move relative to the table 101 to adjust and/or vary the position of the adjustable arm support 105 and/or any robotic arms mounted thereto relative to the table 101. For example, the adjustable arm support 105 may be adjusted one or more degrees of freedom relative to the table 101. The adjustable arm support 105 provides high versatility to the system 100, including the ability to easily stow the one or more adjustable arm supports 105 and any robotics arms attached thereto beneath the table 101. The adjustable arm support 105 can be elevated from the stowed position to a position below an upper surface of the table 101. In other embodiments, the adjustable arm support 105 can be elevated from the stowed position to a position above an upper surface of the table 101.

The adjustable arm support 105 can provide several degrees of freedom, including lift, lateral translation, tilt, etc. In the illustrated embodiment of FIGS. 12 and 13, the arm support 105 is configured with four degrees of freedom, which are illustrated with arrows in FIG. 12. A first degree of freedom allows for adjustment of the adjustable arm support 105 in the z-direction ("Z-lift"). For example, the adjustable arm support 105 can include a carriage 109 configured to move up or down along or relative to a column 102 supporting the table 101. A second degree of freedom can allow the adjustable arm support 105 to tilt. For example, the adjustable arm support 105 can include a rotary joint, which can allow the adjustable arm support 105 to be aligned with the bed in a Trendelenburg position. A third degree of freedom can allow the adjustable arm support 105 to "pivot up," which can be used to adjust a distance between a side of the table 101 and the adjustable arm support 105. A fourth degree of freedom can permit translation of the adjustable arm support 105 along a longitudinal length of the table.

The surgical robotics system 100 in FIGS. 12 and 13 can comprise a table supported by a column 102 that is mounted to a base 103. The base 103 and the column 102 support the table 101 relative to a support surface. A floor axis 131 and a support axis 133 are shown in FIG. 13.

The adjustable arm support 105 can be mounted to the column 102. In other embodiments, the arm support 105 can be mounted to the table 101 or base 103. The adjustable arm support 105 can include a carriage 109, a bar or rail connector 111 and a bar or rail 107. In some embodiments, one or more robotic arms mounted to the rail 107 can translate and move relative to one another.

The carriage 109 can be attached to the column 102 by a first joint 113, which allows the carriage 109 to move relative to the column 102 (e.g., such as up and down a first or vertical axis 123). The first joint 113 can provide the first degree of freedom ("Z-lift") to the adjustable arm support 105. The adjustable arm support 105 can include a second joint 115, which provides the second degree of freedom (tilt) for the adjustable arm support 105. The adjustable arm support 105 can include a third joint 117, which can provide the third degree of freedom ("pivot up") for the adjustable arm support 105. An additional joint 119 (shown in FIG. 13) can be provided that mechanically constrains the third joint 117 to maintain an orientation of the rail 107 as the rail connector 111 is rotated about a third axis 127. The adjustable arm support 105 can include a fourth joint 121, which can provide a fourth degree of freedom (translation) for the adjustable arm support 105 along a fourth axis 129.

Figure 14:
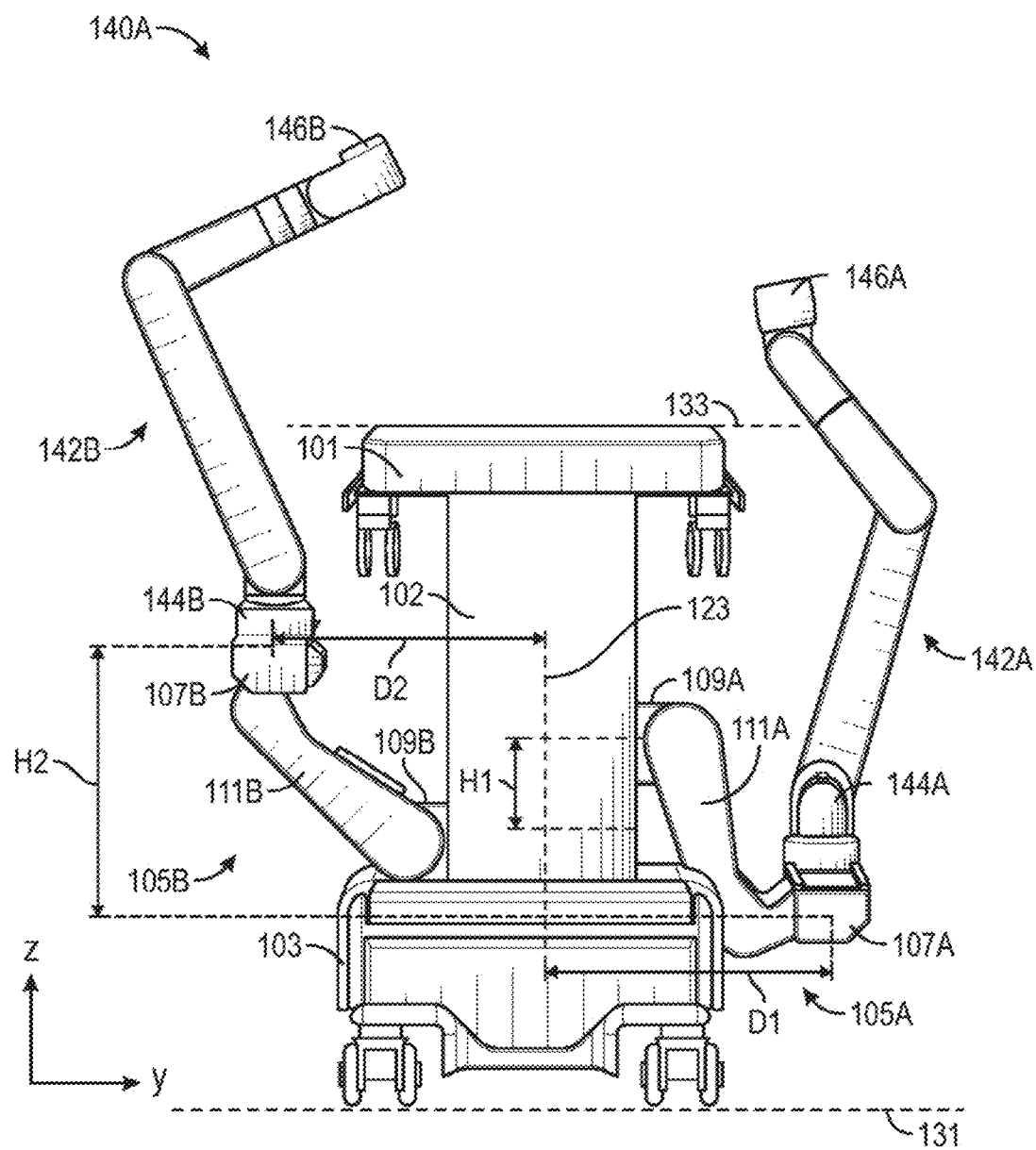
FIG. 14 illustrates an end view of a table-based robotic system with robotic arms attached thereto.

FIG. 14 illustrates an end view of the surgical robotics system 140A with two adjustable arm supports 105A, 105B mounted on opposite sides of a table 101. A first robotic arm 142A is attached to the bar or rail 107A of the first adjustable arm support 105B. The first robotic arm 142A includes a base 144A attached to the rail 107A. The distal end of the first robotic arm 142A includes an instrument drive mechanism 146A that can attach to one or more robotic medical instruments or tools. Similarly, the second robotic arm 142B includes a base 144B attached to the rail 107B. The distal end of the second robotic arm 142B includes an instrument drive mechanism 146B. The instrument drive mechanism 146B can be configured to attach to one or more robotic medical instruments or tools.

In some embodiments, one or more of the robotic arms 142A, 142B comprises an arm with seven or more degrees of freedom. In some embodiments, one or more of the robotic arms 142A, 142B can include eight degrees of freedom, including an insertion axis (1-degree of freedom including insertion), a wrist (3-degrees of freedom including wrist pitch, yaw and roll), an elbow (1-degree of freedom including elbow pitch), a shoulder (2-degrees of freedom including shoulder pitch and yaw), and base 144A, 144B (1-degree of freedom including translation). In some embodiments, the insertion degree of freedom can be provided by the robotic arm 142A, 142B, while in other embodiments, the instrument itself provides insertion via an instrument-based insertion architecture.

C. Instrument Driver & Interface.

The end effectors of the system's robotic arms comprise (i) an instrument driver (alternatively referred to as "instrument drive mechanism" or "instrument device manipulator") that incorporate electro-mechanical means for actuating the medical instrument and (ii) a removable or detachable medical instrument, which may be devoid of any electro-mechanical components, such as motors. This dichotomy may be driven by the need to sterilize medical instruments used in medical procedures, and the inability to adequately sterilize expensive capital equipment due to their intricate mechanical assemblies and sensitive electronics. Accordingly, the medical instruments may be designed to be detached, removed, and interchanged from the instrument driver (and thus the system) for individual sterilization or disposal by the physician or the physician's staff. In contrast, the instrument drivers need not be changed or sterilized, and may be draped for protection.

Figure 15:
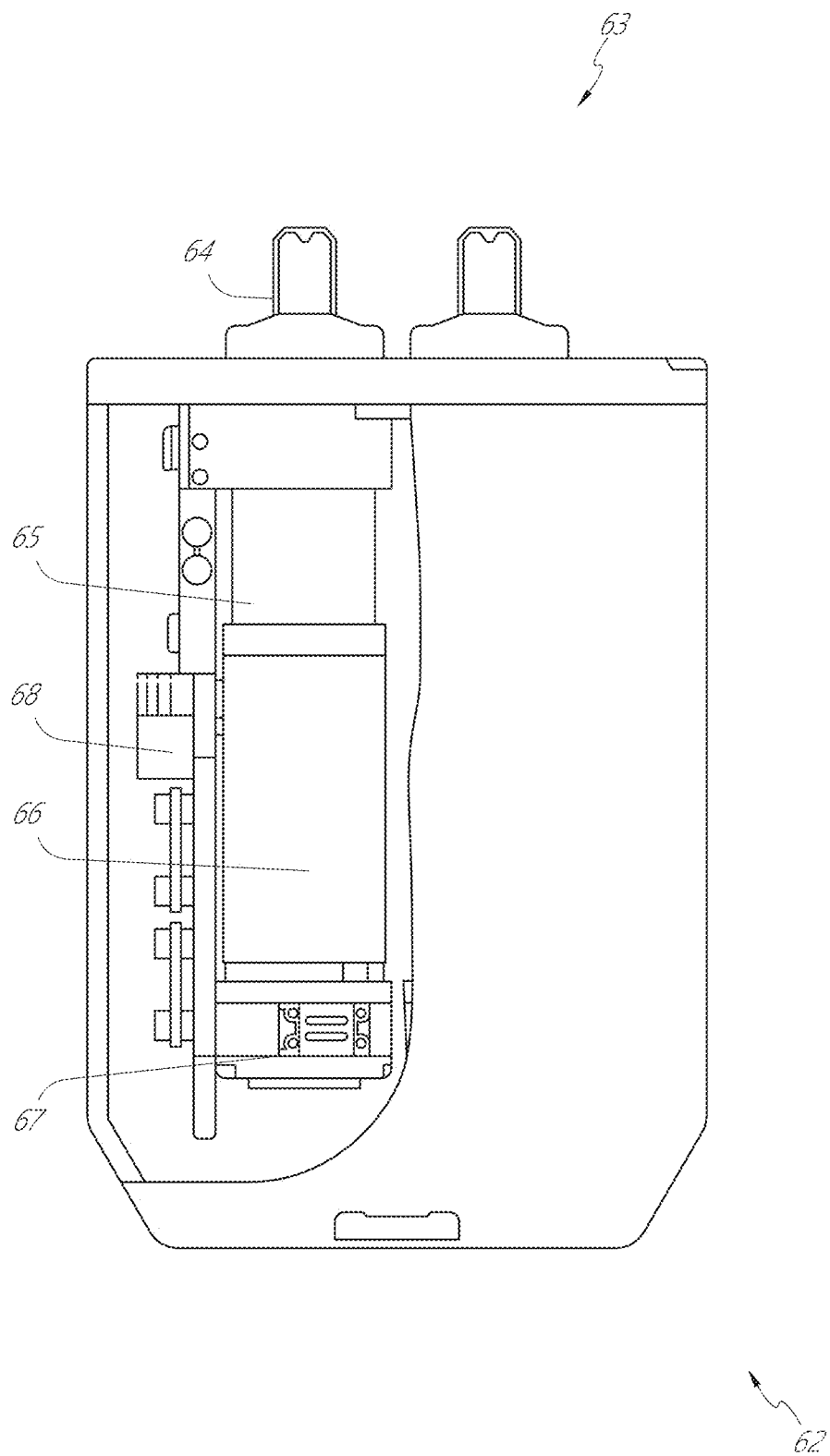
FIG. 15 illustrates an exemplary instrument driver.

FIG. 15 illustrates an example instrument driver. Positioned at the distal end of a robotic arm, instrument driver 62 comprises of one or more drive units 63 arranged with parallel axes to provide controlled torque to a medical instrument via drive shafts 64. Each drive unit 63 comprises an individual drive shaft 64 for interacting with the instrument, a gear head 65 for converting the motor shaft rotation to a desired torque, a motor 66 for generating the drive torque, an encoder 67 to measure the speed of the motor shaft and provide feedback to the control circuitry, and control circuity 68 for receiving control signals and actuating the drive unit. Each drive unit 63 being independent controlled and motorized, the instrument driver 62 may provide multiple (four as shown in FIG. 15) independent drive outputs to the medical instrument. In operation, the control circuitry 68 would receive a control signal, transmit a motor signal to the motor 66, compare the resulting motor speed as measured by the encoder 67 with the desired speed, and modulate the motor signal to generate the desired torque.

For procedures that require a sterile environment, the robotic system may incorporate a drive interface, such as a sterile adapter connected to a sterile drape, that sits between the instrument driver and the medical instrument. The chief purpose of the sterile adapter is to transfer angular motion from the drive shafts of the instrument driver to the drive inputs of the instrument while maintaining physical separation, and thus sterility, between the drive shafts and drive inputs. Accordingly, an example sterile adapter may comprise of a series of rotational inputs and outputs intended to be mated with the drive shafts of the instrument driver and drive inputs on the instrument. Connected to the sterile adapter, the sterile drape, comprised of a thin, flexible material such as transparent or translucent plastic, is designed to cover the capital equipment, such as the instrument driver, robotic arm, and cart (in a cart-based system) or table (in a table-based system). Use of the drape would allow the capital equipment to be positioned proximate to the patient while still being located in an area not requiring sterilization (i.e., non-sterile field). On the other side of the sterile drape, the medical instrument may interface with the patient in an area requiring sterilization (i.e., sterile field).

D. Medical Instrument.

Figure 16:
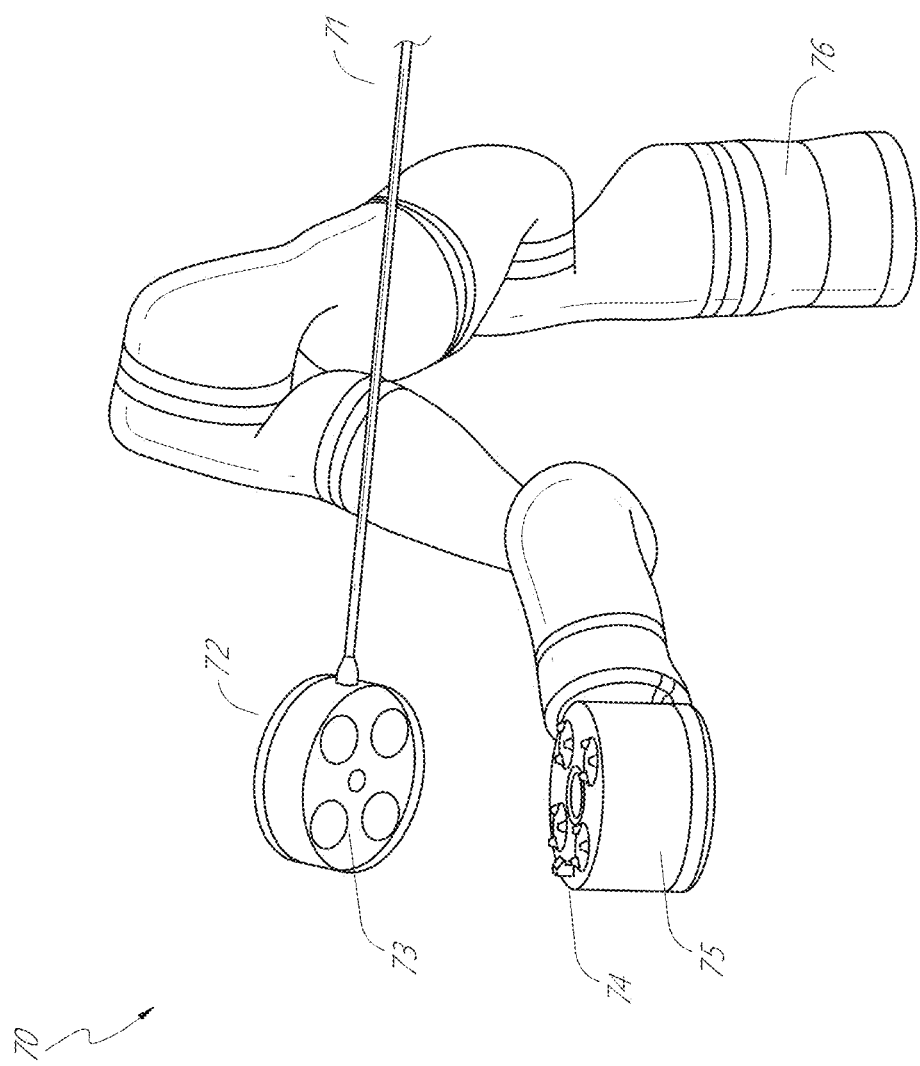
FIG. 16 illustrates an exemplary medical instrument with a paired instrument driver.

FIG. 16 illustrates an example medical instrument with a paired instrument driver. Like other instruments designed for use with a robotic system, medical instrument 70 comprises an elongated shaft 71 (or elongate body) and an instrument base 72. The instrument base 72, also referred to as an "instrument handle" due to its intended design for manual interaction by the physician, may generally comprise rotatable drive inputs 73, e.g., receptacles, pulleys or spools, that are designed to be mated with drive outputs 74 that extend through a drive interface on instrument driver 75 at the distal end of robotic arm 76. When physically connected, latched, and/or coupled, the mated drive inputs 73 of instrument base 72 may share axes of rotation with the drive outputs 74 in the instrument driver 75 to allow the transfer of torque from drive outputs 74 to drive inputs 73. In some embodiments, the drive outputs 74 may comprise splines that are designed to mate with receptacles on the drive inputs 73.

The elongated shaft 71 is designed to be delivered through either an anatomical opening or lumen, e.g., as in endoscopy, or a minimally invasive incision, e.g., as in laparoscopy. The elongated shaft 71 may be either flexible (e.g., having properties similar to an endoscope) or rigid (e.g., having properties similar to a laparoscope) or contain a customized combination of both flexible and rigid portions. When designed for laparoscopy, the distal end of a rigid elongated shaft may be connected to an end effector extending from a jointed wrist formed from a clevis with at least one degree of freedom and a surgical tool or medical instrument, such as, for example, a grasper or scissors, that may be actuated based on force from the tendons as the drive inputs rotate in response to torque received from the drive outputs 74 of the instrument driver 75. When designed for endoscopy, the distal end of a flexible elongated shaft may include a steerable or controllable bending section that may be articulated and bent based on torque received from the drive outputs 74 of the instrument driver 75.

Torque from the instrument driver 75 is transmitted down the elongated shaft 71 using tendons along the shaft 71. These individual tendons, such as pull wires, may be individually anchored to individual drive inputs 73 within the instrument handle 72. From the handle 72, the tendons are directed down one or more pull lumens along the elongated shaft 71 and anchored at the distal portion of the elongated shaft 71, or in the wrist at the distal portion of the elongated shaft. During a surgical procedure, such as a laparoscopic, endoscopic or hybrid procedure, these tendons may be coupled to a distally mounted end effector, such as a wrist, grasper, or scissor. Under such an arrangement, torque exerted on drive inputs 73 would transfer tension to the tendon, thereby causing the end effector to actuate in some way. In some embodiments, during a surgical procedure, the tendon may cause a joint to rotate about an axis, thereby causing the end effector to move in one direction or another. Alternatively, the tendon may be connected to one or more jaws of a grasper at distal end of the elongated shaft 71, where tension from the tendon cause the grasper to close.

In endoscopy, the tendons may be coupled to a bending or articulating section positioned along the elongated shaft 71 (e.g., at the distal end) via adhesive, control ring, or other mechanical fixation. When fixedly attached to the distal end of a bending section, torque exerted on drive inputs 73 would be transmitted down the tendons, causing the softer, bending section (sometimes referred to as the articulable section or region) to bend or articulate. Along the non-bending sections, it may be advantageous to spiral or helix the individual pull lumens that direct the individual tendons along (or inside) the walls of the endoscope shaft to balance the radial forces that result from tension in the pull wires. The angle of the spiraling and/or spacing there between may be altered or engineered for specific purposes, wherein tighter spiraling exhibits lesser shaft compression under load forces, while lower amounts of spiraling results in greater shaft compression under load forces, but also exhibits limits bending. On the other end of the spectrum, the pull lumens may be directed parallel to the longitudinal axis of the elongated shaft 71 to allow for controlled articulation in the desired bending or articulable sections.

In endoscopy, the elongated shaft 71 houses a number of components to assist with the robotic procedure. The shaft may comprise of a working channel for deploying surgical tools (or medical instruments), irrigation, and/or aspiration to the operative region at the distal end of the shaft 71. The shaft 71 may also accommodate wires and/or optical fibers to transfer signals to/from an optical assembly at the distal tip, which may include of an optical camera. The shaft 71 may also accommodate optical fibers to carry light from proximally-located light sources, such as light emitting diodes, to the distal end of the shaft.

At the distal end of the instrument 70, the distal tip may also comprise the opening of a working channel for delivering tools for diagnostic and/or therapy, irrigation, and aspiration to an operative site. The distal tip may also include a port for a camera, such as a fiberscope or a digital camera, to capture images of an internal anatomical space. Relatedly, the distal tip may also include ports for light sources for illuminating the anatomical space when using the camera.

In the example of FIG. 16, the drive shaft axes, and thus the drive input axes, are orthogonal to the axis of the elongated shaft. This arrangement, however, complicates roll capabilities for the elongated shaft 71. Rolling the elongated shaft 71 along its axis while keeping the drive inputs 73 static results in undesirable tangling of the tendons as they extend off the drive inputs 73 and enter pull lumens within the elongated shaft 71. The resulting entanglement of such tendons may disrupt any control algorithms intended to predict movement of the flexible elongated shaft during an endoscopic procedure.

Figure 17:
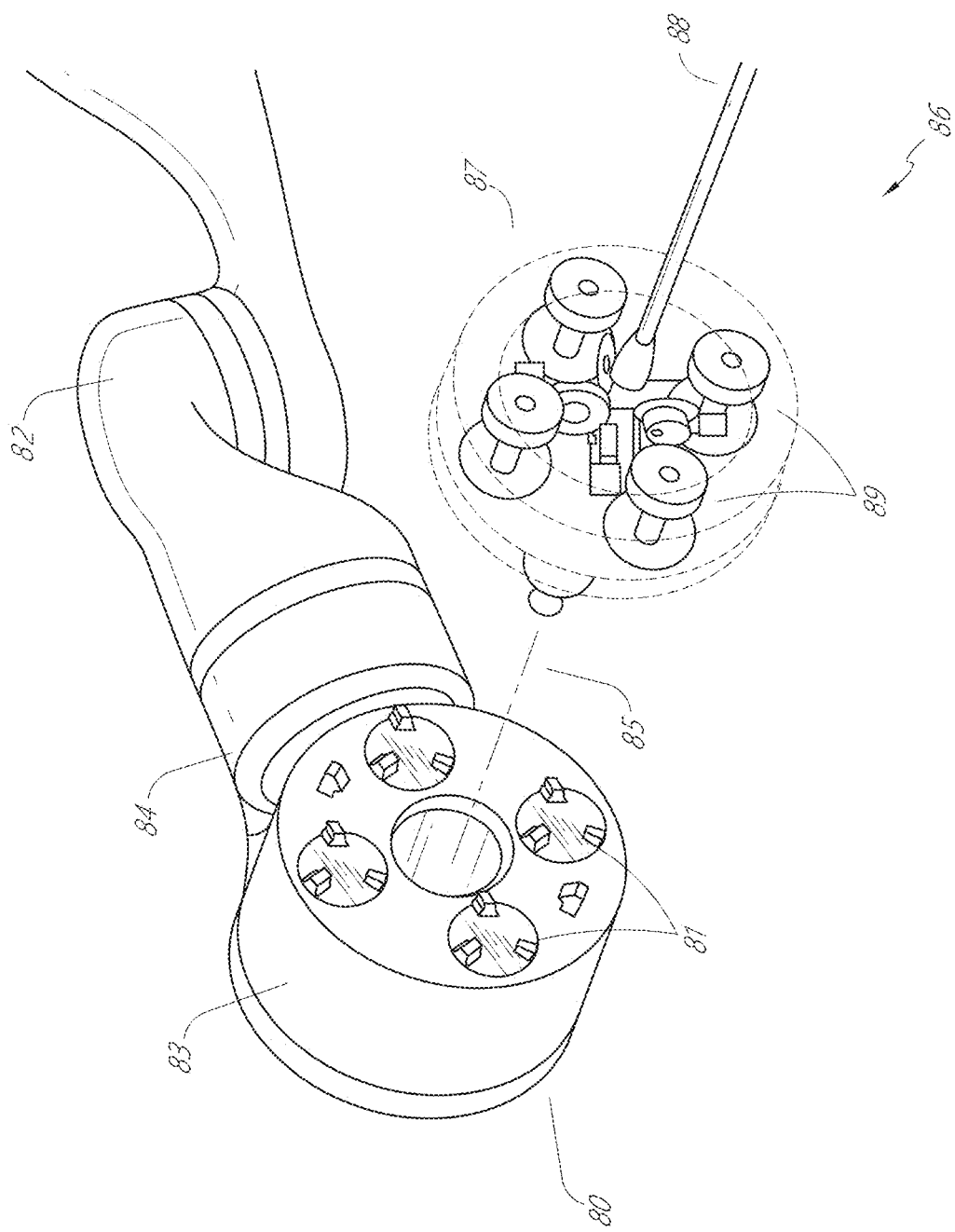
FIG. 17 illustrates an alternative design for an instrument driver and instrument where the axes of the drive units are parallel to the axis of the elongated shaft of the instrument.

FIG. 17 illustrates an alternative design for an instrument driver and instrument where the axes of the drive units are parallel to the axis of the elongated shaft of the instrument. As shown, a circular instrument driver 80 comprises four drive units with their drive outputs 81 aligned in parallel at the end of a robotic arm 82. The drive units, and their respective drive outputs 81, are housed in a rotational assembly 83 of the instrument driver 80 that is driven by one of the drive units within the assembly 83. In response to torque provided by the rotational drive unit, the rotational assembly 83 rotates along a circular bearing that connects the rotational assembly 83 to the non-rotational portion 84 of the instrument driver. Power and controls signals may be communicated from the non-rotational portion 84 of the instrument driver 80 to the rotational assembly 83 through electrical contacts and may be maintained through rotation by a brushed slip ring connection (not shown). In other embodiments, the rotational assembly 83 may be responsive to a separate drive unit that is integrated into the non-rotatable portion 84, and thus not in parallel to the other drive units. The rotational mechanism 83 allows the instrument driver 80 to rotate the drive units, and their respective drive outputs 81, as a single unit around an instrument driver axis 85.

Like earlier disclosed embodiments, an instrument 86 may comprise an elongated shaft portion 88 and an instrument base 87 (shown with a transparent external skin for discussion purposes) comprising a plurality of drive inputs 89 (such as receptacles, pulleys, and spools) that are configured to receive the drive outputs 81 in the instrument driver 80. Unlike prior disclosed embodiments, instrument shaft 88 extends from the center of instrument base 87 with an axis substantially parallel to the axes of the drive inputs 89, rather than orthogonal as in the design of FIG. 16.

When coupled to the rotational assembly 83 of the instrument driver 80, the medical instrument 86, comprising instrument base 87 and instrument shaft 88, rotates in combination with the rotational assembly 83 about the instrument driver axis 85. Since the instrument shaft 88 is positioned at the center of instrument base 87, the instrument shaft 88 is coaxial with instrument driver axis 85 when attached. Thus, rotation of the rotational assembly 83 causes the instrument shaft 88 to rotate about its own longitudinal axis. Moreover, as the instrument base 87 rotates with the instrument shaft 88, any tendons connected to the drive inputs 89 in the instrument base 87 are not tangled during rotation. Accordingly, the parallelism of the axes of the drive outputs 81, drive inputs 89, and instrument shaft 88 allows for the shaft rotation without tangling any control tendons.

Figure 18:
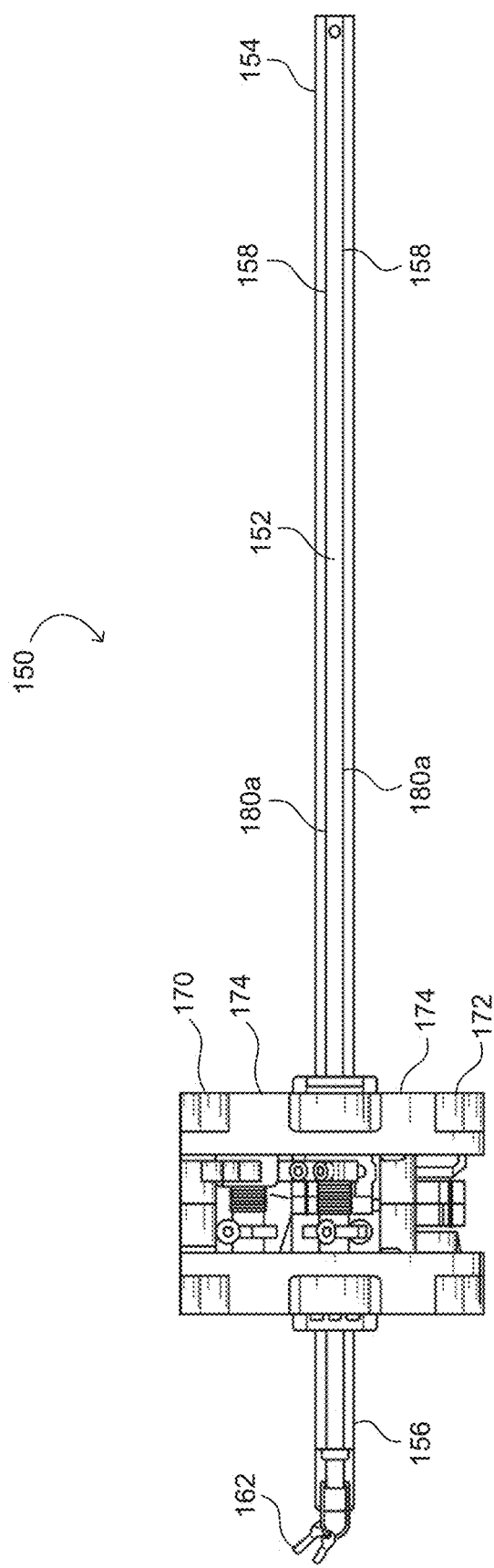
FIG. 18 illustrates an instrument having an instrument-based insertion architecture.

FIG. 18 illustrates an instrument having an instrument based insertion architecture in accordance with some embodiments. The instrument 150 can be coupled to any of the instrument drivers discussed above. The instrument 150 comprises an elongated shaft 152, an end effector 162 connected to the shaft 152, and a handle 170 coupled to the shaft 152. The elongated shaft 152 comprises a tubular member having a proximal portion 154 and a distal portion 156. The elongated shaft 152 comprises one or more channels or grooves 158 along its outer surface. The grooves 158 are configured to receive one or more wires or cables 180 therethrough. One or more cables 180 thus run along an outer surface of the elongated shaft 152. In other embodiments, cables 180 can also run through the elongated shaft 152. Manipulation of the one or more cables 180 (e.g., via an instrument driver) results in actuation of the end effector 162.

The instrument handle 170, which may also be referred to as an instrument base, may generally comprise an attachment interface 172 having one or more mechanical inputs 174, e.g., receptacles, pulleys or spools, that are designed to be reciprocally mated with one or more torque couplers on an attachment surface of an instrument driver.

In some embodiments, the instrument 150 comprises a series of pulleys or cables that enable the elongated shaft 152 to translate relative to the handle 170. In other words, the instrument 150 itself comprises an instrument-based insertion architecture that accommodates insertion of the instrument, thereby minimizing the reliance on a robot arm to provide insertion of the instrument 150. In other embodiments, a robotic arm can be largely responsible for instrument insertion.

E. Controller.

Any of the robotic systems described herein can include an input device or controller for manipulating an instrument attached to a robotic arm. In some embodiments, the controller can be coupled (e.g., communicatively, electronically, electrically, wirelessly and/or mechanically) with an instrument such that manipulation of the controller causes a corresponding manipulation of the instrument e.g., via master slave control.

Figure 19:
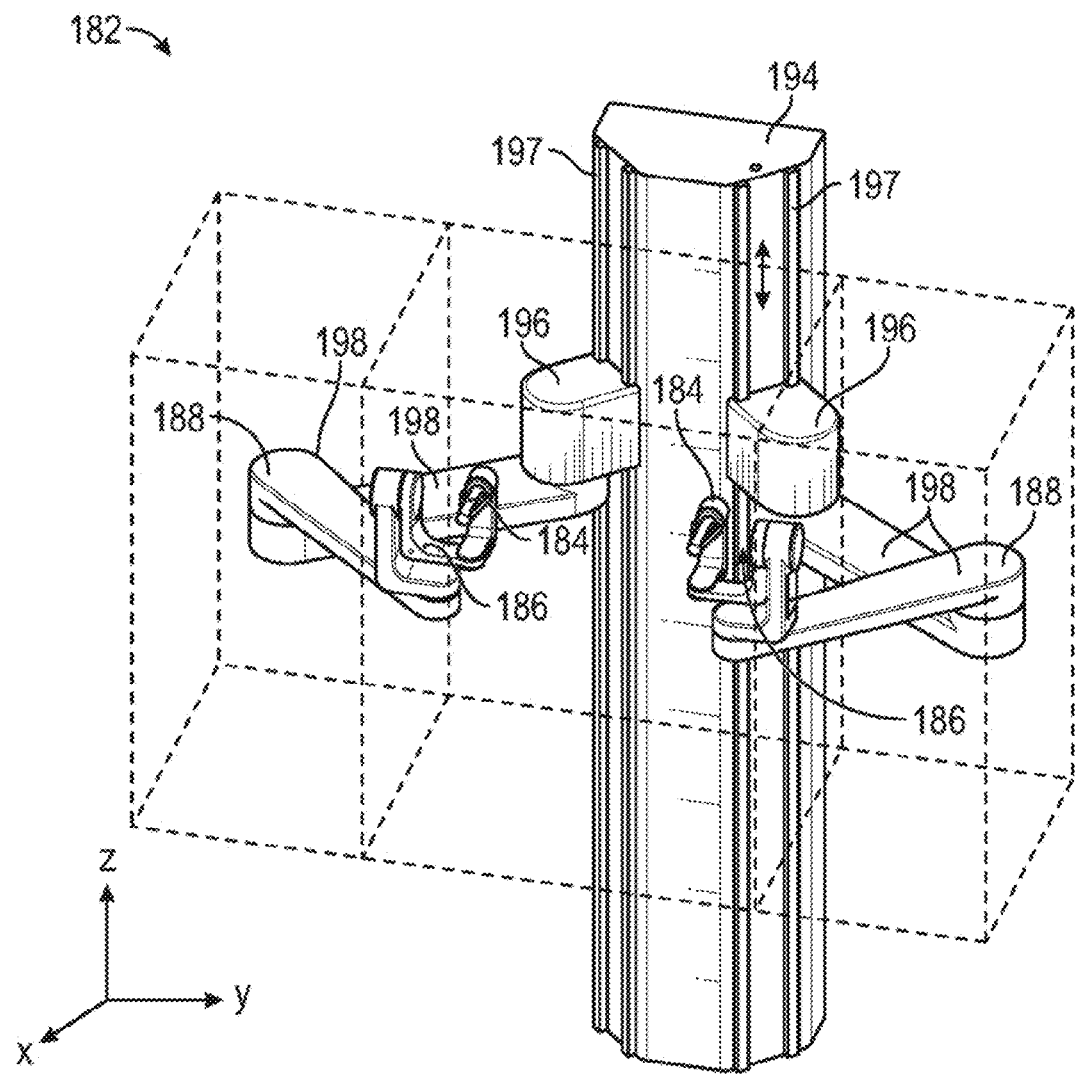
FIG. 19 illustrates an exemplary controller.

FIG. 19 is a perspective view of an embodiment of a controller 182. In the present embodiment, the controller 182 comprises a hybrid controller that can have both impedance and admittance control. In other embodiments, the controller 182 can utilize just impedance or passive control. In other embodiments, the controller 182 can utilize just admittance control. By being a hybrid controller, the controller 182 advantageously can have a lower perceived inertia while in use.

In the illustrated embodiment, the controller 182 is configured to allow manipulation of two medical instruments, and includes two handles 184. Each of the handles 184 is connected to a gimbal 186. Each gimbal 186 is connected to a positioning platform 188.

As shown in FIG. 19, each positioning platform 188 includes a SCARA arm (selective compliance assembly robot arm) 198 coupled to a column 194 by a prismatic joint 196. The prismatic joints 196 are configured to translate along the column 194 (e.g., along rails 197) to allow each of the handles 184 to be translated in the z-direction, providing a first degree of freedom. The SCARA arm 198 is configured to allow motion of the handle 184 in an x-y plane, providing two additional degrees of freedom.

In some embodiments, one or more load cells are positioned in the controller. For example, in some embodiments, a load cell (not shown) is positioned in the body of each of the gimbals 186. By providing a load cell, portions of the controller 182 are capable of operating under admittance control, thereby advantageously reducing the perceived inertia of the controller while in use. In some embodiments, the positioning platform 188 is configured for admittance control, while the gimbal 186 is configured for impedance control. In other embodiments, the gimbal 186 is configured for admittance control, while the positioning platform 188 is configured for impedance control. Accordingly, for some embodiments, the translational or positional degrees of freedom of the positioning platform 188 can rely on admittance control, while the rotational degrees of freedom of the gimbal 186 rely on impedance control.

F. Navigation and Control.

Traditional endoscopy may involve the use of fluoroscopy (e.g., as may be delivered through a C-arm) and other forms of radiation-based imaging modalities to provide endoluminal guidance to an operator physician. In contrast, the robotic systems contemplated by this disclosure can provide for non-radiation-based navigational and localization means to reduce physician exposure to radiation and reduce the amount of equipment within the operating room. As used herein, the term "localization" may refer to determining and/or monitoring the position of objects in a reference coordinate system. Technologies such as pre-operative mapping, computer vision, real-time EM tracking, and robot command data may be used individually or in combination to achieve a radiation-free operating environment. In other cases, where radiation-based imaging modalities are still used, the pre-operative mapping, computer vision, real-time EM tracking, and robot command data may be used individually or in combination to improve upon the information obtained solely through radiation-based imaging modalities.

Figure 20:
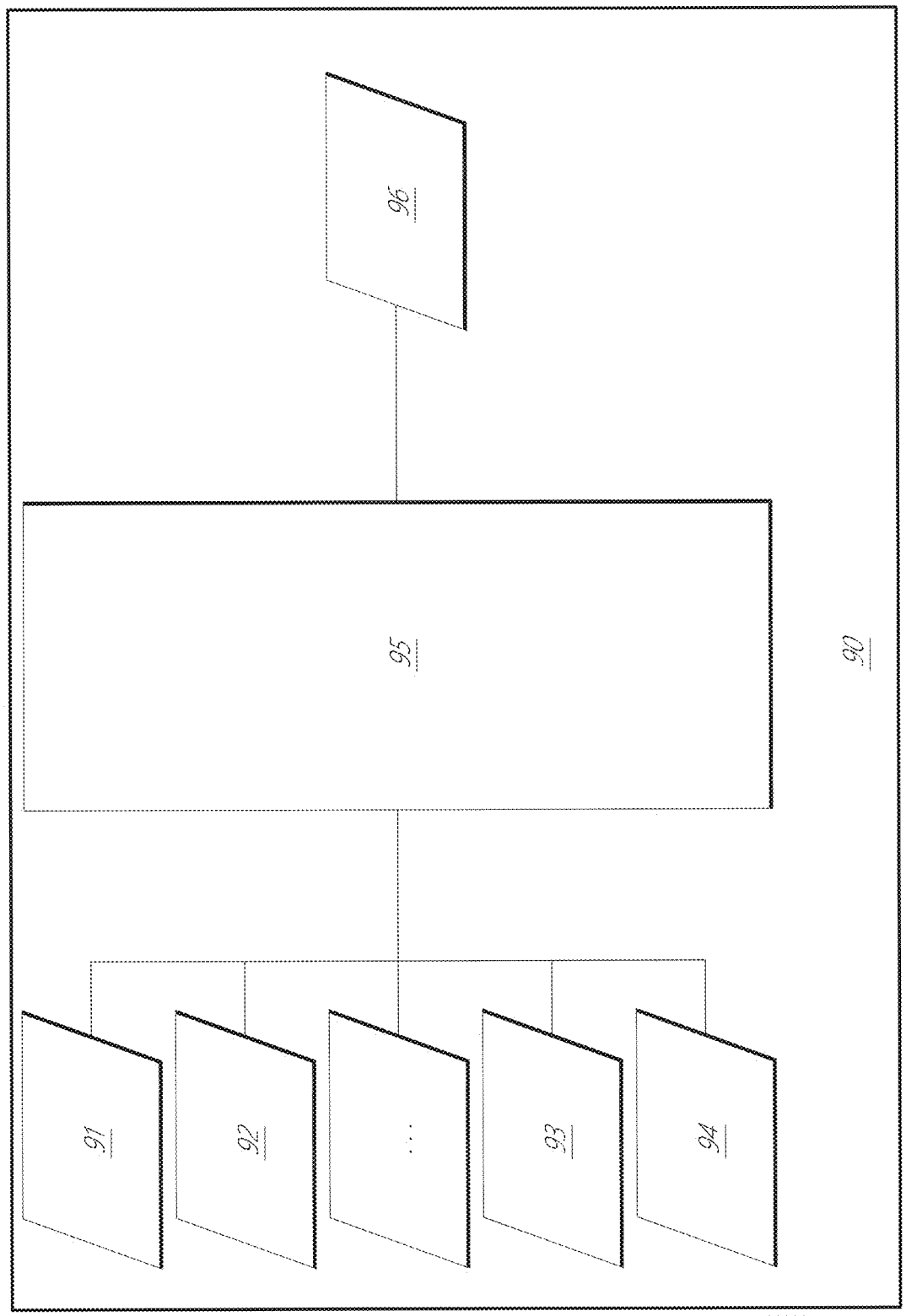
FIG. 20 depicts a block diagram illustrating a localization system that estimates a location of one or more elements of the robotic systems of FIGS. 1-10, such as the location of the instrument of FIGS. 16-18, in accordance to an example embodiment.

FIG. 20 is a block diagram illustrating a localization system 90 that estimates a location of one or more elements of the robotic system, such as the location of the instrument, in accordance to an example embodiment. The localization system 90 may be a set of one or more computer devices configured to execute one or more instructions. The computer devices may be embodied by a processor (or processors) and computer-readable memory in one or more components discussed above. By way of example and not limitation, the computer devices may be in the tower 30 shown in FIG. 1, the cart shown in FIGS. 1-4, the beds shown in FIGS. 5-14, etc.

As shown in FIG. 20, the localization system 90 may include a localization module 95 that processes input data 91-94 to generate location data 96 for the distal tip of a medical instrument. The location data 96 may be data or logic that represents a location and/or orientation of the distal end of the instrument relative to a frame of reference. The frame of reference can be a frame of reference relative to the anatomy of the patient or to a known object, such as an EM field generator (see discussion below for the EM field generator).

The various input data 91-94 are now described in greater detail. Pre-operative mapping may be accomplished through the use of the collection of low dose CT scans. Pre-operative CT scans are reconstructed into three-dimensional images, which are visualized, e.g. as "slices" of a cutaway view of the patient's internal anatomy. When analyzed in the aggregate, image-based models for anatomical cavities, spaces and structures of the patient's anatomy, such as a patient lung network, may be generated. Techniques such as center-line geometry may be determined and approximated from the CT images to develop a three-dimensional volume of the patient's anatomy, referred to as model data 91 (also referred to as "preoperative model data" when generated using only preoperative CT scans). The use of center-line geometry is discussed in U.S. patent application Ser. No. 14/523,760, the contents of which are herein incorporated in its entirety. Network topological models may also be derived from the CT-images, and are particularly appropriate for bronchoscopy.

In some embodiments, the instrument may be equipped with a camera to provide vision data 92. The localization module 95 may process the vision data to enable one or more vision-based location tracking. For example, the preoperative model data may be used in conjunction with the vision data 92 to enable computer vision-based tracking of the medical instrument (e.g., an endoscope or an instrument advance through a working channel of the endoscope). For example, using the preoperative model data 91, the robotic system may generate a library of expected endoscopic images from the model based on the expected path of travel of the endoscope, each image linked to a location within the model. Intra-operatively, this library may be referenced by the robotic system in order to compare real-time images captured at the camera (e.g., a camera at a distal end of the endoscope) to those in the image library to assist localization.

Other computer vision-based tracking techniques use feature tracking to determine motion of the camera, and thus the endoscope. Some features of the localization module 95 may identify circular geometries in the preoperative model data 91 that correspond to anatomical lumens and track the change of those geometries to determine which anatomical lumen was selected, as well as the relative rotational and/or translational motion of the camera. Use of a topological map may further enhance vision-based algorithms or techniques.

Optical flow, another computer vision-based technique, may analyze the displacement and translation of image pixels in a video sequence in the vision data 92 to infer camera movement. Examples of optical flow techniques may include motion detection, object segmentation calculations, luminance, motion compensated encoding, stereo disparity measurement, etc. Through the comparison of multiple frames over multiple iterations, movement and location of the camera (and thus the endoscope) may be determined.

The localization module 95 may use real-time EM tracking to generate a real-time location of the endoscope in a global coordinate system that may be registered to the patient's anatomy, represented by the preoperative model. In EM tracking, an EM sensor (or tracker) comprising of one or more sensor coils embedded in one or more locations and orientations in a medical instrument (e.g., an endoscopic tool) measures the variation in the EM field created by one or more static EM field generators positioned at a known location. The location information detected by the EM sensors is stored as EM data 93. The EM field generator (or transmitter), may be placed close to the patient to create a low intensity magnetic field that the embedded sensor may detect. The magnetic field induces small currents in the sensor coils of the EM sensor, which may be analyzed to determine the distance and angle between the EM sensor and the EM field generator. These distances and orientations may be intra-operatively "registered" to the patient anatomy (e.g., the preoperative model) in order to determine the geometric transformation that aligns a single location in the coordinate system with a position in the pre-operative model of the patient's anatomy. Once registered, an embedded EM tracker in one or more positions of the medical instrument (e.g., the distal tip of an endoscope) may provide real-time indications of the progression of the medical instrument through the patient's anatomy.

Robotic command and kinematics data 94 may also be used by the localization module 95 to provide localization data 96 for the robotic system. Device pitch and yaw resulting from articulation commands may be determined during pre-operative calibration. Intra-operatively, these calibration measurements may be used in combination with known insertion depth information to estimate the position of the instrument. Alternatively, these calculations may be analyzed in combination with EM, vision, and/or topological modeling to estimate the position of the medical instrument within the network.

As FIG. 20 shows, a number of other input data can be used by the localization module 95. For example, although not shown in FIG. 20, an instrument utilizing shape-sensing fiber can provide shape data that the localization module 95 can use to determine the location and shape of the instrument.

The localization module 95 may use the input data 91-94 in combination(s). In some cases, such a combination may use a probabilistic approach where the localization module 95 assigns a confidence weight to the location determined from each of the input data 91-94. Thus, where the EM data may not be reliable (as may be the case where there is EM interference) the confidence of the location determined by the EM data 93 can be decrease and the localization module 95 may rely more heavily on the vision data 92 and/or the robotic command and kinematics data 94.

As discussed above, the robotic systems discussed herein may be designed to incorporate a combination of one or more of the technologies above. The robotic system's computer-based control system, based in the tower, bed and/or cart, may store computer program instructions, for example, within a non-transitory computer-readable storage medium such as a persistent magnetic storage drive, solid state drive, or the like, that, upon execution, cause the system to receive and analyze sensor data and user commands, generate control signals throughout the system, and display the navigational and localization data, such as the position of the instrument within the global coordinate system, anatomical map, etc.

2. Systems, Devices, and Methods for Activating Manual Manipulation Mode Using Linkage Interaction Sensing Embodiments of the disclosure relate to systems, methods, and devices for manual manipulation of a robotic arm using linkage interaction sensing.

In accordance with some embodiments of the present disclosure, a robotic medical system includes one or more sensors and/or a sensor architecture, for sensing interactions on a robotic arm (e.g., on linkages, joints, etc. of the robotic arm). For example, an operator of the system may push and/or grab a part of a robotic arm. The sensors and/or sensor architecture detects interactions (e.g., forces, contact, displacement, torque, etc.) on the robotic arm. In accordance with a determination that preestablished or predefined criteria are met, the robotic system can activate manual manipulation (e.g., manual manipulation mode or grab-and-go mode) of the robotic arm, thereby causing one or more portions of the robotic arm, or the whole robotic arm, to be moved and/or reconfigured.

Manual manipulation may be desirable during setup, whereby robotic arms may be moved and/or reconfigured. During surgery, when there is excessive contact force on a patient or operator, manual manipulation may enable a robotic arm to be moved away from the patient and/or operator thus resolving the excess force on the patient and/or operator.

A. Robotic System

Figure 21:
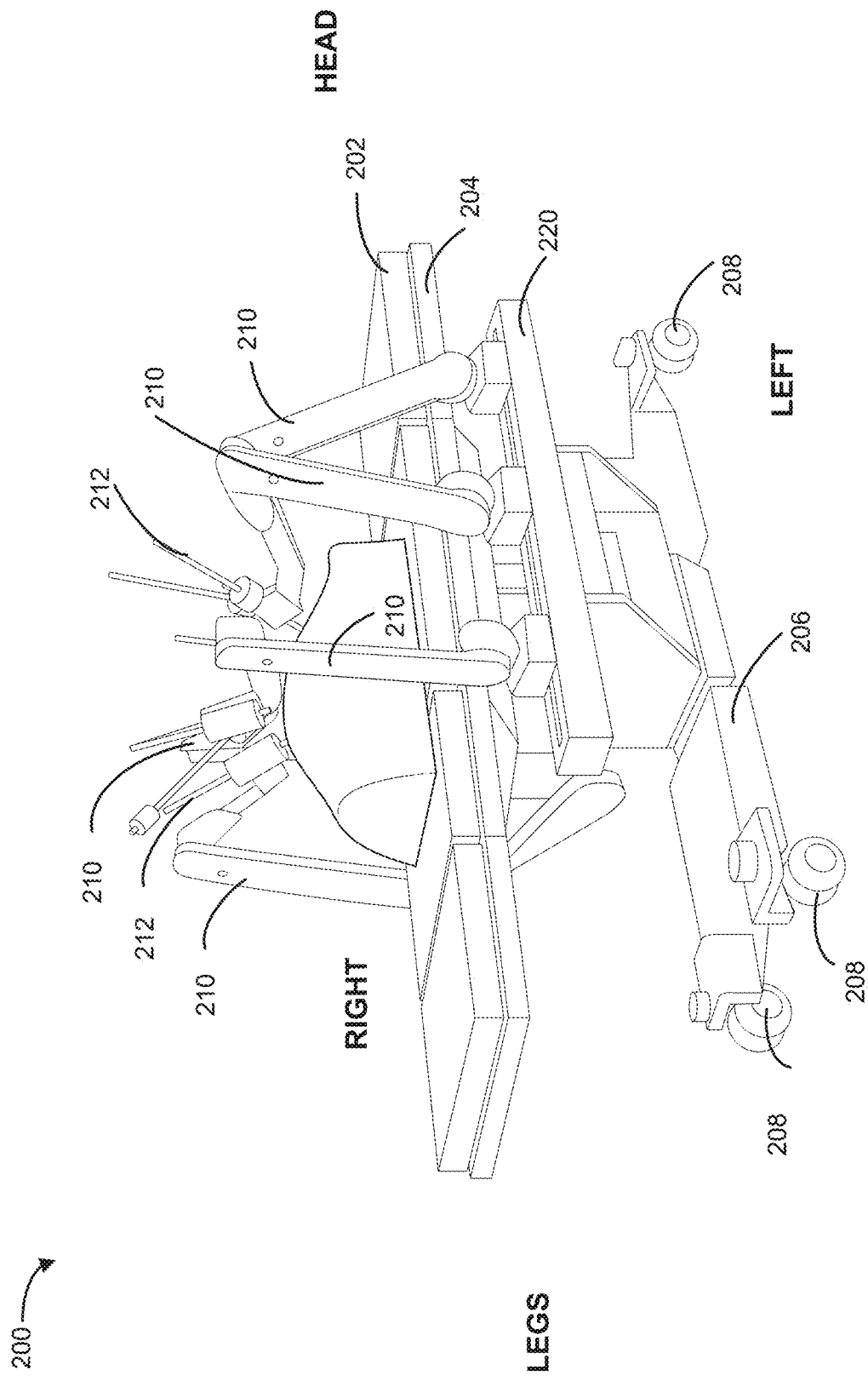
FIG. 21 illustrates an exemplary robotic system according to some embodiments.

FIG. 21 illustrates an exemplary robotic system 200 according to some embodiments. In some embodiments, the robotic system 200 is a robotic medical system (e.g., robotic surgery system). In the example of FIG. 21, the robotic system 200 comprises a patient support platform 202 (e.g., a patient platform, a table, a bed, etc.). The two ends along the length of the patient support platform 202 are respectively referred to as "head" and "leg". The two sides of the patient support platform 202 are respectively referred to as "left" and "right." The patient support platform 202 includes a support 204 (e.g., a rigid frame) for the patient support platform 202.

The robotic system 200 also comprises a base 206 for supporting the robotic system 200. The base 206 includes wheels 208 that allow the robotic system to be easily movable or repositionable in a physical environment. In some embodiments, the wheels 208 are omitted from the robotic system 200 or are retractable, and the base 206 can rest directly on the ground or floor. In some embodiments, the wheels 208 are replaced with feet.

The robotic system 200 includes one or more robotic arms 210. The robotic arms 210 can be configured to perform robotic medical procedures as described above with reference to FIGS. 1-20. Although FIG. 21 shows five robotic arms 210, it should be appreciated that the robotic system 200 may include any number of robotic arms, including less than five or six or more.

The robotic system 200 also includes one or more bars 220 (e.g., adjustable arm support or an adjustable bar) that support the robotic arms 210. Each of the robotic arms 210 is supported on, and movably coupled to, a bar 220, by a respective base joint of the robotic arm. In some embodiments, and as described in FIG. 12, bar 220 can provide several degrees of freedom, including lift, lateral translation, tilt, etc. In some embodiments, each of the robotic arms 210 and/or the adjustable arm supports 220 is also referred to as a respective kinematic chain.

FIG. 21 shows three robotic arms 210 supported by the bar 220 that is in the field of view of the figure. The two remaining robotic arms are supported by another bar that is located across the other length of the patient support platform 202.

In some embodiments, the adjustable arm supports 220 can be configured to provide a base position for one or more of the robotic arms 210 for a robotic medical procedure. A robotic arm 210 can be positioned relative to the patient support platform 202 by translating the robotic arm 210 along a length of its underlying bar 220 and/or by adjusting a position and/or orientation of the robotic arm 210 via one or more joints and/or links (see, e.g., FIG. 23).

In some embodiments, the adjustable arm support 220 can be translated along a length of the patient support platform 202. In some embodiments, translation of the bar 220 along a length of the patient support platform 202 causes one or more of the robotic arms 210 supported by the bar 220 to be simultaneously translated with the bar or relative to the bar. In some embodiments, the bar 220 can be translated while keeping one or more of the robotic arms stationary with respect to the base 206 of the robotic medical system 200.

In the example of FIG. 21, the adjustable arm support 220 is located along a partial length of the patient support platform 202. In some embodiments, the adjustable arm support 220 may extend across an entire length of the patient support platform 202, and/or across a partial or full width of the patient support platform 202.

During a robotic medical procedure, one or more of the robotic arms 210 can also be configured to hold instruments 212 (e.g., robotically-controlled medical instruments or tools, such as an endoscope and/or any another instruments that may be used during surgery), and/or coupled to one or more accessories, including one or more cannulas.

Figure 22:
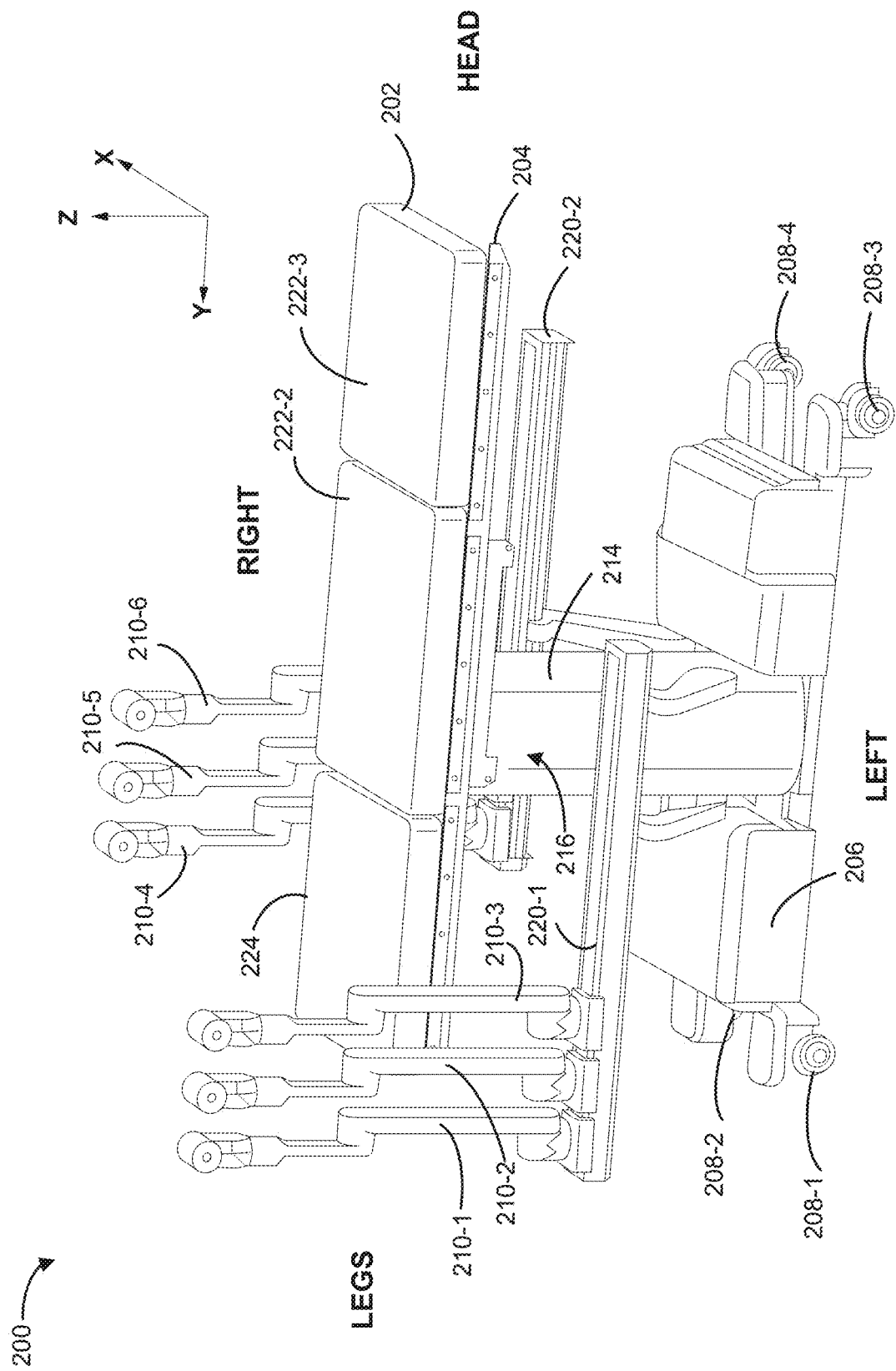
FIG. 22 illustrates another view of an exemplary robotic system according to some embodiments.

FIG. 22 illustrates another view of the exemplary robotic system 200 in FIG. 21 according to some embodiments. In this example, the robotic medical system 200 includes six robotic arms 210-1, 210-2, 210-3, 210-4, 210-5, and 210-6. The patient platform 202 is supported by a column 214 that extends between the base 206 and the patient platform 202. In some embodiments, the patient platform 202 comprises a tilt mechanism 216. The tilt mechanism 216 can be positioned between the column 214 and the patient platform 202 to allow the patient platform to pivot, rotate, or tilt relative to the column 214. The tilt mechanism 216 can be configured to allow for lateral and/or longitudinal tilt of the patient platform 202. In some embodiments, the tilt mechanism 216 allows for simultaneous lateral and longitudinal tilt of the patient platform 202.

FIG. 22 shows the patient platform 202 in an untilted state or position. In some embodiments, the untilted state or position may be a default position of the patient platform 202. In some embodiments, the default position of the patient platform 202 is a substantially horizontal position as shown. As illustrated, in the untilted state, the patient platform 202 can be positioned horizontally or parallel to a surface that supports the robotic medical system 200 (e.g., the ground or floor).

With continued reference to FIG. 22, in the illustrated example of the robotic system 200, the patient platform 202 comprises a support 204. In some embodiments, the support 204 comprises a rigid support structure or frame, and can support one or more surfaces, pads, or cushions 222. An upper surface of the patient platform 202 can comprise a support surface 224. During a medical procedure, a patient can be placed on the support surface 224.

FIG. 22 shows the robotic arms 210 and the adjustable arm supports 220 in an exemplary deployed configuration in which the robotic arms 210 reach above the patient platform 202. In some embodiments, due to the configuration of the robotic system 200, which enables stowage of different components beneath the patient platform 202, the robotic arms 210 and the arm supports 220 can occupy a space underneath the patient platform 202. Thus, in some embodiments, it may be advantageous to configure the tilt mechanism 216 to have a low-profile and/or low volume to maximize the space available for storage below.

FIG. 22 also illustrates an example, x, y, and z coordinate system that will be used to describe certain features of the embodiments disclosed herein. It will be appreciated that this coordinate system is provided for purposes of example and explanation only and that other coordinate systems may be used. In the illustrated example, the x-direction or x-axis extends in a lateral direction across the patient platform 202 when the patient platform 202 is in an untilted state. That is, the x-direction extends across the patient platform 202 from one lateral side (e.g., the right side) to the other lateral side (e.g., the left side) when the patient platform 202 is in an untilted state. The y-direction or y-axis extends in a longitudinal direction along the patient platform 202 when the patient platform 202 is in an untilted state. That is, the y-direction extends along the patient platform 202 from one longitudinal end (e.g., the head end) to the other longitudinal end (e.g., the legs end) when the patient platform 202 is in an untilted state. In an untilted state, the patient platform 202 can lie in or be parallel to the x-y plane, which can be parallel to the floor or ground. In the illustrated example, the z-direction or z-axis extends along the column 214 in a vertical direction. In some embodiments, the tilt mechanism 216 is configured to laterally tilt the patient platform 202 by rotating the patient platform 202 about a lateral tilt axis that is parallel to the y-axis. The tilt mechanism 216 can further be configured to longitudinally tilt the patient platform 202 by rotating the patient platform 202 about a longitudinal tilt axis that is parallel to the x-axis.

B. Robotic Arm

FIGS. 23A and 23B illustrate different views of an exemplary robotic arm 210 according to some embodiments.

FIG. 23A illustrates that the robotic arm 210 includes a plurality of links 302 (e.g., linkages). The links 302 are connected by one or more joints 304. Each of the joints 304 includes one or more degrees of freedom (DoFs).

In FIG. 23A, the joints 304 include a first joint 304-1 (e.g., a base joint or an A0 joint) that is located at or near a base 306 of the robotic arm 210. In some embodiments, the base joint 304-1 comprises a prismatic joint that allows the robotic arm 210 to translate along the bar 220 (e.g., along the y-axis). The joints 304 also include a second joint 304-2 (e.g., an A1 joint. In some embodiments, the second joint 304-2 rotates with respect to the base joint 304-1, and raises (and/or tilts) the robotic arm 210 with respect to the base 306. The joints 304 also include a third joint 304-3 (e.g., an A2 joint) that is connected to one end of link 302-2. In some embodiments, the joint 304-3 includes multiple DoFs and facilitates both tilt and rotation of the link 302-2 tilt with respect to the joint 304-3.

FIG. 23A also shows a fourth joint 304-4 (e.g., an A3 joint) that is connected to the other end of the link 302-2. In some embodiments, the joint 304-4 comprises an elbow joint that connects the link 302-2 and the link 302-3. The joints 304 further comprise a pair of joints 304-5 (e.g., a wrist roll joint or an A4 joint) and 304-6 (e.g., a wrist pitch joint or an A5 joint), which is located on a distal portion of the robotic arm 210.

A proximal end of the robotic arm 210 may be connected to a base 306 and a distal end of the robotic arm 210 may be connected to an advanced device manipulator (ADM) 308 (e.g., a tool driver, an instrument driver, or a robotic end effector, etc.). The ADM 308 may be configured to control the positioning and manipulation of a medical instrument 212 (e.g., a tool, a scope, etc.).

The robotic arm 210 can also include a cannula sensor 310 for detecting presence or proximity of a cannula to the robotic arm 210. In some embodiments, the robotic arm 210 is placed in a docked state (e.g., docked position) when the cannula sensor 310 detects presence of a cannula (e.g., via one or more processors of the robotic system 200). In some embodiments, when the robotic arm 210 is in a docked position, the robotic arm 210 can execute null space motion to maintain a position and/or orientation of the cannula, as discussed in further detail below. Conversely, when no cannula is detected by the cannula sensor 310, the robotic arm 210 is placed in an undocked state (e.g., undocked position).

In some embodiments, and as illustrated in FIG. 23A, the robotic arm 210 includes an input or button 312 (e.g., a donut-shaped button, or other types of controls, etc.) that can be used to place the robotic arm 210 in an admittance mode (e.g., by depressing the button 312). The admittance mode is also referred to as an admittance scheme or admittance control. In the admittance mode, the robotic system 210 measures forces and/or torques (e.g., imparted on the robotic arm 210) and outputs corresponding velocities and/or positions. In some embodiments, the robotic arm 210 can be manually manipulated by a user (e.g., during a set-up procedure, or in between procedures, etc.) in the admittance mode. In some instances, by using admittance control, the operator need not overcome all of the inertia in the robotic system 200 to move the robotic arm 210. For example, under admittance control, when the operator imparts a force on the arm, the robotic system 200 can measure the force and assist the operator in moving the robotic arm 210 by driving one or more motors associated with the robotic arm 210, thereby resulting in desired velocities and/or positions of the robotic arm 210.

In some embodiments, the links 302 may be detachably coupled to the medical tool 212 (e.g., to facilitate ease of mounting and dismounting of the medical tool 212 from the robotic arm 210). The joints 304 provide the robotic arm 210 with a plurality of degrees of freedom (DoFs) that facilitate control of the medical tool 212 via the ADM 308.

FIG. 23B illustrates a front view of the robotic arm 210. In some embodiments, the robotic arm 210 includes a second input or button 314 (e.g., a push button) that is distinct from the button 312 in FIG. 23A, for placing the robotic arm in an impedance mode (e.g., by a single press or continuous press and hold of the button). In this example, the button 304 is located between the A4 joint 304-4 and the A5 joint 304-5. The impedance mode is also referred to as impedance scheme or impedance control. In the impedance mode, the robotic system 200 measures displacements (e.g., changes in position and velocity) and outputs forces to facilitate manual movement of the robotic arm. In some embodiments, the robotic arm 210 can be manually manipulated by a user (e.g., during a set-up procedure) in the impedance mode. In some embodiments, under the impedance mode, the operator's movement of one part of a robotic arm 210 may back drive other parts of the robotic arm 210.

In some embodiments, for admittance control, a force sensor or load cell can measure the force that the operator is applying to the robotic arm 210 and move the robotic arm 210 in a way that feels light. Admittance control may feel lighter than impedance control because, under admittance control, one can hide the perceived inertia of the robotic arm 210 because motors in the controller can help to accelerate the mass. In contrast, with impedance control, the user is responsible for most if not all mass acceleration, in accordance with some embodiments.

In some circumstances, depending on the position of the robotic arm 210 relative to the operator, it may be inconvenient to reach the button 312 and/or the button 314 to activate a manual manipulating mode (e.g., the admittance mode and/or the impedance mode). Accordingly, under these circumstances, it may be convenient for the operator to trigger the manual manipulation mode other than by buttons.

In some embodiments, the robotic arm 210 includes a single button that can be used to place the robotic arm 210 in the admittance mode and the impedance mode (e.g., by using different presses, such as a long press, a short press, press and hold etc.). In some embodiments, the robotic arm 210 can be placed in impedance mode by a user pushing on arm linkages (e.g., the links 302) and/or joints (e.g., the joints 304) and overcoming a force threshold.

During a medical procedure, it can be desirable to have the ADM 308 of the robotic arm 210 and/or a remote center of motion (RCM) of the tool 212 coupled thereto kept in a static pose/position. An RCM may refer to a point in space where a cannula or other access port through which a medical tool 212 is inserted is constrained in motion. In some embodiments, the medical tool 212 includes an end effector that is inserted through an incision or natural orifice of a patient while maintaining the RCM. In some embodiments, the medical tool 212 includes an end effector that is in a retracted state during a setup process of the robotic medical system.

In some circumstances, the robotic system 200 can be configured to move one or more links 302 of the robotic arm 210 within a "null space" to avoid collisions with nearby objects (e.g., other robotic arms), while the ADM 308 of the robotic arm 210 and/or the RCM are maintained in their respective poses/positions. The null space can be viewed as the space in which a robotic arm 210 can move that does not result in movement of the ADM 308 and/or RCM, thereby maintaining the position and/or the orientation of the medical tool 212 (e.g., within a patient). In some embodiments, a robotic arm 212 can have multiple positions and/or configurations available for each pose of the ADM 308.

For a robotic arm 210 to move the ADM 308 to a desired pose in space, in certain embodiments, the robotic arm 210 may have at least six DoFs—three DoFs for translation (e.g., X, Y, Z position) and three DoFs for rotation (e.g., yaw, pitch, and roll). In some embodiments, each joint 304 may provide the robotic arm 210 with a single DoF, and thus, the robotic arm 210 may have at least six joints to achieve freedom of motion to position the ADM 308 at any pose in space. To further maintain the ADM 308 of the robotic arm 210 and/or the remote center or motion in a desired pose, the robotic arm 210 may further have at least one additional "redundant joint." Thus, in certain embodiments, the system may include a robotic arm 210 having at least seven joints 304, providing the robotic arm 210 with at least seven DoFs. In some embodiments, the robotic arm 210 may include a subset of joints 304 each having more than one degree of freedom thereby achieving the additional DoFs for null space motion. However, depending on the embodiment, the robotic arm 210 may have a greater or fewer number of DoFs.

Furthermore, as described in FIG. 12, the bar 220 (e.g., adjustable arm support) can provide several degrees of freedom, including lift, lateral translation, tilt, etc. Thus, depending on the embodiment, a robotic medical system can have many more robotically controlled degrees of freedom beyond just those in the robotic arms 210 to provide for null space movement and collision avoidance. In a respective embodiment of these embodiments, the end effectors of one or more robotic arms (and any tools or instruments coupled thereto) and a remote center along the axis of the tool can advantageously maintain in pose and/or position within a patient.

A robotic arm 210 having at least one redundant DoF has at least one more DoF than the minimum number of DoFs for performing a given task. For example, a robotic arm 210 can have at least seven DoFs, where one of the joints 304 of the robotic arm 210 can be considered a redundant joint, in accordance with some embodiments. The one or more redundant joints can allow the robotic arm 210 to move in a null space to both maintain the pose of the ADM 308 and a position of an RCM and avoid collision(s) with other robotic arms or objects.

In some embodiments, the robotic system 200 can be configured to perform collision avoidance to avoid collision(s), e.g., between adjacent robotic arms 210, by taking advantage of the movement of one or more redundant joints in a null space. For example, when a robotic arm 210 collides with or approaches (e.g., within a defined distance of) another robotic arm 210, one or more processors of the system can be configured to detect the collision or impending collision (e.g., via kinematics). Accordingly, the robotic system 200 can control one or both of the robotic arms 210 to adjust their respective joints within the null space to avoid the collision or impending collision. In one embodiment involving a pair of robotic arms, a base of one of the robotic arms and its end effector can stay in its pose, while links or joints therebetween move in a null space to avoid collisions with an adjacent robotic arm.

C. Sensor Architecture

FIGS. 24A-24D illustrate a sensor architecture of a robotic arm 210 according to some embodiments.

In some embodiments, the robotic arm 210 includes a sensor architecture that provides sensor data which is used to enable a manual manipulation mode to be activated. In some embodiments, the sensor architecture includes one or more joint-based sensors (e.g., located at a joint 304). In some embodiments, the sensor architecture includes one or more non-joint based sensors. The non-joint based sensors can be located along a length of a link 302 of the robotic arm 210 and/or on the ADM 308. The sensors (both joint based and non-joint based) detect interactions between the robotic arm 210 and an external object (e.g., an operator, a patient another robotic arm, a surgical tool, and/or an underlying bar 220).

Figure 24A:
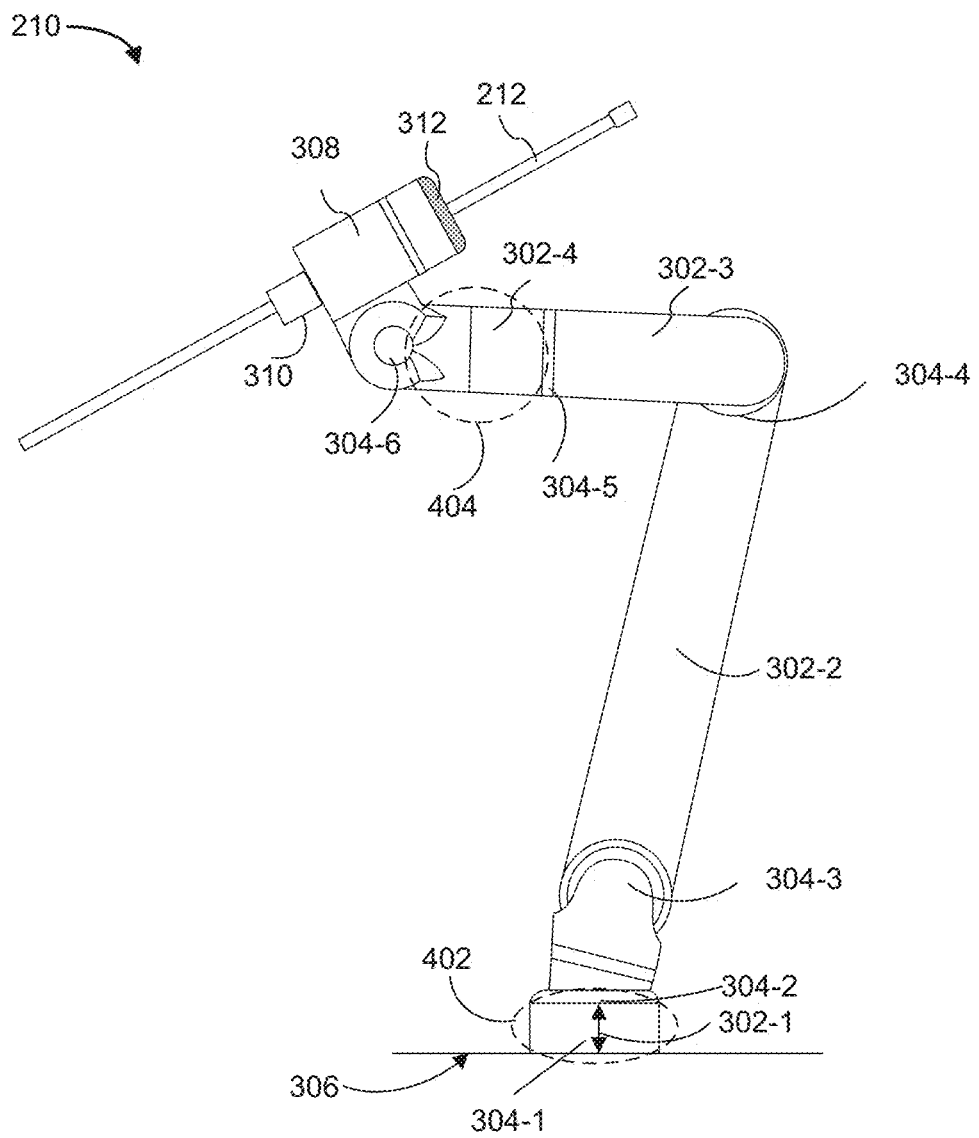
FIGS. 24A-24D illustrate a sensor architecture of a robotic arm according to some embodiments.

In some embodiments, the joint based sensor includes a joint sensor 402 (e.g., an A0 joint sensor). In the example of FIG. 24A, the A0 joint sensor 402 is located on the joint 304-1 (e.g., base joint or A0 joint), near the base 306 of the robotic arm 210. In some embodiments the A0 joint sensor 402 comprises a force sensor that allows interaction forces to be detected on a proximal end of the robotic arm 210. In some embodiments, the A0 joint sensor 402 serves as activation detection for transitioning the robotic arm 210 from a position control mode to a manual manipulation mode (e.g., an impedance mode, an admittance mode, a grab-and-go mode, etc.).

In some embodiments, the sensor architecture includes other joint based sensors that are located on other joints of the robotic arm 210 (e.g., sensors that are located on the A1 joint 304-2, the A2 joint 304-3, the A3 joint 304-4 etc.).

In some embodiments, the sensor architecture also comprises a six-axis load cell 404. The six-axis load cell 404 has the ability to measure forces in six directions, meaning it can measure the X, Y, and Z axes, as well as the rotation around each axis. Stated another way, the six-axis load cell 404 is a force and moment (e.g., torque) sensor that is capable of sensing (e.g., detecting and measuring) forces and moments in multiple directions.

In some embodiments, and as illustrated in FIG. 24A, the six-axis load cell 404 is located between a pair of joints on a distal portion of the arm 210 (e.g., between the A4 joint 304-5 and the A5 joint 304-6). The six-axis load cell 404 can serve as a support mount for a tool driver (e.g., the ADM 308). Accordingly, the six-axis load cell 404 can measure forces and/or moments to be detected on a distal of the robotic arm 210 (e.g., by the tool driver). In some embodiments, the six-axis load cell 404 is located directly between the A4 joint 304-5 and the A5 joint 304-6 without a link (e.g., without the link 302-4).

Figure 24B:
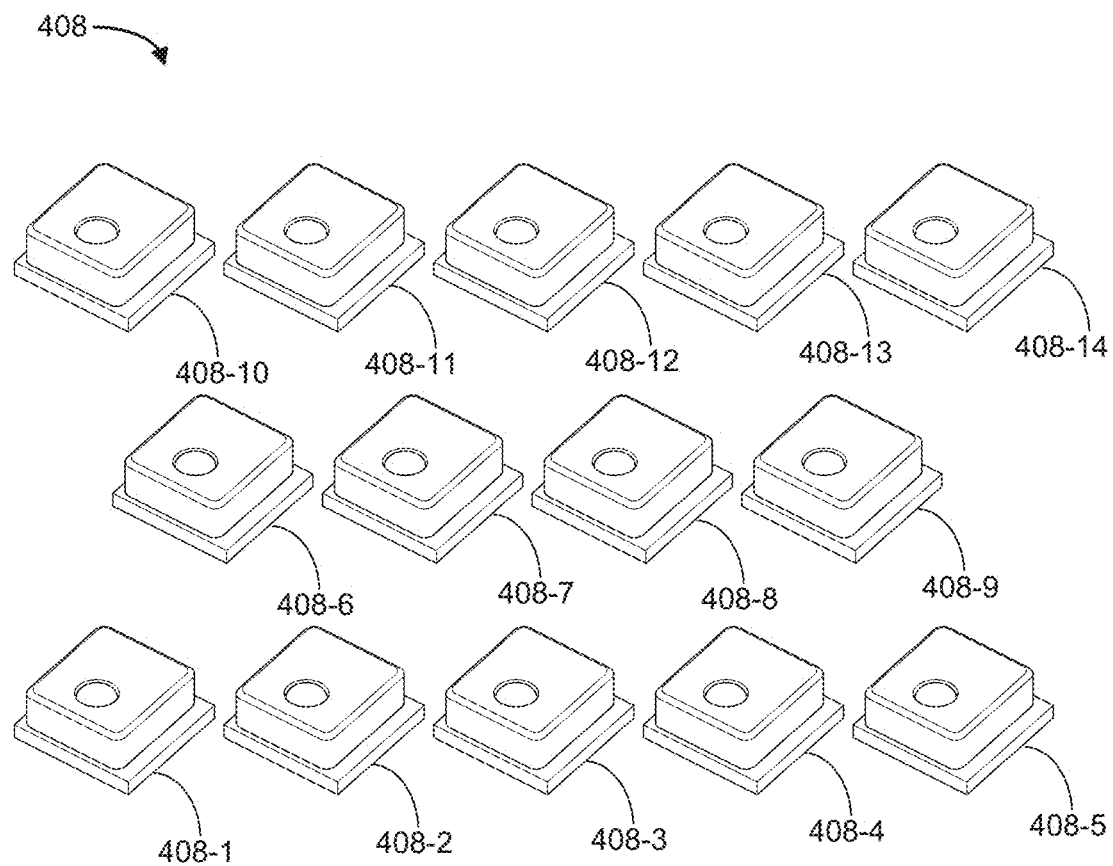

In some embodiments, the sensor architecture further comprises contact sensors 408 (e.g., shell sensors). Although the example of FIG. 24B illustrates fourteen contact sensors (e.g., 408-1 to 408-14), it should be appreciated the robotic arm 210 can include any number of contact sensors 408. In some embodiments, the contact sensors 408 comprise force and/or moment sensors and can detect (e.g., measure) forces and/or moments in multiple directions. In some embodiments, the shell sensors 408 are located along a length of a link 302, such as a link on a proximal portion and/or a link on a distal portion of the robotic arm 210.

Figure 24C:
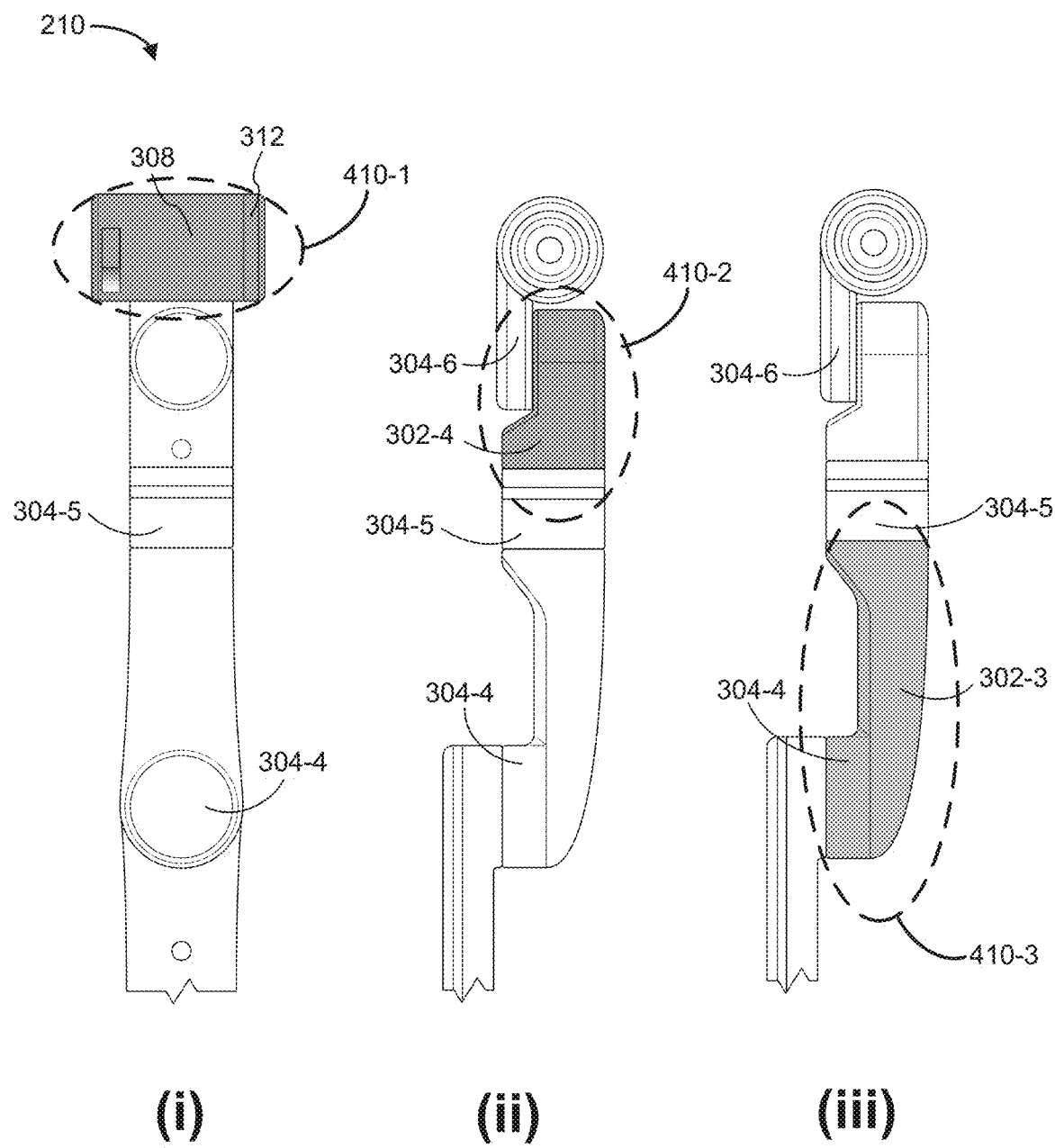
Figure 24D:
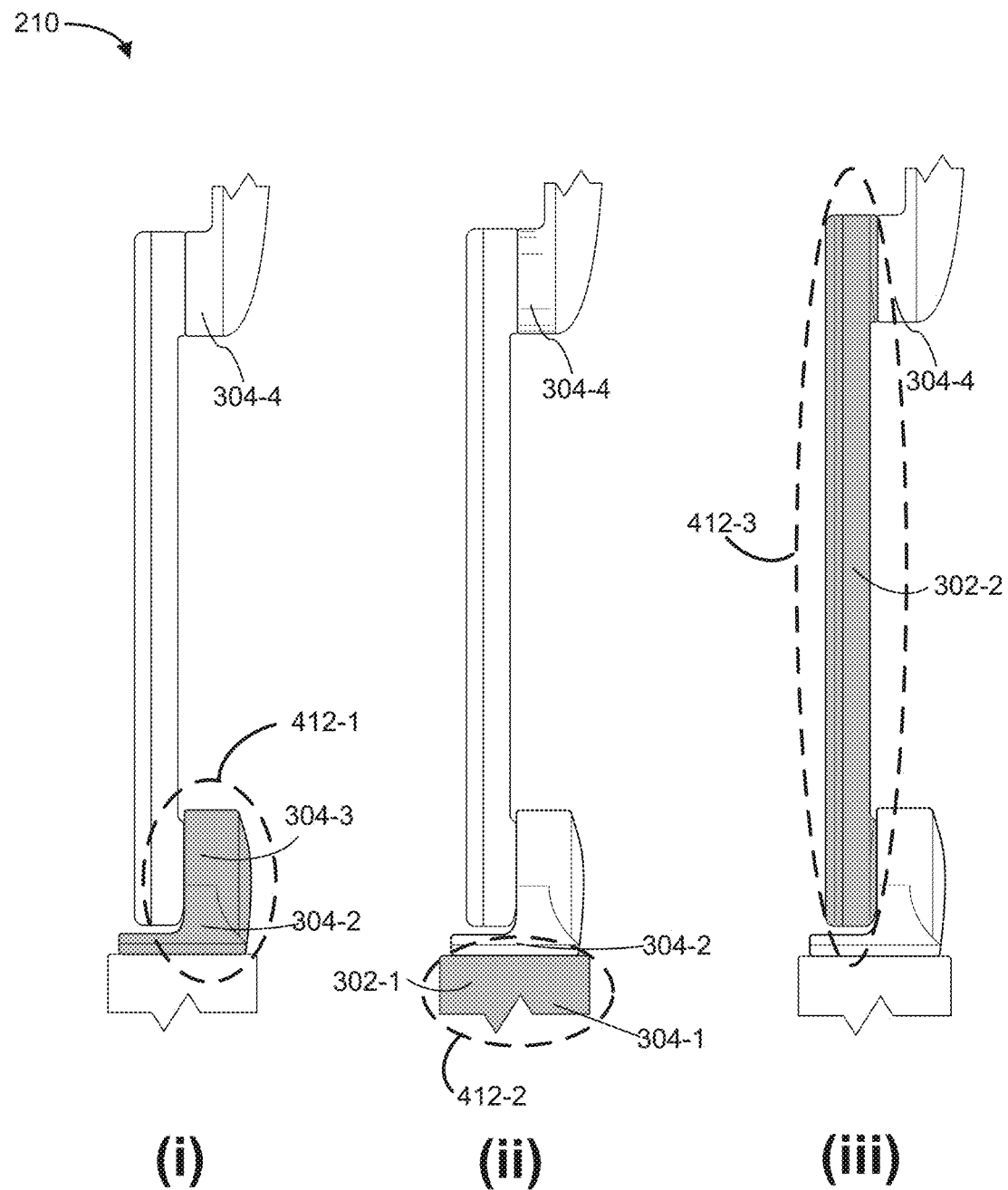

In some embodiments, the contact sensors 408 are located in areas of the robotic arm 210 that are known to regularly collide with a patient during surgery. FIG. 24C illustrates three views of a distal portion of the robotic arm 210, in which regions 410 that have a relatively higher likelihood of colliding with a patient are shaded. FIG. 24D illustrates three views of a proximal portion of the robotic arm 201 (e.g., proximal to the distal portion the robotic arm 210 in FIG. 24C), in which regions 412 that have a relatively higher likelihood of colliding with a patient are shaded.

Using the region 410-1 in FIG. 24C(i) as an example, in some embodiments, the ADM 308 includes one or more contact sensors 408 that detects interactions at or proximate to the ADM 308. In some embodiments, in accordance with a determination that the measured forces and/or moments exceed a respective threshold value, manual manipulation mode is activated on the robotic arm 210. Further, the transition to manual manipulation mode may be in accordance with a determination that robotic arm 210 is undocked. Additionally and/or alternatively, in some embodiments, interactions with the ADM (e.g., force and moment) may be detected by the six-axis load cell 404 on which the ADM is mounted (either directly or indirectly).

Figure 25:
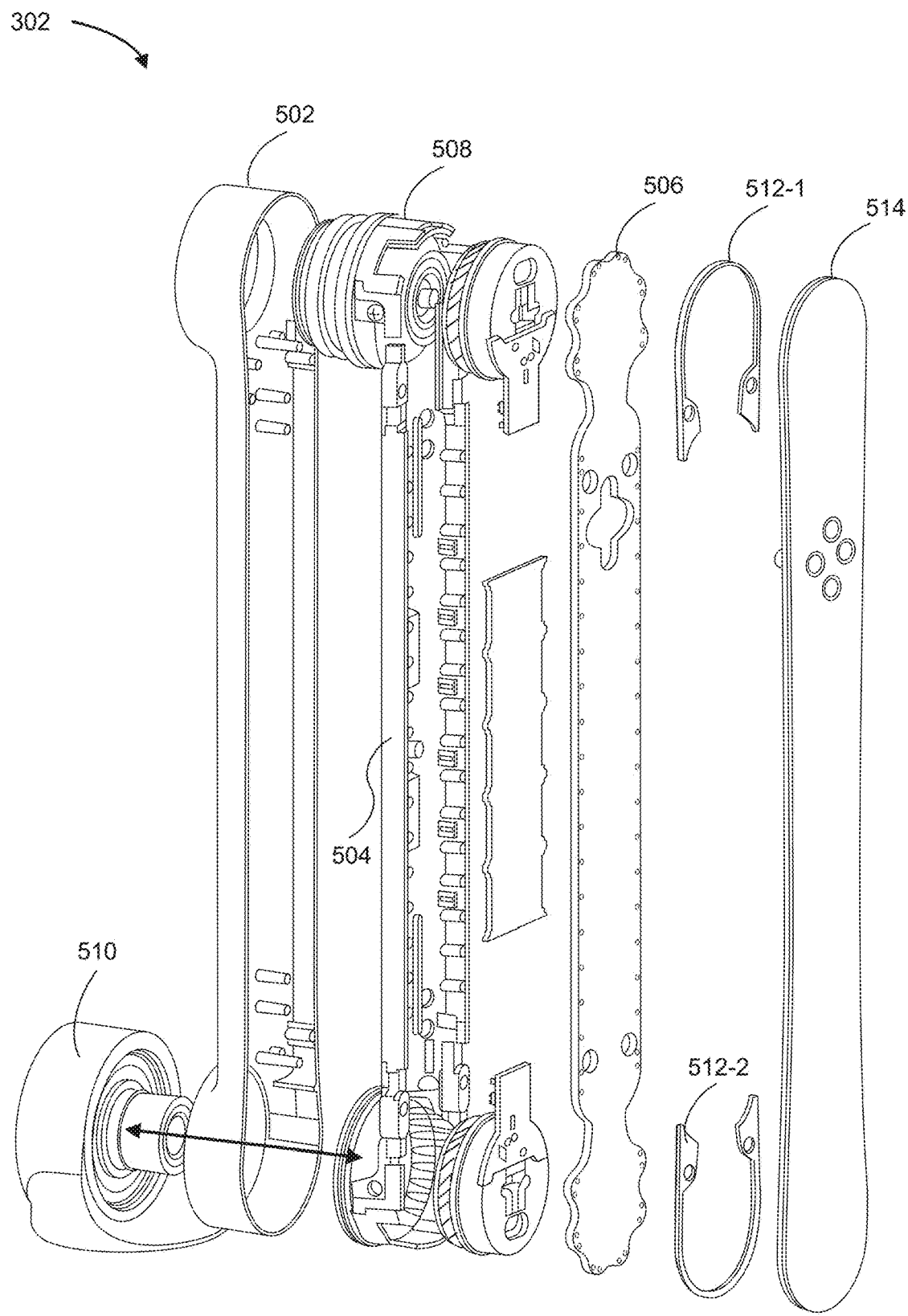
FIG. 25 illustrates an exemplary link of a robotic arm according to some embodiments.

FIG. 25 illustrates an exemplary link 302 of a robotic arm 210 according to some embodiments.

In some embodiments, and as illustrated in FIG. 25, the link 302 comprises a rigid shell 502, a structural link 504, a structural cover 506, a first joint 508 (e.g., the A2 joint 304-2 in FIG. 23), a second joint 510 (e.g., the A3 joint 304-3 in FIG. 23), a pair of reaction paddles 512, and a shell cover 514 (e.g., a cosmetic cover). The structural cover 506 can be attached to the structural link 504 to house components of the structural link 504 and form an internal structural connection between the first joint 508 and the second joint 510.

In some embodiments, the shell 502 is used for detecting contact on the robotic arm 210 (e.g., by an external object). For example, the shell 502 together with the shell cover 514 are suspended from and surround the structural link 504. The relative motion between the shell 502 and inner components/members of the link 302 (e.g., the structural link 504 and the structural cover 506) can be detected using one or more sensors (e.g., the contact sensors 408) disposed along a length of the link 302 to determine contact with an external object.

In some embodiments, one or more of the contact sensors 408 (e.g., shell sensors) are strategically disposed at various locations along a length of the link 302, between the structural link 504 and the shell 502 of the link 302. For example, the shell 502 can be suspended over the structural link 504 via the contact sensors 408.

In some embodiments, the contact sensors 408 are distributed uniformly along the length of the link 302. In some embodiments, the contact sensors 408 can be distributed randomly along the length of the link 302. Alternatively, in some embodiments, a higher number of sensors 408 may be located in particular areas of the link 302 (e.g., in areas that are known to have more contact with external objects). In some embodiments, regardless of the distribution of the sensors 408, because the shell 502 surrounds the structural link 504, when the link 302 contacts an external object, the object will come into contact with the shell 502. Thus, the force- and/or moment-sensing contact sensors 408 can detect contact between the shell 502 and the external object. The sensors 408 can also measure changes in the force and/or torque in all directions between the shell 502 and the structural link 504 that are caused by the link 302 coming into contact with an external object.

In some embodiments, one or more traditional load cells, force sensing resistors, and/or any component capable of sensing force, moment, and/or displacement (e.g., when combined with a spring) may be used instead of (or in addition to) the contact sensors 408, for detecting interactions with an external object.

As used herein, the shell 504 and shell cover 514 may collectively be referred to simply as the "shell" 504, while the structural link 504 and structural cover 506 may collectively be referred to simply as the structural link 504 or a manipulatable link (e.g., the link 302), unless the context clearly indicates otherwise.

Figure 26A:
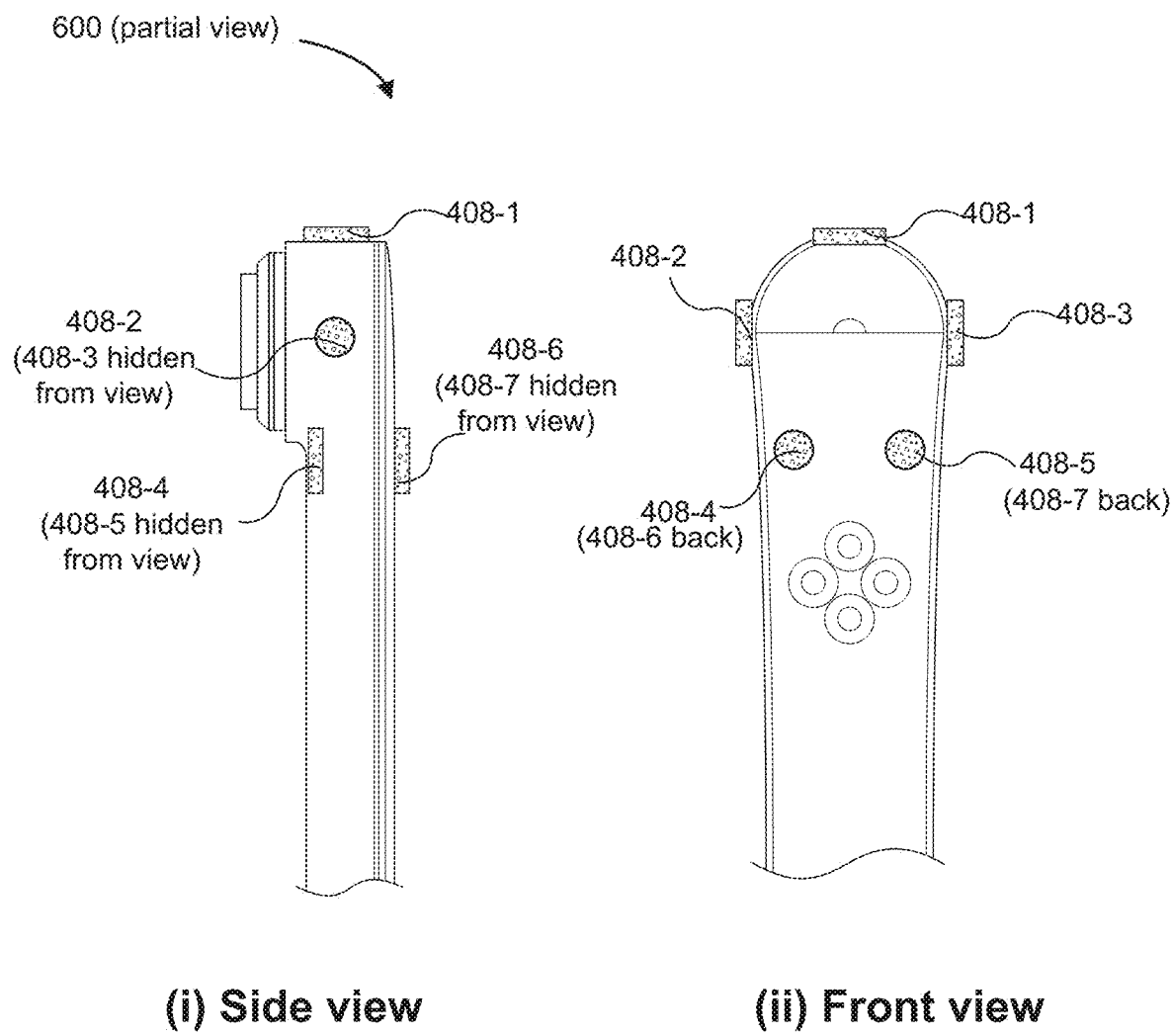
FIGS. 26A and 26B illustrate sensor distributions along a link of a robotic arm according to some embodiments.
Figure 26B:
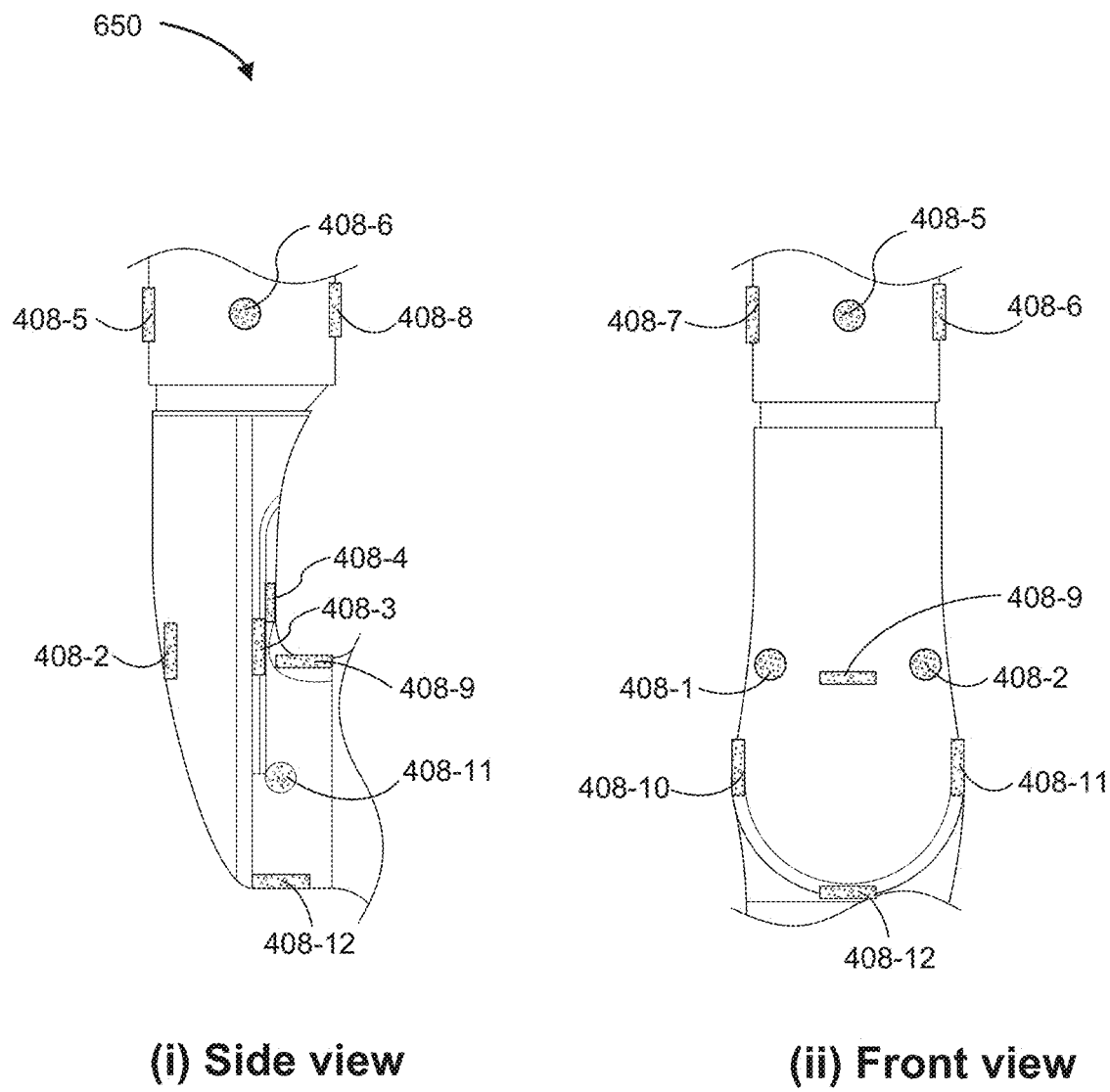

FIGS. 26A and 26B illustrate sensor distributions along a link of a robotic arm 210 according to some embodiments.

FIGS. 26A(i) and (ii) show, respectively, an exemplary side view and a front view of a one end of a link 600 according to some embodiments. In some embodiments, the link 600 corresponds to a proximal link of the robotic arm 210 (e.g., link 302-2 in FIG. 23). In this example, the one end of the link 600 includes seven contact sensors (e.g., 408-1 to 408-7). In some embodiments, because the link 600 (e.g., the link 302-2) may be substantially symmetric at both ends, therefore there are a total of fourteen sensors 408 in the link 600.

FIGS. 26B(i) and (ii) show, respectively, an exemplary side view and a front view of a link 650 according to some embodiments. In some embodiments, the link 650 corresponds to a distal link of the robotic arm 210 (e.g., the link 302-3 in FIG. 23A). In this example, twelve contact sensors 408 are included in the link 650.

In FIGS. 26A and 26B, the sensors 408 are oriented in different directions. In some embodiments, each of the sensors 408 is an individual force sensor (e.g., a single axis force sensor) and the robotic system 200 combine all the sensors to output a lumped (e.g., combined) force and moment value. Thus, by positioning the sensors in the various orientations as illustrated in FIGS. 26 and 27, forces and/or moments in all directions can be detected.

Although FIGS. 26A and 26B illustrate embodiments of a link 302 that each include a plurality of contact sensors 408, in some embodiments a link 302 can include a single sensor configured to sense force and/or torque and/or displacement between the structural link 504 and the shell 502 in multiple directions. In some embodiments, using signals received from the sensor(s) 408, the robotic system 200 can detect a direction of the contact between the shell 502 and the external object. The robotic system 200 can also measure a magnitude of a force resulting from the contact between the shell 502 and the external object based on the signal from the sensor(s) 408. Based on the placement of the sensors 408, the robotic system 200 can also detect a torque (e.g., a moment) applied to the link 302. For example, if a force is applied to the shell 502, certain contact sensors 408 (e.g., on one end of the link 302-2 or the link 302-3) may be compressed. Based on the positions of and forces sensed by the sensors 408 being compressed, the robotic system 200 can determine a torque applied to the link 302.

In some embodiments, the combination of joint based sensors (e.g., the joint-based sensor 402) and non-joint based sensors (e.g., the six-axis load cell sensor 404 and the contact sensors 408 that are located in the link(s) 302 and/or in high collision areas) described above provides a unique sensor architecture for activating manual manipulation (e.g., an impedance mode) on the robotic arm 210.

In some circumstances, a user may apply a force on a robotic arm 210 during setup to move the robotic arm 210 (e.g., such as in a grab-and-go mode). In this situation, rather than reaching for an input button (e.g., the button 312 and/or the button 314 in FIG. 23), the user can simply apply a force on the robotic arm 210. If any or any group of the sensors described above measures a force that is above a predefined threshold when the robotic arm 210 is undocked, a processor will set the robotic arm 210 in manual manipulation mode (e.g., impedance mode), thereby allowing for manual manipulation of the robotic arm 210. In some embodiments, during the manual manipulation mode, the processor keeps (e.g., repeatedly, continuously, etc.) monitoring joint movements of the robotic arm 210. In some embodiments, in accordance with a determination that a joint speed is below a pre-defined threshold for a pre-defined period of time, the processor exits the manual manipulation mode. In accordance with the exiting of the manual manipulation mode, the robotic arm 210 is then set into a position control mode to hold its current position.

Alternatively, in some embodiments, forces can come from a patient during a surgical procedure. In this situation, if any or any group of the sensors described above measures a force that is above a predefined threshold, the robotic arm 210 can be converted into a manual manipulation mode, wherein an operator can move the arm (or a portion thereof) from the contact object to reduce contact force, thereby improving patient safety.

D. Exemplary Interactions with Links Using Contact Sensors

FIGS. 27A-D illustrate an exemplary interaction with a link of the robotic arm 210 according to some embodiments.

FIG. 27A illustrates contact by an external object (e.g., a user) on a link 302-2 of the robotic arm 210. The contact comprises a force 704 on the link 302-2 and is localized around a region 702. For example, the force 704 may represent a force arising from a grab and go action by the user on the robotic arm 210.

In some embodiments, and as discussed in FIGS. 25 and 26, the link 302-2 includes contact sensors 408 that are distributed along a length of the link 302-2. In some embodiments, the link 302-2 corresponds to a proximal link, and includes multiple (e.g., 14) contact sensors 408 that are distributed in the link 302-2, in accordance with the example shown in FIG. 26A.

In some embodiments, each of the sensors 408 in the link 302-2 comprises a force sensor. As discussed in FIG. 25, because the shell 502 surrounds the structural link 504 and the sensors 408 are located between the shell 502 and the structural link 504, the sensors 408 can detect the force on the shell 502 by the external object even though the sensors do not come into direct contact with the object. In some embodiments, each of the sensors 408 measures and outputs a respective force measurement, as shown in FIG. 27B. In some embodiments the robotic system 200 (e.g., via one or more processors) determines, according to the force distribution, whether to trigger a manual manipulation mode.

In some embodiments, each of the sensors 408 in the link 302-2 comprises a moment sensor. Each of the moment sensors (except the sensors that are located directly on or below the point of the contact) measures and outputs a respective moment measurement, as shown in FIG. 27C.

In some embodiments, the one or more processors of the robotic system 200 may combine the force and/or moment measurements of at least a subset of the sensors 408 to produce a combined force output and/or a combined moment output. FIG. 27D is an example force and moment diagram of the link 302-2, wherein the force and moment measurements of the sensors 408 at each end of the link 302-2 have been combined. In this example, the force measurements from the sensors 408 that are located near the end 706 of the link 302-2 (e.g., sensors 408-1 to 408-7) are combined to produce combined forces Fx_A, Fy_A, and Fz_A. The moment measurements are combined to produce combined moments Mx_A, My_A, and Mz_A. The force measurements from the sensors 408 that are located near the end 708 of the link 302-2 (e.g., sensors 408-8 to 408-14) are combined to produce combined forces Fx_B, Fy_B, and Fz_B. The moment measurements are combined to produce combined moments Mx_B, My_B, and Mz_B.

In some embodiments, a similar analysis applies for a distal link (e.g., link 302-3) of the robotic arm 210 that includes sensors 408. In some instances, the distal link may include multiple (e.g., 12) contact sensors 408 that are distributed in the link 302-3 according to the example shown in FIG. 26B.

In some embodiments, the robotic arm 210 includes contact sensors on multiple links of the robotic arm 210 (e.g., the robotic arm 210 includes contact sensors 408 on the link 302-2 and the link 302-3). In this case, the robotic system 200 can use sensor data from the various sensors located on the multiple links to determine whether to transition the robotic arm 210 to a manual manipulation mode.

Figure 28A:
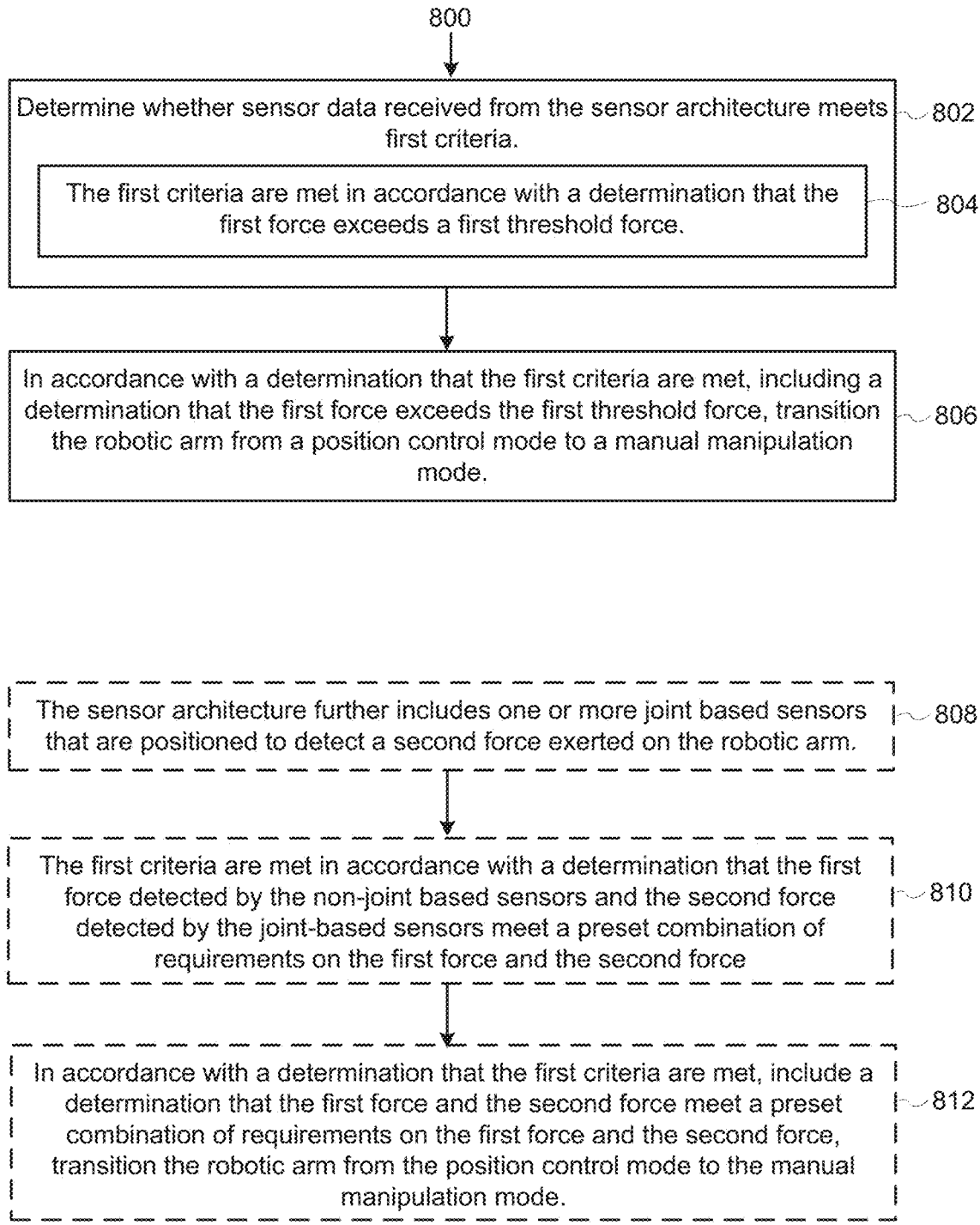
FIGS. 28A and 28B illustrate a flowchart diagram of a method for manual manipulation of a robotic arm according to some embodiments.
Figure 28B:
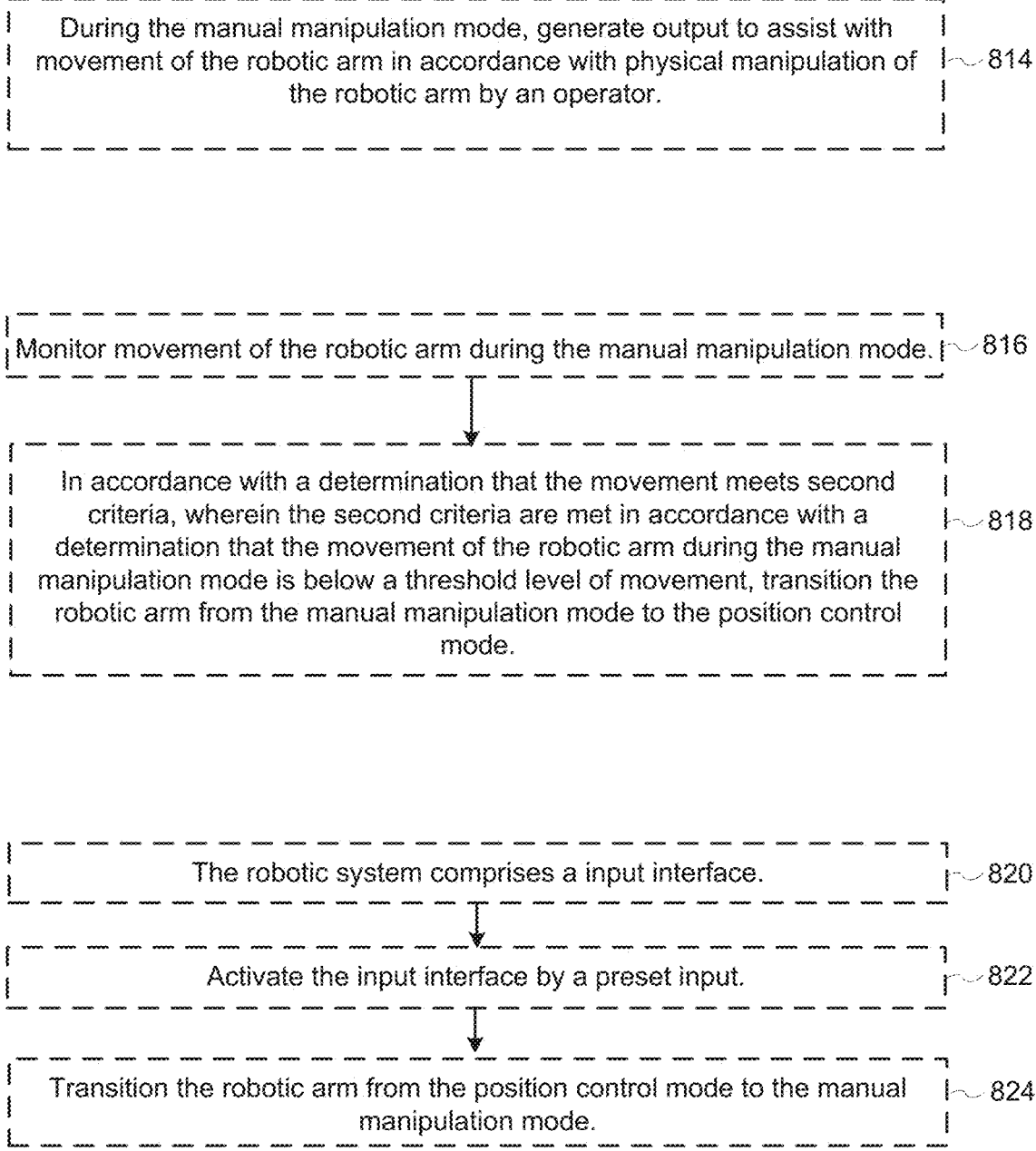

E. Example Methods and Systems of Activating Manual Manipulation on One or More Robotic Arms FIGS. 28A and 28B are a flowchart diagram of a method 800 for activating manual manipulation of a robotic arm according to some embodiments.

In some embodiments, the method 800 is performed by one or more processors of a robotic system (e.g., robotic system 200 as illustrated in FIGS. 21 and 22, or another robotic medical system, etc.) in accordance with instructions stored in memory of the robotic system. In some embodiments, the robotic system is a robotic medical system or a robotic surgery platform for performing a medical procedure on a patient.

In some embodiments, the robotic system comprises a robotic arm (e.g., robotic arm 210, or another type of robotic arm that may be operated in a position control mode, velocity control mode, and one or more manual manipulation modes, etc.). In some embodiments, the robotic arm may be a first robotic arm of two or more robotic arms of the robotic system (e.g., a first robotic arm 210-1 of robotic arms 210-1, 210-2, 210-3, etc., as illustrated in FIG. 22). In some embodiments, the robotic arm may be a single robotic arm of the robotic system.

In some embodiments, the robotic system also comprises a sensor architecture (e.g., the sensor architecture of a robotic arm as described with reference to FIGS. 24, 25, and 26, and, optionally, additional sensors distributed at various positions on and/or surround the robotic system). The sensor architecture includes one or more non-joint based sensors that are positioned to detect a first force exerted on the robotic arm. Further details regarding the non-joint based sensors are discussed below and with respect to FIGS. 24 to 27.

Referring to FIG. 28A, in some embodiments, the method 800 comprises determining (802) whether sensor data received from the sensor architecture meets first criteria. In some embodiments, the first criteria are met (804) in accordance with a determination that the first force (e.g., a force exerted on the robotic arm and detected by the sensor architecture) exceeds a first threshold force. In some embodiments, the method 800 further comprises: in accordance with a determination that the first criteria are met, including the determination that the first force exceeds the first threshold force, transitioning (806) the robotic arm from a position control mode to a manual manipulation mode.

In some embodiments, the first criteria include criteria for determining whether to switch the robotic system 200 to a manual manipulation mode based on various types of sensor data received from the sensor architecture. Optionally, in some embodiments, the sensor data may be used in combination with other requirements on the state of the robotic arm(s), and/or other safety and operation conditions, which are collectively used to determine whether or not the first criteria are met.

In some embodiments, the first criteria include a requirement that the robotic arm (e.g., robotic arm 210, or another type of robotic arm that may be operated in a position control mode and one or more manual manipulation modes, etc.) is in an undocked configuration. In some embodiments, the robotic arm is considered to be in an undocked configuration when the distal end of the robotic arm is not fixed to a cannula. In some embodiments, during the set-up stage before surgery, the operator may activate the impedance mode to set up an undocked robotic arm into a desired position or configuration, and/or move the undocked robotic arm out of the way to create space for other robotic arms or the people (e.g., patient, medical personnel, etc.) near the robotic system. In some embodiments, during surgery, one or more arms of the robotic system may be docked, and the operator may move an undocked arm out of the way to make room for the medical personnel. In some embodiments, when the configuration of the patient support platform 202 is changed during surgery, the operator may adjust the position of the undocked arm to accommodate the changed configuration of the robotic system. In some embodiments, the undocked robotic arm may bump into (e.g., contact with) the patient during surgery and exert force on the patient, and it is safer to move the undocked robotic arm away from the patient. In any of the above scenarios, transitioning into the manual manipulation mode in accordance with sensor data received from the sensor architecture, as opposed to activating a dedicated control device or interface located at a fixed position relative to the robotic system, makes the above tasks more easily performed by the operator, and safer for the patient.

In some embodiments, the first threshold force is a preset value (e.g., 30 Newton, 50 Newton, 65 Newton, etc.) selected from a range of values (e.g., 30 Newton-70 Newton). In some embodiments, the first threshold force is a force threshold that is operator-configured and/or operator-configurable. In some embodiments, the first criteria are met in accordance with other conditions being met without requiring the first force to exceed the first threshold force. For example, the first criteria are met in accordance with a determination that a first moment exerted on the robotic arm exceeds a threshold moment, or in accordance with a determination that a contact area between a user and one or more links of the robotic arm exceeds a threshold contact area, without requiring the first force to exceed the first threshold force.

In some embodiments, in the position control mode, the position of the robotic arm is fixed relative to a preselected portion of the robotic system (e.g., the adjustable arm support 220, the patient support platform 202, or the base 206 of the robotic system 200, etc.).

In some embodiments, the manual manipulation mode may comprise a non-power-assisted manual manipulation mode or a power-assisted manual manipulation mode, such as an impedance mode or an admittance mode. The manual manipulation mode may also comprise a mode in which the robotic arm can be moved and/or reconfigured by manually pushing, pulling, and/or twisting on one or more portions of the robotic arm, in accordance with some embodiments.

In some embodiments, the method 800 may further comprise: in accordance with a determination that the first criteria are not met, including a determination that the first force does not exceeds the first threshold force, forgoing transitioning the robotic arm from the position control mode to the manual manipulation mode, and keeping the robotic arm in the position control mode.

In some embodiments, the manual manipulation mode includes an impedance mode. In some embodiments, under the impedance mode (e.g., impedance control), the robotic system 200 measures displacements (e.g., changes in position and velocity (e.g., of the robotic arm, or a portion thereof)) and outputs forces to control movement of the robotic arm 210. In some embodiments, under impedance control, an operator's manual movement of one part of the robotic arm 210 may cause the one or more processors to drive movement of other parts of the robotic arm 210.

In some embodiments, once the robotic arm 210 transitions out of the position control mode and into the impedance mode, the one or more processors may cease to maintain a fixed position of the robotic arm 210, allow the robotic arm 210 to be moved by the forces and moments exerted on the robotic arm 210 by the operator, cause forces to be output in accordance with the movement of the robotic arm to counteract the operator's forces and moments, and/or drive movement of other parts of the robotic arm that is not directly touched by the operator.

In some embodiments, the one or more processors may cause automatic movement of one or more other robotic arms to avoid collision with the robotic arm.

In some embodiments, the manual manipulation mode includes an admittance mode (e.g., admittance control). In some embodiments, under admittance mode, the robotic system measures forces and/or torques imparted on the robotic arm by the operator and outputs corresponding velocities and/or positions for driving the movement of the robotic arm.

In some embodiments, once the robotic arm transitions out of the position control mode and into the admittance mode, the one or more processors may cease to maintain a fixed position of the robotic arm, move the robotic arm in accordance with the forces and moments exerted on the robotic arm by the operator, and/or to drive movement of other parts of the robotic arm that is not directly touched by the operator. In some embodiments, once the robotic arm transitions out of the position control mode and into the admittance mode, the one or more processors may cause automatic movement of one or more other arms to avoid collision with the robotic arm.

Referring again to FIG. 28A, in some embodiments, the sensor architecture further includes (808) one or more joint-based sensors that are positioned to detect a second force exerted on the robotic arm (e.g., robotic arm 210, or another type of robotic arm that may be operated in a position control mode and one or more manual manipulation modes, etc.). For example, a joint-based sensor can be located on a proximal end of the robotic arm (e.g., near a base of the robotic arm, such as the A0 joint sensor 402) in accordance with some embodiments. A joint-based sensor can also be located on a joint between two adjacent links (e.g., a sensor in the A3 joint 304-4 between two adjacent links 302-2 and 302-3), in accordance with some embodiments. In some embodiments, the first criteria are met (810) in accordance with a determination that the first force detected by the non-joint based sensors and the second force detected by the joint-based sensors meet a preset combination of requirements on the first force and the second force. In some embodiments, transitioning the robotic arm from the position control mode to the manual manipulation mode in accordance with a determination that the first criteria are met includes (812): in accordance with a determination that the first criteria are met, including a determination that the first force and the second force meet a preset combination of requirements on the first force and the second force, transitioning the robotic arm from the position control mode to the manual manipulation mode.

In some embodiments, and as described in FIG. 28B. the method 800 further comprises: during the manual manipulation mode, generating (814) output to assist with movement of the robotic arm (e.g., robotic arm 210, or another type of robotic arm that may be operated in a position control mode and one or more manual manipulation modes, etc.) in accordance with physical manipulation of the robotic arm by an operator. For example, in some embodiments, the one or more processors of the robotic system 200 may generate output in the form of control signals, to control output of forces (e.g., forces with controlled magnitude and/or direction) and/or movements (e.g., movements with controlled distance, velocity, and/or direction) of actuators, motors, and/or gears, to assist the operator with the physical manipulation of the robotic arm.

As further described in FIG. 28B, the method 800 further comprises monitoring (816) movement of the robotic arm (e.g., robotic arm 210, or another type of robotic arm that may be operated in a position control mode and one or more manual manipulation modes, etc.) during the manual manipulation mode. For example, the processors may continuously monitor or periodically check the movement of the robotic arm during the manual manipulation mode, including checking the movement of joints and/or the robotic arm as a whole. In some embodiments, the processors rely on sensor data that are received from position and displacement sensors of the sensor architecture to monitor movement of the robotic arm during the manual manipulation mode.

In some embodiments, and as described in FIG. 28B, the method 800 further comprises: in accordance with (818) a determination that the movement meets second criteria, wherein the second criteria are met in accordance with a determination that the movement of the robotic arm during the manual manipulation mode is below a threshold level of movement, transitioning the robotic arm (e.g., robotic arm 210, or another type of robotic arm that may be operated in a position control mode and one or more manual manipulation modes, etc.) from the manual manipulation mode to the position control mode.

In some embodiments, the second criteria comprise criteria for determining whether to switch back to the position control mode based on movement data received from the sensor architecture. Optionally, in some embodiments, the movement data is used in combination with other requirements on the state of the robotic arm(s), and/or other safety and operation conditions to determine whether the second criteria are met.

In some embodiments, the one or more processors determine that the movement of the manual manipulation mode is below a threshold level of movement when the movement is less than a threshold amount of movement during a threshold amount of time, and/or when no movement is detected for a threshold amount of time.

In some embodiments, transitioning the robotic arm from the manual manipulation mode to the position control mode comprises deactivating the manual manipulation mode. For example, in some embodiments, when the processors detect that the speed of the joint(s) and/or the robotic arm 210 is below a pre-defined threshold for a pre-defined period of time, the robot controller exits the impedance mode. This sets the robotic arm 210 back in the position control mode to hold its current position.

With continued reference to FIG. 28B, in some embodiments, the robotic system (e.g., the robotic system 200, or another robotic medical system or robotic surgical platform, etc.) further comprises (820) an input interface. The method 800 comprises detecting (822) activation of the input interface by a preset input. The method 800 further comprises transitioning (824) the robotic arm (e.g., robotic arm 210, or another type of robotic arm that may be operated in a position control mode and one or more manual manipulation modes, etc.) from the position control mode to the manual manipulation mode in accordance with the activation of the input interface by the preset input.

In some embodiments, the input interface can comprise a push button, a touch-sensitive display, a touch-pad with a display, a lever, or a switch. The preset input can comprise a press input, a flick, or a tap on the input interface).

In some embodiments, the location at which the input interface can be activated is relatively small and fixed relative to a portion of the robotic system (e.g., fixed to a distal end of a robotic arm, fixed to a small area on the edge of the patient support platform, on a pendent control attached to the head of the patient support platform, etc.), such that it may not be within arm's reach of an operator when the operator is located at different areas near the robotic system.

In some embodiments, only a single type of input can be used to activate the input interface to cause transition into the manual manipulation mode. This is in contrast to how the sensor-based activation of manual manipulation mode can work. For example, the sensors provide viable input areas throughout the joints and links along the robotic arm, so the user is not required to reach for a particular fixed portion of the robotic arm, in accordance with various embodiments. Furthermore, in some embodiments, the sensor data from the joint-based sensors and the non-joint based sensors are analyzed in combination to determine the operator's interaction with the robotic arm 210, and evaluated as a whole, to determine whether the criteria for activating the manual manipulation mode are met. In this way, the operator is not required to provide a single type of input with stringent unyielding requirements such as those for a push button, a switch, or a touch-screen.

In some embodiments, the user can adaptively use different kinds of hand postures, arm configurations, different body parts, and/or different combinations of forces and torques, to activate the manual manipulation mode, based on his/her own current position and comfort. For example, an operator may bend two links of the robotic arm toward each other, twist a distal end of the robotic arm, pushing the robotic arm downward against the adjustable arm support, push on a link, pull on a link, grab on one link and push on another link or joint using his/her shoulder, etc., to activate the manual manipulation mode depending on the current spatial relationship between the robotic arm and the operator. The processors will react to activate the manual manipulation mode based on whether the preset criteria are met by the sensor data, irrespective of which of the above method is used. Furthermore, when a patient leans or bumps into any part of the robotic arm with sufficient force, the processors will activate the manual manipulation mode and move the robotic arm out of the way (e.g., as opposed to requiring the medical personnel to push on the push button, or move the patient or the robotic arm out of the way, etc.) to improve patient safety.

As described earlier, the method 800 can be performed by a robotic system that comprises a robotic arm (e.g., robotic arm 210, or another type of robotic arm that may be operated in a position control mode and one or more manual manipulation modes, etc.) and a sensor architecture, in accordance with some embodiments. In some embodiments, the robotic system comprises the sensor architecture (e.g., the sensor architecture that is described with respect to FIGS. 24, 25, and 26). In some embodiments, the sensor architecture includes one or more types of sensors, such as force sensors, contact sensors, pressure sensors, moment sensors, displacement sensors (e.g., angular and/or translational displacement sensors), and/or position sensors. The sensors are positioned to detect and, optionally, measure, contact, moment, force, and/or displacement experienced by the robotic arm or a portion thereof. In some embodiments, the sensor architecture includes sensors that are integrated with (e.g., affixed to, part of, included within, on the surface of, attached to, embedded under the surface of, installed between portions (e.g., between adjacent links, between adjacent joints, between surface cover and structure link, etc.) of, installed at the end(s) of, on or within a link (e.g., link 302) of, and/or on or within a joint (e.g., joint 304) of) the robotic arm. In some embodiments, the sensor architecture can include other components for communicating sensor data from the sensors to one or more processors. The sensor data can include sensor parameters, such as force, contact, moment, displacement, movement, and/or position etc. The sensor parameters can also include values, such as a location of the sensed parameter, a magnitude of the sensed parameter, timing and/or duration of the sensed parameter.

In some embodiments, the sensor architecture includes one or more non-joint based sensors (e.g., non-joint based sensors located on or within a link of the robotic arm, between two adjacent joints, as illustrated in FIGS. 23 and 24). In accordance with some embodiments of the present disclosure, the non-joint sensors can be positioned to detect a first force exerted on the robotic arm.

In some embodiments, the one or more non-joint based sensors can be located on or within a link of the robotic arm, between two adjacent joints. For example, referring to FIGS. 23 and 24, the one or more non-joined based sensors can be located within the link 302-2 between the A2 joint 304-3 and the A3 joint 304-4, and/or within the link 302-3 between the A3 joint 304-4 and the A4 joint 304-5, and/or within the link 302-4 between the A4 joint 304-5 and the A5 joint 304-6.

In some embodiments, the non-joint based sensors can be located between two adjacent joints that do not have a link between them. For example, in FIG. 24A, the six-axis load cell 404 can be located directly between the A4 joint 304-5 and the A5 joint 304-6 without the presence of the link 302-4 between the joints.

In some embodiments, the non-joint based sensors can also be located between a joint and an adjacent end effector of the robotic arm, such as between the A5 joint 304-6 and the end effector 308 in FIG. 23. The non-joint based sensors can also be located on a portion of the robotic arm that is not a joint of the robotic arm.

In some embodiments, the non-joint based sensors include one or more force sensors, one or more moment sensors, and/or one or more force and moment sensors. In some embodiments, the first force exerted on the robotic arm is a force other than gravity. The first force may include a force resulted from contact between the robotic arm and a person in the physical environment, as illustrated in the example of FIG. 27. For example, the first force may be exerted on a surface, on a link, on a joint, and/or on an end effector of the robotic arm.

In some embodiments, the sensor architecture also includes one or more non-joint based position sensors and movement sensors that measure position and movement (e.g., rotation and/or translation) of the robotic arm or a portion thereof (e.g., link, joint, end effector, etc.).

In accordance with some embodiments, an advantage of using sensor data from a non-joint based sensor (e.g., a sensor that is located on a link of the robotic arm) to trigger the manual manipulation mode is that the non-joint based sensor directly detects force and/or moment on a link of the robotic arm. Thus, a force and/or moment does not have to be applied on a joint and/or in a specific direction in order for the force and/or moment to be detected. Accordingly, the non-joint based sensors greatly expand the available opportunities and ways for an operator to activate the manual manipulation mode by direct interaction with the robotic arm.

In some embodiments, the one or more non-joint based sensors include a combined force and moment sensor. For example, the combined force and moment sensor may comprise a six-axis load cell (e.g., six-axis load cell 404, FIG. 24A), and/or an array of shell sensors (e.g., contact sensors 408).

In some embodiments, the combined force and moment sensor includes a six-axis load cell that has the ability to measure force and moments in all six directions (e.g., forces in the X, Y, and Z directions, as well as the moment or torque in the X, Y, Z directions (e.g., rotational forces around the X, Y, and Z axis)).

In some embodiments, the combined force and moment sensor is capable of measuring force in a subset of the X, Y, Z directions, and measuring moment or torque in the same subset of the X, Y, Z directions. In some embodiments, the combined force and moment sensor is capable of measuring force in one subset of the X, Y, Z directions and measuring moment or torque in a different subset of the X, Y, Z directions. In some embodiments, the combined force and moment sensor is capable of measuring force in all of the X, Y, Z directions, and measuring moment in a subset of the X, Y, Z directions. In some embodiments, the combined force and moment sensor is capable of measuring force in a subset of the X, Y, Z directions, and measuring moment in all of the X, Y, Z directions.

In some embodiments, the one or more non-joint sensors include at least a first sensor that is located between a pair of joints of the robotic arm. In some embodiments, the first sensor is located on a link between the pair of joints (e.g., link 302-2 between the joints 304-3 and 304-4), or directly between two adjacent joints without a link. In some embodiments, the one or more non-joint sensors include at least a first sensor that is located in a distal portion of the robotic arm.

For example, the one or more non-joint sensors include a sensor 404 (e.g., a six-axis load cell) that is located in a distal portion of the robotic arm 210, between the A4 joint 304-5 and the A5 joint 304-6. In some embodiments, the distal portion of the robotic arm 210 includes a joint (e.g., the A6 joint 304-5) and an end effector (e.g., ADM 308).

In some embodiments, the robotic system (e.g., robotic system 200, or another robotic medical system or robotic surgical platform, etc.) further comprises a tool driver that is mounted on the first sensor such that the first sensor detects force exerted by the tool driver.

In some embodiments, the tool driver comprises an advanced device manipulator (ADM) 308, as illustrated in FIG. 23A. The force exerted by the tool driver can comprise force caused by a tool inserted into a patient's body. The force can also comprise a force exerted on the tool driver itself by an operator. In some embodiments, the first sensor is a combined force and moment sensor that is installed between two adjacent joints located at the distal end portion of the robotic arm, and the first sensor (e.g., a six-axis load cell 404, or other types of combined force and moment sensors) allows interaction forces between the tool driver and the distal end of the robotic arm to be detected and measured.

As illustrated in FIG. 23A, the robotic arm 210 includes a cannula sensor 310 for detecting the presence of a cannula, which determines the docked state of the robotic arm 210.

The robotic arm 210 may be allowed to transition (e.g., via the processors) into the manual manipulation mode only when the robotic arm 210 is in an undocked state. When the robotic arm 210 is in a docked state, forces exerted by the tool driver will not cause the processors to transition into the manual manipulation mode, even if the forces exceed a preset threshold for transitioning into the manual manipulation mode when the robotic arm is not docked.

In some instances, the one or more non-joint based sensors comprises a six-axis load cell (e.g., six-axis load cell 404).

In some embodiments, the one or more non-joint based sensors include one or more contact sensors (e.g., contact sensors 408) located on one or more links of the robotic arm. The contact sensors comprise sensors that detect and measure contact with another object or surface. In some embodiments, the contact sensors detect and measure contact in accordance with a determination that a contact force between the sensor and the object/surface exceeds a contact detection force threshold, or in accordance with a determination that a distance between the sensor and another object or surface is less than a contact detection threshold distance, or in accordance with a determination that an area of contact between the sensor and another object or surface is more than a threshold contact area.

In some embodiments, the contact sensors are located at positions (e.g., regions) on the robotic arm that are known to regularly collide with a patient during surgery (e.g., regions 410 as illustrated in FIG. 24C, regions 412 as illustrated in FIG. 24D, etc.). In some circumstances, forces can come from a patient during a surgical procedure. In this situation, if the contact sensors (or any other sensors described in this application) measure a force that is above a predefined threshold, the robotic arm 210 can be transitioned into the manual manipulation mode, whereby it can move away from the source of the contact. This advantageously enhances patient safety.

In some embodiments, the contact sensors detect the manner by which an operator is holding the robotic arm 210. For example, the manual manipulation mode is, optionally, triggered in response to detecting that an operator is holding the robotic arm in a certain manner (e.g., holding two links at the same time, holding a link with two hands, holding one link with two hands while twisting the link around a longitudinal axis of the link, holding one or two links while pulling the link(s) in a longitudinal direction of the link(s), grabbing and pulling on a first distal link, grabbing and pushing on a first proximal link, grabbing and pushing a proximal link against a base joint, etc.). In some embodiments, the various manners by which an operator is holding the arm and exerting the forces on the robotic arm that are natural precursors of desired movements of the robotic arm can, optionally, be cataloged and abstracted into different criteria (e.g., thresholds and conditions) that when met cause the processors to transition into the manipulation mode.

In some embodiments, the contact sensors are capable of detecting force and moment exerted on the robotic arm 210.

In some embodiments, the contact sensors can sense forces and moments in multiple directions. In some embodiments, the contact sensors include an array of multiple contact force sensors attached to an outer surface of a link of the robotic arm, as illustrated in FIG. 25. In some embodiments, the contact sensors have a suspended "shell" around an outside of a robotic arm link on which the contact force sensors are installed, and the shell engages with the contact force sensors to allow forces exerted on the surface of the robotic arm link to be detected and measured. This is illustrated in FIG. 25. In some embodiments, the robotic arm 210 includes contact sensors on multiple links of the robotic arm. For example, the robotic arm 210 includes contact sensors 408 on the link 302-2 and the link 302-3 of the robotic arm 210.

In some embodiments, the contact sensors on a respective link of the robotic arm are distributed across an extended area on the surface of the link. In some embodiments, when an operator grabs a respective link with one or both hands, contact sensors located in multiple portions (e.g., multiple disjointed portions) of the extended areas may be activated and locations and/or sensor data of the activated portions are, optionally, used to determine how the operator is holding onto the link, and/or attempting to move the link. In some embodiments, when an operator simultaneously grabs or pushes on multiple links (e.g., with hand(s), arm(s), torso, leg(s), etc.), contact sensors located in multiple links may be activated and locations and/or sensor data of the activated areas on the links are, optionally, used to determine how the operator is holding onto the links, and/or attempting to move the links. In some embodiments, the force and/or moment data obtained through the contact sensors on the links are used by the one or more processors to determine whether to transition from the position control mode to the manual manipulation mode, without requiring the sensor data from the joint-based sensors.

In some embodiments, the force and/or moment data obtained through the contact sensors on the links are used by the one or more processors to determine whether to transition from the position control mode to the manual manipulation mode, in combination with the sensor data from the joint-based sensors. In some embodiments, the contact sensors provide an additional means for activating the manual manipulation mode when the operator is not in a position to easily reach the dedicated control interface located at a fixed position relative to the robotic system (e.g., a push button or a donut button located at the distal end of the robotic arm) for activating the manual manipulation mode.

In some embodiments, the sensor data from the contact sensors are, optionally, used to provide information for controlling other types of automatic movement of the robotic arms (e.g., avoid collision, resolving impact, mapping out high probability collision zones in the physical environment, etc.).

In some embodiments, the sensor architecture comprises one or more joint based sensors. For example, a joint-based sensor can be located on a proximal end of the robotic arm (e.g., near a base of the robotic arm, such as the A0 joint sensor 402). A joint-based sensor can also be located on a joint between two adjacent links (e.g., a sensor in the A3 joint 304-4 between two adjacent links 302-2 and 302-3).

In some embodiments, the joint-based sensor is a force sensor. In some embodiments, the joint-based sensor is a combined force and moment sensor. In some embodiments, the force and/or moment data obtained through the one or more joint-based sensors are used by the one or more processors to determine whether to transition from the position control mode to the manual manipulation mode, without requiring the sensor data from the non-joint based sensors. For example, the first criteria are capable of being met without requiring the first force to exceed the first threshold force, as long as the second force exceeds a second threshold force. In some embodiments, the force and/or moment data obtained through the joint-based sensors are used by the one or more processors to determine whether to transition from the position control mode to the manual manipulation mode, in combination with the sensor data from the non-joint-based sensors (e.g., the first criteria are capable of being met without requiring the first force exceeds the first threshold force, as long as the first force and the second force together meet some preset combination of requirements on the first force and the second force).

In some embodiments, the joint-based and/or non-joint based sensors sense forces that may come from an operator intending to move the robotic arm 210 during set-up (e.g., such as in a grab-and-go mode). In this situation, rather than reaching for an input button, an operator can simply apply a force or moment on various parts of the robotic arm or holding it in one or more suitable manners. If any one or any combination of the sensors described above measures a force or combination of forces that meet the first criteria when the robotic arm is undocked, the processor will set the robotic arm 210 in the manual manipulation mode, thereby allowing manual manipulation of the robotic arm 210. In some embodiments, during the manual manipulation mode, one or more joints of the robotic arm 210 are manually moved (e.g., translated, rotated, etc.) relative to the physical environment (e.g., changing configuration) and/or the whole robotic arm 210 is manually moved in the physical environment. For example, the whole robotic arm 210 is manually translated or rotated, with or without changing configuration of the robotic arm 210.

In some embodiments, the robotic system 200 further comprises one or more additional robotic arms. The robotic system 200 further comprises an input interface that remotely activates impedance control of the first robotic arm and/or the additional robotic arms.

Figure 29:
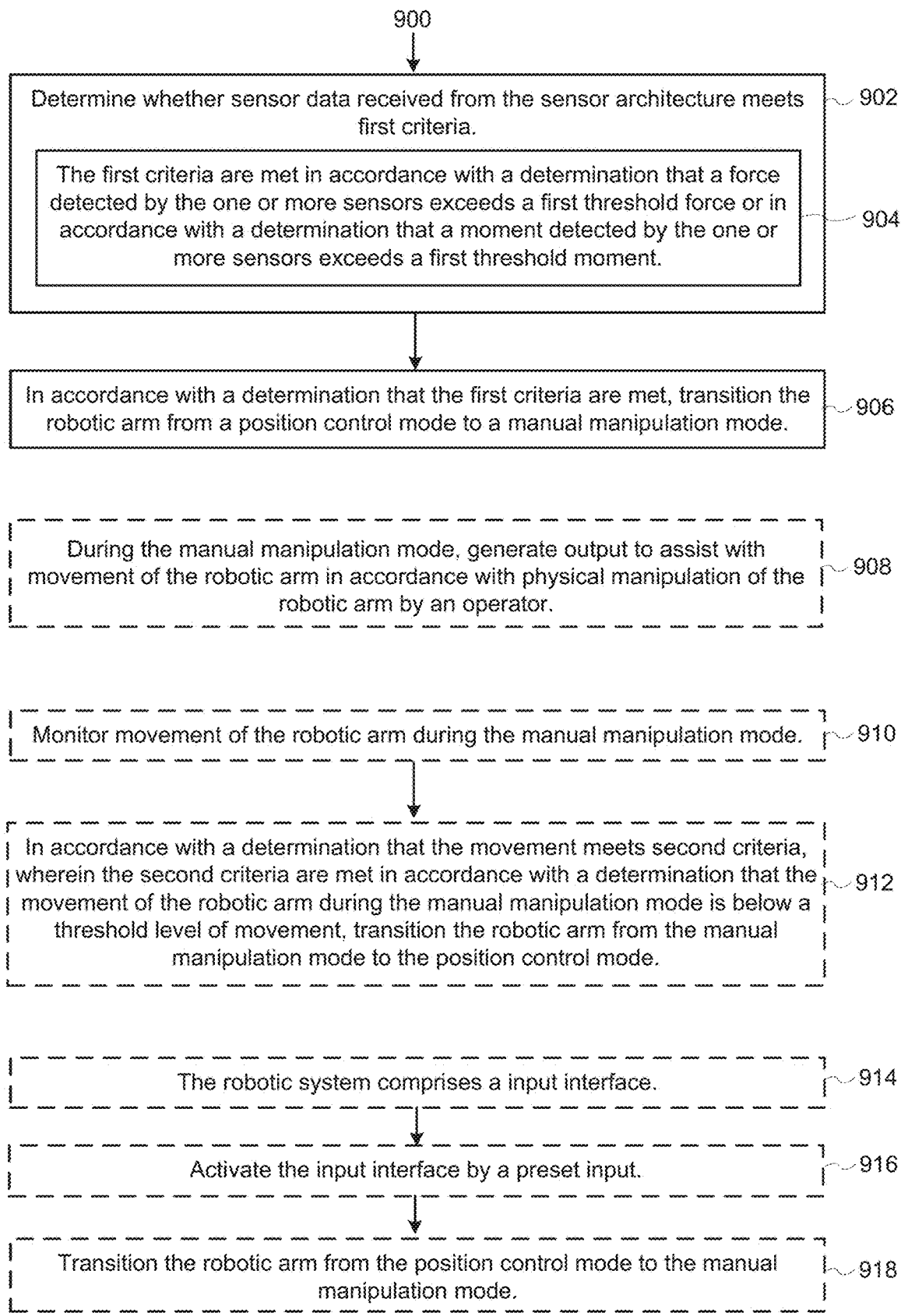
FIG. 29 illustrates a flowchart diagram of a method 900 of a method for manual manipulation of a robotic arm according to some embodiments.

FIG. 29 is a flowchart diagram of a method 900 for activating manual manipulation of a robotic arm according to some embodiments. In some embodiments, the method 900 is performed by one or more processors of a robotic system (e.g., robotic system 200 as illustrated in FIGS. 21 and 22, or another robotic system or robotic surgical platform, etc.) in accordance with instructions stored in memory of the robotic system. In some embodiments, the robotic system may be a robotic medical system or a robotic surgery platform for performing a medical procedure on a patient.

The robotic system comprises a robotic arm (e.g., robotic arm 210, or another type of robotic arm that may be operated in a position control mode and one or more manual manipulation modes, etc.). In some embodiments, the robotic arm may be a first robotic arm of two or more robotic arms of the robotic system (e.g., a first robotic arm 210-1 of robotic arms 210-1, 210-2, 210-3, etc., as illustrated in FIG. 22). In some embodiments, the robotic arm may be a single robotic arm of the robotic system.

The robotic system comprises a sensor architecture (e.g., the sensor architecture as described in FIGS. 24, 25, and 26). The sensor architecture includes one or more sensors (e.g., the A0 joint sensor 402, the six-axis load cell 404, and/or the contact sensors 408, etc.) that are positioned to detect force and/or moment exerted on the robotic arm 210.

Referring to FIG. 29, in some embodiments, the method 900 comprises determining (902) whether sensor data received from the sensor architecture meets first criteria.

In some embodiments, in reference to FIG. 29, the first criteria are met (904) in accordance with a determination that a force detected by the one or more sensors exceeds a first threshold force or in accordance with a determination that a moment detected by the one or more sensors exceeds a first threshold moment.

In some embodiments, the method 900 further comprises: in accordance with (906) a determination that the first criteria are met (e.g., the detected force or moment exceeds a respective threshold value), transitioning the robotic arm from a position control mode to a manual manipulation mode.

In some embodiments, the first criteria comprise criteria for determining whether to switch to manual manipulation mode based on various types of sensor data received from the sensor architecture. Optionally, in some embodiments, the sensor data may be used in combination with other requirements on the state of the robotic arm(s), and/or other safety and operation conditions, which are collectively used to determine the first criteria.

In some embodiments, the first threshold force is a preset value (e.g., 30 Newton, 50 Newton, 65 Newton, etc.) selected from a range of values (e.g., 30 Newton-70 Newton). In some embodiments, the first threshold force is a force threshold that is operator-configured and/or operator-configurable.

In some embodiments, the first threshold moment is a preset value (e.g., 0.3 Newton-meter, 0.5 Newton-meter, 0.6 Newton-meter, etc.) selected from a range of values (e.g., 0.3 Newton-meter-0.7 Newton-meter). In some embodiments, the first threshold moment is a moment threshold that is operator-configured and/or operator-configurable.

In some embodiments, when setting a threshold for moment measurement while force(s) are also measured, the setting of the threshold moment comprises the identification and use of a reference point (e.g., a pivot point), because the force can have different contribution to the total moment values, depending on where that reference point is. For example, in some embodiments, when a reference point is set at where a force is applied, the contribution to moment is zero; however, if the reference point is chosen some distance away, the moment contribution is non-zero. In some embodiments, the further away the reference point from the point the force is applied, the larger contribution to the moment. For example, in some embodiments, if the remote center point (e.g., a point along the cannula) is chosen as the reference point, the threshold movement can be 4 Nm, 6 Nm, or 8 Nm.

In some embodiments, the first criteria include a requirement that the robotic arm (e.g., robotic arm 210, or another type of robotic arm that may be operated in a position control mode and one or more manual manipulation modes, etc.) is in an undocked configuration in order for the first criteria to be met. In some embodiments, the robotic arm (e.g., robotic arm 210, or another type of robotic arm that may be operated in a position control mode and one or more manual manipulation modes, etc.) is determined to be in an undocked configuration. In some embodiments, the robotic arm is determined to be in an undocked configuration when the distal end of the robotic arm is not fixed to a cannula.

In some embodiments, during the set-up stage before surgery, the operator may activate the impedance mode or an admittance mode to set up an undocked robotic arm into a desired position or configuration, or move the undocked robotic arm out of the way to create space for other robotic arms or the people (e.g., patient, medical personnel, etc.) near the robotic system. In some embodiments, during surgery, one or more arms of the robotic system may be docked, and the operator may move an undocked arm out of the way to make room for the medical personnel. In some embodiments, when the configuration of the patient support platform is changed during surgery, the operator may adjust the position of the undocked arm to accommodate the changed configuration of the robotic system. In some embodiments, the undocked robotic arm may bump into (e.g., contact with) the patient during surgery and exert force on the patient, and it is safer to move the undocked robotic arm away from the patient. In any of the above scenarios, transitioning into the manual manipulation mode in accordance with sensor data received from the sensor architecture, as opposed to activating a dedicated control device or interface located at a fixed position relative to the robotic system, makes the above tasks more easily performed by the operator, and safer for the patient.

In some embodiments, in the position control mode, the position of the robotic arm (e.g., robotic arm 210, or another type of robotic arm that may be operated in a position control mode and one or more manual manipulation modes, etc.) is fixed relative to a preselected portion (e.g., the adjustable arm support 220, the patient support platform 202, the base 206, etc.) of the robotic system.

In some embodiments, the manual manipulation mode may comprise a non-power-assisted manual manipulation mode or a power-assisted manual manipulation mode, such as an impedance mode or an admittance mode. The manual manipulation mode may also comprise a mode in which the robotic arm (e.g., robotic arm 210, or another type of robotic arm that may be operated in a position control mode and one or more manual manipulation modes, etc.) can be moved and/or reconfigured by manually pushing, pulling, and/or twisting on one or more portions of the robotic arm, in accordance with some embodiments.

In some embodiments, the manual manipulation mode includes an impedance mode.

In some embodiments, in accordance with a determination that the first criteria are not met (e.g., including a determination that neither the detected force nor the detected moment exceed their respective threshold values), the method 900 comprises forgoing transitioning the robotic arm from the position control mode to the manual manipulation mode, and keeping the robotic arm (e.g., robotic arm 210, or another type of robotic arm that may be operated in a position control mode and one or more manual manipulation modes, etc.) in the position control mode.

Referring to FIG. 29, in some embodiments, the method 900 comprises: during the manual manipulation mode, generating (908) output to assist with movement of the robotic arm (e.g., robotic arm 210, or another type of robotic arm that may be operated in a position control mode and one or more manual manipulation modes, etc.) in accordance with physical manipulation of the robotic arm by an operator.

For example, in some embodiments, the one or more processors of the robotic system may generate output in the form of control signals, to control output of forces (e.g., forces with controlled magnitude and/or direction) and/or movements (e.g., movements with controlled distance, velocity, and/or direction) of actuators, motors, and/or gears, to assist the operator with the physical manipulation of the robotic arm.

In some embodiments, the method 900 further comprises monitoring (910) movement of the robotic arm 210 during the manual manipulation mode. In accordance with a determination that the movement meets second criteria, wherein the second criteria are met in accordance with a determination that the movement of the robotic arm during the manual manipulation mode is below a threshold level of movement, the method 900 comprises transitioning (912) the robotic arm (e.g., robotic arm 210, or another type of robotic arm that may be operated in a position control mode and one or more manual manipulation modes, etc.) from the manual manipulation mode to the position control mode.

With reference to step 910, in some embodiments, the processors of the robotic system may continuously monitor or periodically check the movement of the robotic arm (e.g., robotic arm 210, or another type of robotic arm that may be operated in a position control mode and one or more manual manipulation modes, etc.) during the manual manipulation mode, including, for example, checking the movement of joints 304 and/or the robotic arm 210 as a whole. In some embodiments, the processors rely on sensor data that are received from position and displacement sensors of the sensor architecture to monitor movement of the robotic arm during the manual manipulation mode.

In some embodiments, the second criteria comprise criteria for determining whether to switch back to the position control mode based on movement data received from the sensor architecture. Optionally, in some embodiments, the movement data is used in combination with other requirements on the state of the robotic arm(s) (e.g., robotic arms 210), and/or other safety and operation conditions to determine whether the second criteria are met.

In some embodiments, the second criteria are met when the movement is less than a threshold amount of movement during a threshold amount of time, or when no movement is detected for a threshold amount of time.

In some embodiments, transitioning the robotic arm (e.g., robotic arm 210, or another type of robotic arm that may be operated in a position control mode and one or more manual manipulation modes, etc.) from the manual manipulation mode to the position control mode comprises deactivating the manual manipulation mode. For example, when the processors detect that the speed of the joint(s) (e.g., joints 304) and/or the robotic arm is below a pre-defined threshold for a pre-defined period of time, the robot controller exits the impedance mode. This sets the robotic arm back in the position control mode to hold its current position, in accordance with some embodiments.

As also described in FIG. 29, in some embodiments, the robotic system comprises (914) an input interface. The method 900 comprises detecting (916) activation of the input interface by a preset input. The method 900 comprises in accordance with the activation of the input interface, transitioning (918) the robotic arm (e.g., robotic arm 210, or another type of robotic arm that may be operated in a position control mode and one or more manual manipulation modes, etc.) from the position control mode to the manual manipulation mode.

In some embodiments, the input interface can comprise a push button, a touch-sensitive display, a touch-pad with a display, a lever, or a switch. The preset input can comprise a press input, a flick, or a tap on the input interface.

As described earlier, the method 900 can be performed by a robotic system that comprises a robotic arm (e.g., robotic arm 210, or another type of robotic arm that may be operated in a position control mode and one or more manual manipulation modes, etc.) and a sensor architecture according to some embodiments.

In some embodiments, the robotic system comprises the sensor architecture. (e.g., the sensor architecture that is described in FIGS. 24, 25, and 26). In some embodiments, the sensor architecture includes one or more types of sensors, such as force sensors, contact sensors, pressure sensors, moment sensors, displacement sensors (e.g., angular and/or translational displacement sensors), and/or position sensors. The sensors are positioned to detect and, optionally, measure, contact, moment, force, and/or displacement experienced by the robotic arm or a portion thereof. In some embodiments, the sensor architecture includes sensors that are integrated with (e.g., affixed to, part of, included within, on the surface of, attached to, embedded under the surface of, installed between portions (e.g., between adjacent links, between adjacent joints, etc.) of, installed at the end(s) of, on or within a link (e.g., link 302) of, and/or on or within a joint (e.g., joint 304) of) of the robotic arm. In some embodiments, the sensor architecture can include other components for communicating sensor data from the sensors to one or more processors. The sensor data can include sensor parameters, such as force, contact, moment, displacement, movement, and/or position etc. The sensor parameters can also include values, such as a location of the sensed parameter, a magnitude of the sensed parameter, timing and/or duration of the sensed parameter.

In some embodiments, the sensor architecture includes one or more sensors (e.g., the A0 joint sensor 402, the six-axis load cell 404, and/or the contact sensors 408, etc.) that are positioned to detect force and/or moment exerted on the robotic arm 210. In some embodiments, the one or more sensors detect force and/or moment exerted on the robotic arm 210 from multiple directions. The detected force and/or moment comprises force and/or moment other than that caused by gravity. In some embodiments, the force and/or movement exerted by the robotic arm 210 are force and/or moment caused by contact between a person and the robotic arm 210, such as on the surface, on a link (e.g., link 302), on a joint (e.g., joint 304), on an end effector (e.g., ADM 308), etc. of the robotic arm 210.

In some embodiments, the one or more sensors comprise a six-axis load cell.

In some embodiments, the one or more sensors comprise a plurality of contact sensors (e.g., contact sensors 408, FIG. 24B).

In some embodiments, the contact sensors comprise sensors that detect and measure contact with another object or surface. In some embodiments, the contact sensors detect and measure contact in accordance with a determination that a contact force between the sensor and the object/surface exceeds a contact detection force threshold, or in accordance with a determination that a distance between the sensor and another object or surface is less than a contact detection threshold distance, and/or in accordance with a determination that an area of contact between the sensor and another object or surface is more than a threshold contact area.

In some embodiments, the contact sensors are located at positions (e.g., regions) on the robotic arm that are known to regularly collide with a patient during surgery (e.g., regions 410 as illustrated in FIG. 24C, regions 412 as illustrated in FIG. 24D, etc.). In some circumstances, forces can come from a patient during a surgical procedure. In this situation, if the contact sensors (or any other sensors described in this application) measure a force that is above a predefined threshold, the robotic arm 210 can be transitioned into the manual manipulation mode, whereby it can be promptly moved away from the source of the contact, in accordance with some embodiments. This advantageously enhances patient and/or operator safety.

In some embodiments, the contact sensors detect the manner by which an operator is holding the robotic arm 210. For example, the manual manipulation mode is, optionally, triggered in response to detecting that an operator is holding the robotic arm in a certain manner (e.g., holding two links at the same time, holding a link with two hands, holding one link with two hands while twisting the link around a longitudinal axis of the link, holding one or two links while pulling the link(s) in a longitudinal direction of the link(s), grabbing and pulling on a first distal link, grabbing and pushing on a first proximal link, grabbing and pushing a proximal link against a base joint, etc.).

In some embodiments, the various manners by which an operator is holding the arm and exerting the forces on the robotic arm that are natural precursors of desired movements of the robotic arm can, optionally, be cataloged and abstracted into different criteria (e.g., thresholds and conditions) that when met cause the processors to transition into the manipulation mode.

In some embodiments, the robotic arm (e.g., robotic arm 210, or another type of robotic arm that may be operated in a position control mode and one or more manual manipulation modes, etc.) includes an outer surface. For example, the plurality of contact sensors (e.g., contact sensors 408) may engage with a shell (e.g., shell 502, FIG. 25) covering the outer surface of the robotic arm.

In some embodiments, the detected force and moment is a combination of a respective force and/or a respective moment detected by a respective one of the plurality of contact sensors.

In some embodiments, the one or more sensors include at least a non-joint based sensor that is positioned away from a joint of the robotic arm. For example, the non-joint based sensor (e.g., contact sensors or shell sensors 408) can be positioned on a link (e.g., link 302), or between two adjacent joints (e.g., six-axis load cell 404 positioned between the A4 joint 304-5 and the A5 joint 304-6).

In some embodiments, the one or more sensors include at least a joint-based sensor that is positioned on a joint of the robotic arm 210 (e.g., A0 joint sensor 402, and/or sensors that are located on other joints 304 of the robotic arm 210).

3. Implementing Systems and Terminology

Embodiments disclosed herein provide systems, methods and apparatus for activating a manual manipulation mode on robotic arms of a robotic medical system using linkage interaction sensing.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The functions for transitioning to a manual manipulation mode described herein may be stored as one or more instructions on a processor-readable or computer-readable medium. The term "computer-readable medium" refers to any available medium that can be accessed by a computer or processor. By way of example, and not limitation, such a medium may comprise random access memory (RAM), read-only memory (ROM), electrically erasable programmable read-only memory (EEPROM), flash memory, compact disc read-only memory (CD-ROM) or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the embodiments shown herein but is to be accorded the widest scope consistent with the principles and novel features disclosed herein.

What is claimed is:

1. A robotic system, comprising:
   a robotic arm, the robotic arm including:
      a structural link, and
      a shell, the shell surrounding the structural link;
   a sensor architecture, including one or more non-joint-based sensors that are positioned to detect a first force exerted on the robotic arm, at least one of the one or more non-joint-based sensors being positioned and configured to detect the first force exerted on the robotic arm by detecting relative movement between the shell and the structural link;
   one or more processors; and
   memory storing instructions that, when executed by the one or more processors, cause the processors to:
      determine whether sensor data received from the sensor architecture meets first criteria, wherein the first criteria are met in accordance with a determination that the first force exceeds a first threshold force and a determination that the robotic arm is in an undocked configuration in which the robotic arm is not coupled with a cannula; and
   in accordance with a determination that the first criteria are met, including a determination that the first force exceeds the first threshold force and a determination that the robotic arm is in the undocked configuration, transition the robotic arm from a position control mode to a manual manipulation mode.

2. The robotic system of claim 1, wherein the one or more non-joint-based sensors include a combined force and moment sensor.

3. The robotic system of claim 1, wherein the one or more non-joint-based sensors include at least one sensor that is located between a pair of joints of the robotic arm.

4. The robotic system of claim 1, wherein:
   the one or more non-joint-based sensors include at least a first sensor that is located in a distal portion of the robotic arm, and
   the robotic system further comprises a tool driver that is mounted on the first sensor such that the first sensor detects force exerted by the tool driver.

5. The robotic system of claim 4, wherein the first sensor comprises a six-axis load cell.

6. The robotic system of claim 1, wherein the one or more non-joint-based sensors include one or more contact sensors located on one or more links of the robotic arm.

7. The robotic system of claim 1, wherein:
   the sensor architecture further includes one or more joint-based sensors that are positioned to detect a second force exerted on the robotic arm,
   the first criteria are met in accordance with a determination that the first force detected by the non-joint-based sensors and the second force detected by the joint-based sensors meet a preset combination of requirements on the first force and the second force, and
   the memory further includes instructions that, when executed by the one or more processors, cause the processors to:
      in accordance with a determination that the first criteria are met, including a determination that the first force and the second force meet a preset combination of requirements on the first force and the second force, transition the robotic arm from the position control mode to the manual manipulation mode.

8. The robotic system of claim 1, wherein the memory further stores instructions that, when executed by the one or more processors, cause the processors to:
   during the manual manipulation mode, generate output to assist with movement of the robotic arm in accordance with physical manipulation of the robotic arm by an operator.

9. The robotic system of claim 1, wherein the memory further stores instructions that, when executed by the one or more processors, cause the processors to:
   monitor movement of the robotic arm during the manual manipulation mode; and
   in accordance with a determination that the movement of the robotic arm during the manual manipulation mode meets second criteria, wherein the second criteria are met in accordance with a determination that the movement of the robotic arm during the manual manipulation mode is below a threshold level of movement, transition the robotic arm from the manual manipulation mode to the position control mode.

10. The robotic system of claim 1, further comprising an input interface that, when activated by a preset input, cause the one or more processors to transition the robotic arm from the position control mode to the manual manipulation mode.

11. The robotic system of claim 1, further comprising:
   one or more additional robotic arms; and
   an input interface that remotely activates impedance control of the robotic arm and/or at least one of the one or more additional robotic arms.

12. A robotic system, comprising:
a robotic arm, the robotic arm including:
   a structural link, and
   a shell, the shell surrounding the structural link;
a sensor architecture, including:
   one or more sensors that are positioned to detect force and/or moment exerted on the robotic arm, the one or more sensors including at least one sensor positioned and configured to detect force and/or moment exerted on the robotic arm by detecting relative movement between the shell and the structural link;
one or more processors; and
memory storing instructions that, when executed by the one or more processors, cause the processors to:
   determine whether sensor data received from the sensor architecture meets first criteria, wherein the first criteria are met in accordance with a determination that a force detected by the one or more sensors exceeds a first threshold force or in accordance with a determination that a moment detected by the one or more sensors exceeds a first threshold moment, wherein the first criteria include a requirement that the robotic arm is in an undocked configuration in which the robotic arm is not coupled with a cannula in order for the first criteria to be met; and
   in accordance with a determination that the first criteria are met, transition the robotic arm from a position control mode to a manual manipulation mode.

13. The robotic system of claim 12, wherein the one or more sensors comprise a six-axis load cell.

14. The robotic system of claim 12, wherein the robotic arm includes an outer surface; and the one or more sensors comprise a plurality of contact sensors that engage with the shell.

15. The robotic system of claim 12, wherein the one or more sensors include at least one of: a non-joint-based sensor that is positioned away from a joint of the robotic arm; or a joint-based sensor that is positioned on a joint of the robotic arm.

16. The robotic system of claim 12, wherein the manual manipulation mode includes an impedance mode.

17. The robotic system of claim 12, wherein the memory further stores instructions that, when executed by the one or more processors, cause the processors to:
during the manual manipulation mode, generate output to assist with movement of the robotic arm in accordance with physical manipulation of the robotic arm by an operator.

18. The robotic system of claim 12, wherein the memory further stores instructions that, when executed by the one or more processors, cause the processors to:
monitor movement of the robotic arm during the manual manipulation mode; and
in accordance with a determination that the movement of the robotic arm during the manual manipulation mode meets second criteria, wherein the second criteria are met in accordance with a determination that the movement of the robotic arm during the manual manipulation mode is below a threshold level of movement, transition the robotic arm from the manual manipulation mode to the position control mode.

19. A robotic system, comprising:
a robotic arm, the robotic arm being operable to transition between an undocked configuration, in which a cannula or instrument is not coupled with the robotic arm, and a docked configuration, in which a cannula or instrument is coupled with the robotic arm;
a sensor architecture, including one or more non-joint-based sensors that are positioned to detect a first force exerted on the robotic arm;
one or more processors; and
memory storing instructions that, when executed by the one or more processors, cause the processors to:
   determine whether sensor data received from the sensor architecture meets first criteria, wherein the first criteria are met in accordance with a determination that the first force exceeds a first threshold force, wherein the first criteria include a requirement that the robotic arm is in an undocked configuration in order for the first criteria to be met; and
   in accordance with a determination that the first criteria are met, including a determination that the first force exceeds the first threshold force, transition the robotic arm from a position control mode to a manual manipulation mode.

\* \* \* \* \*